(12) United States Patent
Huang et al.

(10) Patent No.: US 11,584,020 B2
(45) Date of Patent: Feb. 21, 2023

(54) HUMAN AUGMENTED CLOUD-BASED ROBOTICS INTELLIGENCE FRAMEWORK AND ASSOCIATED METHODS

(71) Applicant: CloudMinds Robotics Co., Ltd., Shanghai (CN)

(72) Inventors: William Xiao-Qing Huang, Santa Clara, CA (US); Shikui Ma, Santa Clara, CA (US); Karl Zhao, Santa Clara, CA (US); Zhenping Guo, Santa Clara, CA (US); Qiulin Wang, Santa Clara, CA (US)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 556 days.

(21) Appl. No.: 16/702,518

(22) Filed: Dec. 3, 2019

(65) Prior Publication Data
US 2020/0171671 A1  Jun. 4, 2020

Related U.S. Application Data

(60) Provisional application No. 62/774,916, filed on Dec. 4, 2018.

(51) Int. Cl.
*G05B 19/418*  (2006.01)
*B25J 13/00*  (2006.01)
(Continued)

(52) U.S. Cl.
CPC .......... *B25J 13/006* (2013.01); *B25J 9/0084* (2013.01); *B25J 9/161* (2013.01); *B25J 9/1694* (2013.01);
(Continued)

(58) Field of Classification Search
CPC ........ B25J 13/006; B25J 9/0084; B25J 9/161; B25J 9/1682; B25J 9/1694; G06N 3/08;
(Continued)

(56) References Cited

U.S. PATENT DOCUMENTS 6,687,571 B1 *  2/2004  Byrne ................. G05D 1/0289
700/39
10,335,962 B1 *  7/2019  Rosenberg ............ B25J 9/1674
(Continued)

FOREIGN PATENT DOCUMENTS

CN  105659245 A  6/2016
CN  106796665 A  5/2017
(Continued)

OTHER PUBLICATIONS

CN First Office Action and Search Report for Application No. 201980003966 1, dated Sep. 21, 2022, w/ English translation (37 pp.).

*Primary Examiner* — Abby Y Lin
*Assistant Examiner* — Sohana Tanju Khayer
(74) *Attorney, Agent, or Firm* — Nixon Peabody LLP

(57) ABSTRACT

A human augmented robotics intelligence operation system can include a plurality of robots, each robot having a plurality of sensors; a robot control unit; and one or more articulating joints; a cloud-based robotic intelligence engine having; a communication module; a historical database; and a processor; and a human augmentation platform. The processor can be configured to make a probabilistic determination regarding the likelihood of successfully completing the particular user command. When the probabilistic determination is above a pre-determined threshold, the processor sends necessary executable commands to the robot control unit. Alternatively, when the probabilistic determi- (Continued)

nation is below the predetermined threshold, the processor generates an alert and flags the operation for human review.

19 Claims, 25 Drawing Sheets

(51) Int. Cl.
| | | |
|---|---|---|
| *B25J 9/00* | (2006.01) | |
| *G05D 1/00* | (2006.01) | |
| *G01C 21/20* | (2006.01) | |
| *B25J 9/16* | (2006.01) | |
| *G06N 5/022* | (2023.01) | |
| *G06N 3/044* | (2023.01) | |
| *G06N 3/045* | (2023.01) | |
| *G06N 7/01* | (2023.01) | |

(52) U.S. Cl.
CPC ........... *G01C 21/20* (2013.01); *G05D 1/0088* (2013.01); *B25J 9/1682* (2013.01); *G05B 2219/39451* (2013.01); *G06N 3/044* (2023.01); *G06N 3/045* (2023.01); *G06N 5/022* (2013.01); *G06N 7/01* (2023.01)

(58) Field of Classification Search
CPC .... G06N 3/0445; G06N 3/0454; G06N 5/022; G06N 7/005; G05B 2219/39451; G01C 21/20; G05D 1/0088
See application file for complete search history.

(56) References Cited

U.S. PATENT DOCUMENTS

| | | | |
|---|---|---|---|
| 2014/0207281 A1* | 7/2014 | Angle | H04L 12/282 |
| | | | 700/257 |
| 2015/0348220 A1* | 12/2015 | Sharma | G01C 21/3407 |
| | | | 705/324 |
| 2016/0023351 A1* | 1/2016 | Kuffner | B25J 9/0084 |
| | | | 901/47 |
| 2017/0123422 A1* | 5/2017 | Kentley | B60L 15/20 |
| 2017/0164414 A1* | 6/2017 | Cho | H04L 67/75 |
| 2017/0252924 A1* | 9/2017 | Vijayanarasimhan | |
| | | | G05B 19/18 |
| 2017/0269607 A1* | 9/2017 | Fulop | B25J 13/025 |
| 2019/0376792 A1* | 12/2019 | Chen | G01C 21/3647 |
| 2020/0159648 A1* | 5/2020 | Ghare | H04L 63/10 |

FOREIGN PATENT DOCUMENTS

| | | |
|---|---|---|
| CN | 107223261 A | 9/2017 |
| CN | 107708938 A | 2/2018 |
| CN | 108406764 A | 8/2018 |
| DE | 102015015503 A1 | 6/2016 |

* cited by examiner

HUMAN AUGMENTED CLOUD-BASED ROBOTICS INTELLIGENCE FRAMEWORK AND ASSOCIATED METHODS

CROSS-REFERENCE TO RELATED APPLICATION

The present application claims priority to United States Provisional Patent Application No. 62/774,916 filed on Dec. 4, 2018, the disclosure of which is hereby incorporated by reference in its entirety.

BACKGROUND

Robots, particularly those designed to interact with their surroundings typically utilize a plurality of sensors to detect various obstacles and items with which the robot is intended to interact. Such systems typically utilize on-board processing and storage to retain movement protocols and make determinations regarding appropriate functions and motion characteristics.

SUMMARY

The present disclosure relates generally to robotics, and more specifically to methods and communication networks for generating and retrieving protocols for use in controlling robots as well as various methods for implementing and executing commands to the robots.

In an aspect, a human augmented robotics intelligence operation system can be provided, the system including:
 a plurality of robots, each robot including:
  a plurality of sensors configured to detect one or more environmental parameters and user commands;
  a robot control unit, each robot control unit having an associated communication module and a processor, each associated robot control module configured to receive and transmit data collected by the plurality of sensors; and
  one or more articulating joints being capable of manipulating the robot in a manner to perform the user command;
 a cloud-based robotic intelligence engine including:
  a communication module configured to receive data from a plurality of robot control units from each of the plurality of robots;
  a historical database containing a plurality of historical actions and associated environmental parameters;
  a processor, the processor configured to recognize user commands and determine a plurality of executable commands required for the robot to comply with a particular user command within a determined environment having a particular set of detected environmental parameters;
  wherein the processor is configured to make a probabilistic determination regarding the likelihood of successfully completing the particular user command based on the particular one or more detected environmental parameters given a particular user command by comparing a determined proposed path having a similar executable command sequence having been performed in similar environmental parameters as contained in the historical database;
  wherein, when the probabilistic determination is above a pre-determined threshold, the processor is configured to communicate one or more necessary executable commands to the robot control unit, wherein the robot control unit then causes each of the articulating joints of the robot to execute each of the necessary executable commands so as to complete the user command;
 a human augmentation platform including:
  a communication module configured to receive data from the cloud-based robotic intelligence engine;
  a human service operator center having one or more human user operators;
  wherein, when the probabilistic determination is below the predetermined threshold, the processor generates an alert and flags the operation for human review;
  wherein the robot control unit is configured to determine a result with regard to satisfaction of the user command and track the one or more executable commands utilized to achieve the associated result; and
 wherein the result and the associated executable commands and the associated environmental parameters are transmitted to the cloud-based robotic intelligence engine for inclusion in the historical database for future access.

In some embodiments, when the probabilistic determination is below the pre-determined threshold, the processor is configured to initiate a connection to the human augmentation platform such that a human user operator can then review the user command and manually generate the one or more necessary executable commands for command completion and transmit the one or more necessary executable commands to the robot control unit, wherein the robot control unit then causes each of the articulating joints of the robot to execute each of the necessary executable commands so as to complete the user command;

In some embodiments, each robot control unit is connected to the cloud-based robotic intelligence engine through a visitor-based network utilizing a captive portal.

In some embodiments, the processor of the cloud-based robotic intelligence engine is configured to generate a virtual reality environmental setting reflecting the detected environmental parameters received from the robot control unit of a particular robot.

In some embodiments, the processor of the cloud-based robotic intelligence engine is configured to generate and run a simulation of the plurality of executable commands required for the robot to comply with the particular user command within the virtual reality environmental setting reflecting the detected environmental parameters received from the robot control unit of a particular robot.

In some embodiments, the human user is prompted to provide an input regarding the plurality of executable commands required for the robot to comply with the particular user command and deploying the plurality of executable commands within the virtual reality environmental setting reflecting the detected environmental parameters received from the robot control unit of a particular robot.

In some embodiments, upon successfully completing the particular user command in the virtual environment, wherein the processor is then configured to transmit the plurality of executable commands to the particular robot control unit and wherein the plurality of executable commands are then executed by the robot control associated with the particular robot.

In some embodiments, each robot control unit is provided with a user input interface configured to receive direct user input regarding user commands and receive input regarding satisfaction of said commands.

In some embodiments, the system further includes a developer portal, wherein the developer portal is configured to receive packets containing one or more executable commands for the one or more articulating joints configured to cause a particular robot to perform a predetermined sub-task, wherein a plurality of packets and subtasks are retained in the historical database, and wherein the processor is configured to determine a plurality of appropriate packets and chain the packets together to execute a user command.

In some embodiments, the processor of the cloud-based robotic intelligence engine is configured to access a plurality of external databases and extract one or more executable commands for the one or more articulating joints configured to cause a particular robot to perform a predetermined sub-task from at least one external database.

In some embodiments, the system further includes a streaming analytics platform for receiving data from the one or more environmental sensors, the streaming analytics platform being configured to analyze the raw received data and save a filtered set of clean data on the historical database pertaining to the robot's ambient environment.

In some embodiments, the processor of the cloud-based robotic intelligence engine is configured to utilize a deep learning neural network to recognize one or more similar past environmental scenarios and recognize one or more historical actions which have resulted in successful execution of a user command, and subsequently generate a set of executable commands which will have an increased probabilistic likelihood of success in a determined real-time environment.

In another aspect, a method of providing complex robotic control to a plurality of robots can be provided, the method including:
  providing a plurality of robots, each robot including:
    a plurality of sensors; and
    one or more articulating joints being capable of manipulating the robot in a manner to perform the user command;
  providing a robot control unit to each robot, each robot control unit having an associated communication module and a processor;
  providing a cloud-based robotic intelligence engine, the cloud-based robotic including:
    a communication module configured to receive data from a plurality of robot control units from each of the plurality of robots;
    a historical database containing a plurality of historical actions and associated environmental parameters; and
    a processor;
  providing a human augmentation platform, the human augmentation platform including:
    a communication module configured to receive data from the cloud-based robotic intelligence engine;
    a human service operator center having one or more human user operators;
  receiving a plurality of environmental parameters utilizing the plurality of sensors provided on at least one robot;
    receiving a user command at the robot;
    transmitting the user command and the and the plurality of environmental parameters to the cloud-based robotic intelligence engine; and
    utilizing the processor of the cloud-based robotic intelligence engine to determine a plurality of executable commands required for the robot to comply with the user command within the immediate environment surrounding the robot;
  utilizing the processor of the cloud-based robotic intelligence engine to generate a probabilistic determination regarding the likelihood of successfully completing the particular user command based on the particular one or more detected environmental parameters given a particular user command by comparing a determined proposed path having a similar executable command sequence having been performed in similar environmental parameters as contained in the historical database;
  utilizing the processor to communicate one or more necessary executable commands to the robot control unit, wherein the robot control unit then causes each of the articulating joints of the robot to execute each of the necessary executable commands so as to complete the user command when the probabilistic determination is above a pre-determined threshold;
  utilizing the processor to generate an alert and flag the operation for human review when the probabilistic determination is below the predetermined threshold;
  determining a result with regard to satisfaction of the user command and track the one or more executable commands utilized to achieve the associated result; and
  transmitting the associated result and the associated executable commands and the associated environmental parameters to the cloud-based robotic intelligence engine for inclusion in the historical database for future access.

In some embodiments, the method further includes:
  utilizing the processor to initiate a connection to the human augmentation platform such that a human user operator can then review the user command and manually generate the one or more necessary executable commands for command completion and transmit the one or more necessary executable commands to the robot control unit, wherein the robot control unit then causes each of the articulating joints of the robot to execute each of the necessary executable commands so as to complete the user command when the probabilistic determination is below the pre-determined threshold.

In some embodiments, each robot control unit is connected to the cloud-based robotic intelligence engine through a visitor-based network utilizing a captive portal.

In some embodiments, the method further includes:
  generating a virtual reality environmental setting reflecting the detected environmental parameters received from the robot control unit of a particular robot.

In some embodiments, the method further includes:
  generating and running a simulation of the plurality of executable commands required for the robot to comply with the particular user command within the virtual reality environmental setting reflecting the detected environmental parameters received from the robot control unit of a particular robot.

In some embodiments, the method further includes:
  prompting the human user operator to provide an input regarding the plurality of executable commands required for the robot to comply with the particular user command and deploying the plurality of executable commands within the virtual reality environmental setting reflecting the detected environmental parameters received from the robot control unit of a particular robot.

In some embodiments, the method further includes:
  transmitting a plurality of executable commands to the particular robot control unit and wherein the plurality of executable commands are then executed by the robot control associated with the particular robot upon successfully completing the particular user command in the virtual environment.

In some embodiments, the method further includes:
providing each robot control unit with a user input interface configured to receive direct user input regarding user commands and receive input regarding satisfaction of said commands.

In some embodiments, the method further includes:
providing a developer portal,
utilizing the developer portal to receive packets containing one or more executable commands for the one or more articulating joints configured to cause a particular robot to perform a predetermined sub-task;
retaining a plurality of packets and subtasks in the historical database;
utilizing the processor to determine a plurality of appropriate packets; and
chaining the packets together to execute a user command.

In some embodiments, the method further includes:
utilizing the processor of the cloud-based robotic intelligence engine to access a plurality of external databases and extract one or more executable commands;
wherein the one or more executable commands contain information for the one or more articulating joints configured to cause a particular robot to perform a predetermined sub-task from at least one external database.

In some embodiments, the method further includes:
providing a streaming analytics platform;
utilizing the streaming analytics platform to receive data from the one or more environmental sensors, the streaming analytics platform being configured to analyze the raw received data and save a filtered set of clean data on the historical database pertaining to the robot's ambient environment.

In some embodiments, the method further includes:
utilizing a deep learning neural network to recognize one or more similar past environmental scenarios and recognize one or more historical actions which have resulted in successful execution of a user command; and
generating a set of executable commands which will have an increased probabilistic likelihood of success in a determined real-time environment.

In some embodiments, a human augmented robotics intelligence operation system can be provided, the system including:
a plurality of robots, each robot including:
a plurality of sensors configured to detect one or more environmental parameters and user commands;
a robot control unit, each robot control unit having an associated communication module and a processor, each associated robot control module configured to receive and transmit data collected by the plurality of sensors; and
one or more articulating joints being capable of manipulating the robot in a manner to perform the user command;
a cloud-based robotic intelligence engine including:
a communication module configured to receive data from a plurality of robot control units from each of the plurality of robots;
a historical database containing a plurality of historical actions and associated environmental parameters;
a processor, the processor configured to recognize user commands and determine a plurality of executable commands required for the robot to comply with a particular user command within a determined environment having a particular set of detected environmental parameters;
a human augmentation platform including:
a communication module configured to receive data from the cloud-based robotic intelligence engine;
a human service operator center having one or more human user operators interacting therewith; and
a developer portal, configured to receive input regarding various robot functions from a pool of one or more developers;
wherein the processor of the cloud-based robotic intelligence engine is configured to make a probabilistic determination regarding the likelihood of successfully completing the particular user command based on the particular one or more detected environmental parameters given a particular user command by comparing a determined proposed path having a similar executable command sequence having been performed in similar environmental parameters as contained in the historical database;
wherein, when the probabilistic determination is above a pre-determined threshold, the processor is configured to communicate one or more necessary executable commands to the robot control unit, wherein the robot control unit then causes each of the articulating joints of the robot to execute each of the necessary executable commands so as to complete the user command;
wherein, when the probabilistic determination is below the predetermined threshold, the processor generates an alert and flags the operation for human review;
wherein the robot control unit is configured to determine a result with regard to satisfaction of the user command and track the one or more executable commands utilized to achieve the associated result; and
wherein the developer portal is configured to receive packets containing one or more executable commands for the one or more articulating joints configured to cause a particular robot to perform a predetermined sub-task, wherein a plurality of packets and subtasks are retained in the historical database, and wherein the processor is configured to determine a plurality of appropriate packets and chain the packets together;
wherein the result and the associated executable commands and the associated environmental parameters are transmitted to the cloud-based robotic intelligence engine for inclusion in the historical database for future access;
wherein the processor of the cloud-based robotic intelligence engine is configured to generate a virtual reality environmental setting reflecting the detected environmental parameters received from the robot control unit of a particular robot; and
wherein the processor of the cloud-based robotic intelligence engine is configured to generate and run a simulation of the plurality of executable commands required for the robot to comply with the particular user command within the virtual reality environmental setting reflecting the detected environmental parameters received from the robot control unit of a particular robot.

In some embodiments, when the probabilistic determination is below the pre-determined threshold, the processor is configured to initiate a connection to the human augmentation platform such that a human user operator can then review the user command and manually generate the one or more necessary executable commands for command completion and transmit the one or more necessary executable commands to the robot control unit, wherein the robot control unit then causes each of the articulating joints of the robot to execute each of the necessary executable commands so as to complete the user command.

In some embodiments, each robot control unit is connected to the cloud-based robotic intelligence engine through a visitor-based network utilizing a captive portal.

In some embodiments, the human user is prompted to provide an input regarding the plurality of executable commands required for the robot to comply with the particular user command and deploying the plurality of executable commands within the virtual reality environmental setting reflecting the detected environmental parameters received from the robot control unit of a particular robot.

In some embodiments, upon successfully completing the particular user command in the virtual environment, wherein the processor is configured to transmit the plurality of executable commands to the particular robot control unit and wherein the plurality of executable commands are then executed by the robot control associated with the particular robot.

In some embodiments, upon successfully completing the particular user command in the virtual environment, wherein the processor is configured to transmit the plurality of executable commands to the particular robot control unit and wherein the plurality of executable commands are then executed by the robot control associated with the particular robot.

In some embodiments, each robot control unit is provided with a user input interface configured to receive direct user input regarding user commands and receive input regarding satisfaction of said commands.

In some embodiments, the processor of the cloud-based robotic intelligence engine is configured to access a plurality of external databases and extract one or more executable commands for the one or more articulating joints configured to cause a particular robot to perform a predetermined sub-task from at least one external database.

In some embodiments, the system further includes a streaming analytics platform for receiving data from the one or more environmental sensors, the streaming analytics platform being configured to analyze the raw received data and save a filtered set of clean data on the historical database pertaining to the robot's ambient environment.

In some embodiments, the processor of the cloud-based robotic intelligence engine is configured to utilize a deep learning neural network to recognize one or more similar past environmental scenarios and recognize one or more historical actions which have resulted in successful execution of a user command, and subsequently generate a set of executable commands which will have an increased probabilistic likelihood of success in a determined real-time environment.

In another aspect, a human augmented robotics intelligence operation system can be provided, which can include a plurality of robots, each having: a plurality of sensors configured to detect one or more environmental parameters and user commands; a robot control unit, each robot control unit having an associated communication module and a processor, each associated robot control module configured to receive and transmit data collected by the plurality of sensors; and one or more articulating joints being capable of manipulating the robot in a manner to perform the user command.

The human augmented robotics intelligence operation system can then also include a cloud-based robotic intelligence engine having: a communication module; a historical database containing a plurality of historical actions and associated environmental parameters; and a processor.

The human augmented robotics intelligence operation system can then also include a human augmentation platform which can include a communication module configured to receive data from the cloud-based robotic intelligence engine; and a human service operator center having one or more human user operators.

In some such embodiments, the communication module can be configured to receive data from a plurality of robot control units from each of the plurality of robots.

Further, in some embodiments, the processor can be configured to recognize user commands and determine a plurality of executable commands required for the robot to comply with a particular user command within a determined environment having a particular set of detected environmental parameters;

In some such embodiments, the processor can be configured to make a probabilistic determination regarding the likelihood of successfully completing the particular user command based on the particular one or more detected environmental parameters given a particular user command by comparing a determined proposed path having a similar executable command sequence having been performed in similar environmental parameters as contained in the historical database.

In some such embodiments, when the probabilistic determination is above a pre-determined threshold, the processor is configured to communicate one or more necessary executable commands to the robot control unit, wherein the robot control unit then causes each of the articulating joints of the robot to execute each of the necessary executable commands so as to complete the user command;

In some such embodiments, when the probabilistic determination is below the predetermined threshold, the processor can generate an alert and flag the operation for human review.

In some such embodiments, the robot control unit can be configured to determine a result with regard to satisfaction of the user command and track the one or more executable commands utilized to achieve the associated result.

In some such embodiments, the result and the associated executable commands and the associated environmental parameters can then be transmitted to the cloud-based robotic intelligence engine for inclusion in the historical database for future access.

In some such embodiments, when the probabilistic determination is below the pre-determined threshold, the processor can also be configured to initiate a connection to the human augmentation platform such that a human user operator can then review the user command and manually generate the one or more necessary executable commands for command completion and transmit the one or more necessary executable commands to the robot control unit, wherein the robot control unit then causes each of the articulating joints of the robot to execute each of the necessary executable commands so as to complete the user command;

In some such embodiments, each robot control unit can be connected to the cloud-based robotic intelligence engine through a visitor-based network utilizing a captive portal.

In some such embodiments, the processor of the cloud-based robotic intelligence engine can be configured to generate a virtual reality environmental setting reflecting the detected environmental parameters received from the robot control unit of a particular robot.

In some such embodiments, the processor of the cloud-based robotic intelligence engine can be configured to generate and run a simulation of the plurality of executable commands required for the robot to comply with the particular user command within the virtual reality environmental setting reflecting the detected environmental parameters received from the robot control unit of a particular robot.

In some such embodiments, the human user can be prompted to provide an input regarding the plurality of executable commands required for the robot to comply with the particular user command and deploying the plurality of executable commands within the virtual reality environmental setting reflecting the detected environmental parameters received from the robot control unit of a particular robot.

In some such embodiments, upon successfully completing the particular user command in the virtual environment, the processor can then be configured to transmit the plurality of executable commands to the particular robot control unit and wherein the plurality of executable commands are then executed by the robot control associated with the particular robot.

In some such embodiments, each robot control unit can be provided with a user input interface configured to receive direct user input regarding user commands and receive input regarding satisfaction of said commands.

In some such embodiments, the human augmented robotics intelligence operation system can further include a developer portal, wherein the developer portal can be configured to receive packets containing one or more executable commands for the one or more articulating joints configured to cause a particular robot to perform a predetermined sub-task, wherein a plurality of packets and subtasks are retained in the historical database, and wherein the processor is configured to determine a plurality of appropriate packets and chain the packets together to execute a user command.

In some such embodiments, the processor of the cloud-based robotic intelligence engine can be utilized to access a plurality of external databases and extract one or more executable commands for the one or more articulating joints configured to cause a particular robot to perform a predetermined sub-task from at least one external database.

In some such embodiments, the human augmented robotics intelligence operation system can further include a streaming analytics platform for receiving data from the one or more environmental sensors, the streaming analytics platform being configured to analyze the raw received data and save a filtered set of clean data on the historical database pertaining to the robot's ambient environment.

In some such embodiments, the processor of the cloud-based robotic intelligence engine can be configured to utilize a deep learning neural network to recognize one or more similar past environmental scenarios and recognize one or more historical actions which have resulted in successful execution of a user command, and subsequently generate a set of executable commands which will have an increased probabilistic likelihood of success in a determined real-time environment.

Also contemplated herein is a method of providing complex robotic control to a plurality of robots, the method including: providing a plurality of robots, each robot having: a plurality of sensors; and one or more articulating joints being capable of manipulating the robot in a manner to perform the user command; the method further including providing a robot control unit to each robot, each robot control unit having an associated communication module and a processor; providing a cloud-based robotic intelligence engine, the cloud-based robotic having: a communication module configured to receive data from a plurality of robot control units from each of the plurality of robots; a historical database containing a plurality of historical actions and associated environmental parameters; and a processor;

The method of providing complex robotic control to a plurality of robots can also including the steps of: providing a human augmentation platform, the human augmentation platform including: a communication module configured to receive data from the cloud-based robotic intelligence engine; a human service operator center having one or more human user operators;

The method of providing complex robotic control to a plurality of robots can also including the steps of: receiving a plurality of environmental parameters utilizing the plurality of sensors provided on the robot; receiving a user command at the robot; transmitting the user command and the and the plurality of environmental parameters to the cloud-based robotic intelligence engine; utilizing the processor of the cloud-based robotic intelligence engine to determine a plurality of executable commands required for the robot to comply with the user command within the immediate environment surrounding the robot; and utilizing the processor of the cloud-based robotic intelligence engine to generate a probabilistic determination regarding the likelihood of successfully completing the particular user command based on the particular one or more detected environmental parameters given a particular user command by comparing a determined proposed path having a similar executable command sequence having been performed in similar environmental parameters as contained in the historical database.

The method of providing complex robotic control to a plurality of robots can also including the steps of: utilizing the processor to communicate one or more necessary executable commands to the robot control unit, wherein the robot control unit then causes each of the articulating joints of the robot to execute each of the necessary executable commands so as to complete the user command when the probabilistic determination is above a pre-determined threshold; utilizing the processor to generate an alert and flags the operation for human review when the probabilistic determination is below the predetermined threshold; determining a result with regard to satisfaction of the user command and track the one or more executable commands utilized to achieve the associated result; and transmitting the associated result and the associated executable commands and the associated environmental parameters to the cloud-based robotic intelligence engine for inclusion in the historical database for future access.

The method of providing complex robotic control to a plurality of robots can in some embodiments also include the step of: utilizing the processor to initiate a connection to the human augmentation platform such that a human user operator can then review the user command and manually generate the one or more necessary executable commands for command completion and transmit the one or more necessary executable commands to the robot control unit, wherein the robot control unit then causes each of the articulating joints of the robot to execute each of the necessary executable commands so as to complete the user command when the probabilistic determination is below the pre-determined threshold.

The method of providing complex robotic control to a plurality of robots can in some embodiments also include the step of: utilizing the processor of the cloud-based robotic intelligence engine to generate a virtual reality environmental setting reflecting the detected environmental parameters received from the robot control unit of a particular robot.

The method of providing complex robotic control to a plurality of robots can in some embodiments also include the step of: utilizing the processor of the cloud-based robotic intelligence engine to generate and run a simulation of the plurality of executable commands required for the robot to comply with the particular user command within the virtual reality environmental setting reflecting the detected environmental parameters received from the robot control unit of a particular robot.

The method of providing complex robotic control to a plurality of robots can in some embodiments also include the step of: prompting the human user to provide an input regarding the plurality of executable commands required for the robot to comply with the particular user command and deploying the plurality of executable commands within the virtual reality environmental setting reflecting the detected environmental parameters received from the robot control unit of a particular robot.

The method of providing complex robotic control to a plurality of robots can in some embodiments also include the step of: transmitting the plurality of executable commands to the particular robot control unit and wherein the plurality of executable commands are then executed by the robot control associated with the particular robot upon successfully completing the particular user command in the virtual environment.

The method of providing complex robotic control to a plurality of robots can in some embodiments also include the step of: providing each robot control unit with a user input interface configured to receive direct user input regarding user commands and receive input regarding satisfaction of said commands.

The method of providing complex robotic control to a plurality of robots can in some embodiments also include the steps of: providing a developer portal; utilizing the developer portal to receive packets containing one or more executable commands for the one or more articulating joints configured to cause a particular robot to perform a predetermined sub-task; retaining a plurality of packets and subtasks in the historical database; utilizing the processor to determine a plurality of appropriate packets; and chaining the packets together to execute a user command.

The method of providing complex robotic control to a plurality of robots can in some embodiments also include the step of: utilizing the processor of the cloud-based robotic intelligence engine to access a plurality of external databases and extract one or more executable commands; wherein the one or more executable commands contain information for the one or more articulating joints configured to cause a particular robot to perform a predetermined sub-task from at least one external database.

The method of providing complex robotic control to a plurality of robots can in some embodiments also include the step of: providing a streaming analytics platform; and utilizing the streaming analytics platform to receive data from the one or more environmental sensors, the streaming analytics platform being configured to analyze the raw received data and save a filtered set of clean data on the historical database pertaining to the robot's ambient environment.

The method of providing complex robotic control to a plurality of robots can in some embodiments also include the steps of: utilizing a deep learning neural network to recognize one or more similar past environmental scenarios and recognize one or more historical actions which have resulted in successful execution of a user command; and generating a set of executable commands which will have an increased probabilistic likelihood of success in a determined real-time environment.

It should be understood that both the foregoing general description and the following detailed description are exemplary and explanatory only and are not restrictive of the disclosure. Other aspects and embodiments of the present disclosure will become clear to those of ordinary skill in the art in view of the following description and the attached drawings.

BRIEF DESCRIPTION OF THE DRAWINGS

To more clearly illustrate some of the embodiments, the following is a brief description of the drawings.

The drawings in the following descriptions are only illustrative of some embodiments. For those of ordinary skill in the art, other drawings of other embodiments can become apparent based on these drawings.

DETAILED DESCRIPTION

Figure 1:
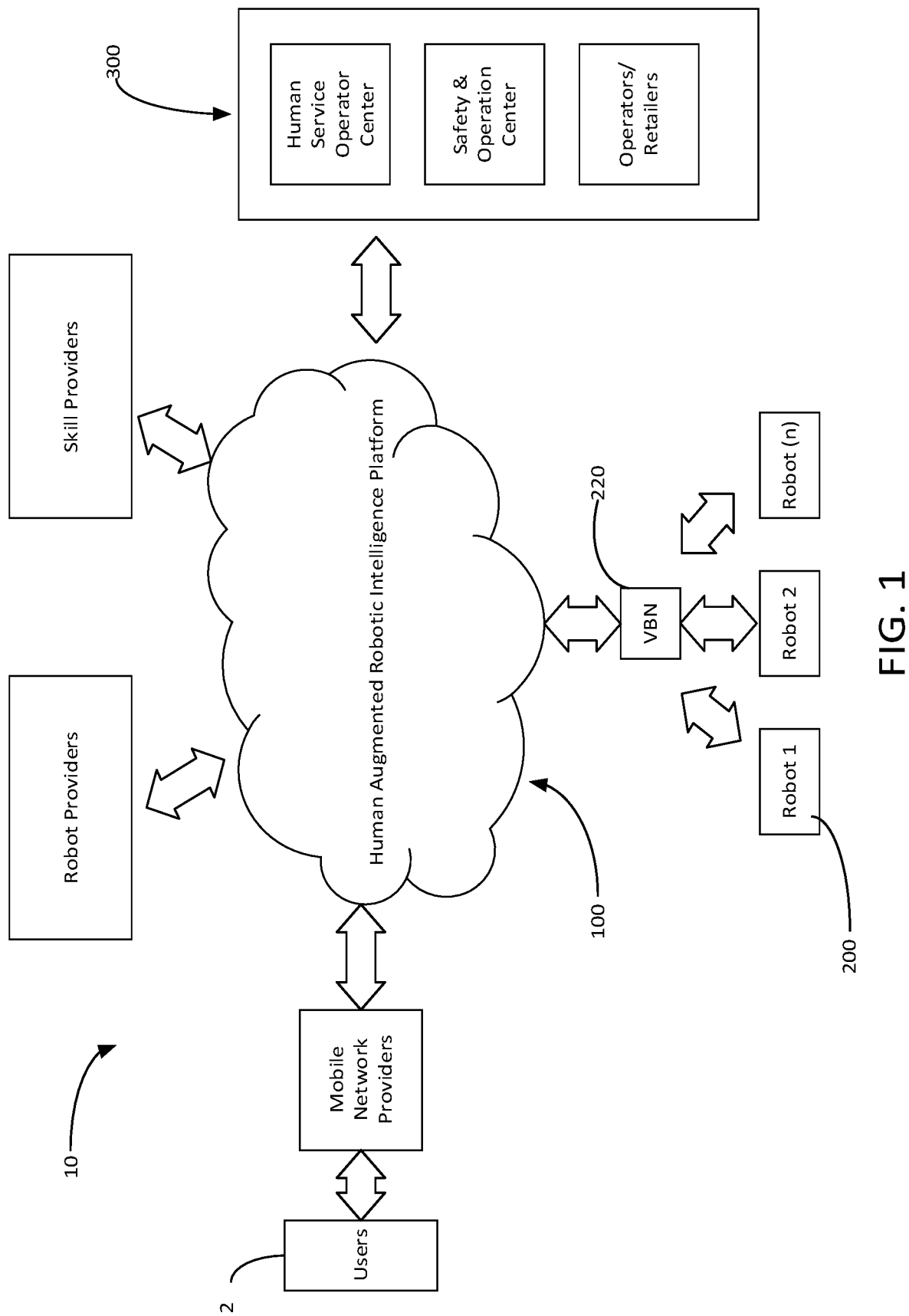
FIG. 1 illustrates an exemplary schematic or framework of a human augmented robotics intelligence operation system in accordance with various aspects of the present disclosure.
Figure 2:
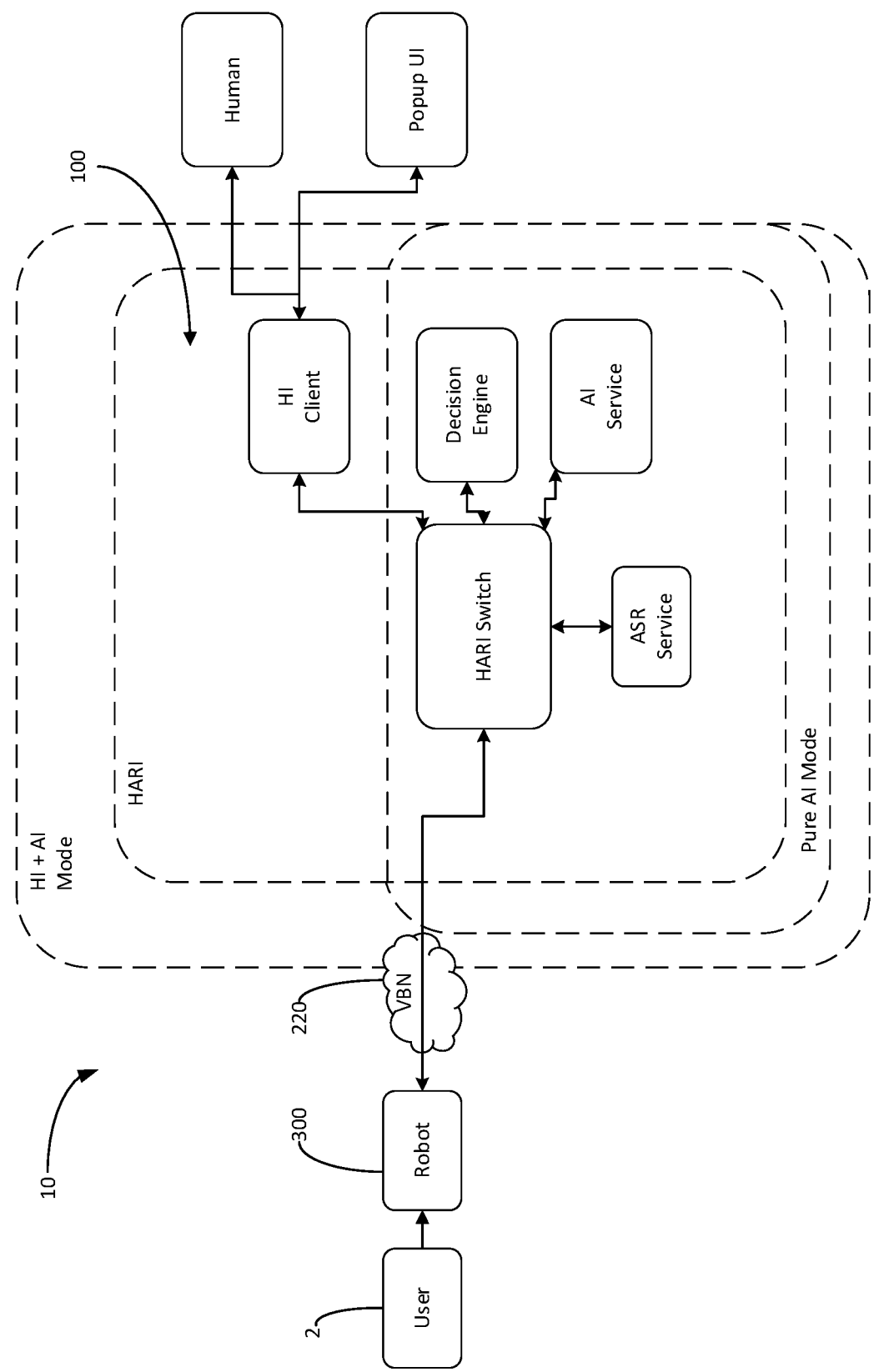
FIG. 2 illustrates another exemplary schematic or framework of a human augmented robotics intelligence operation system in accordance with various additional aspects of the present disclosure.
Figure 3:
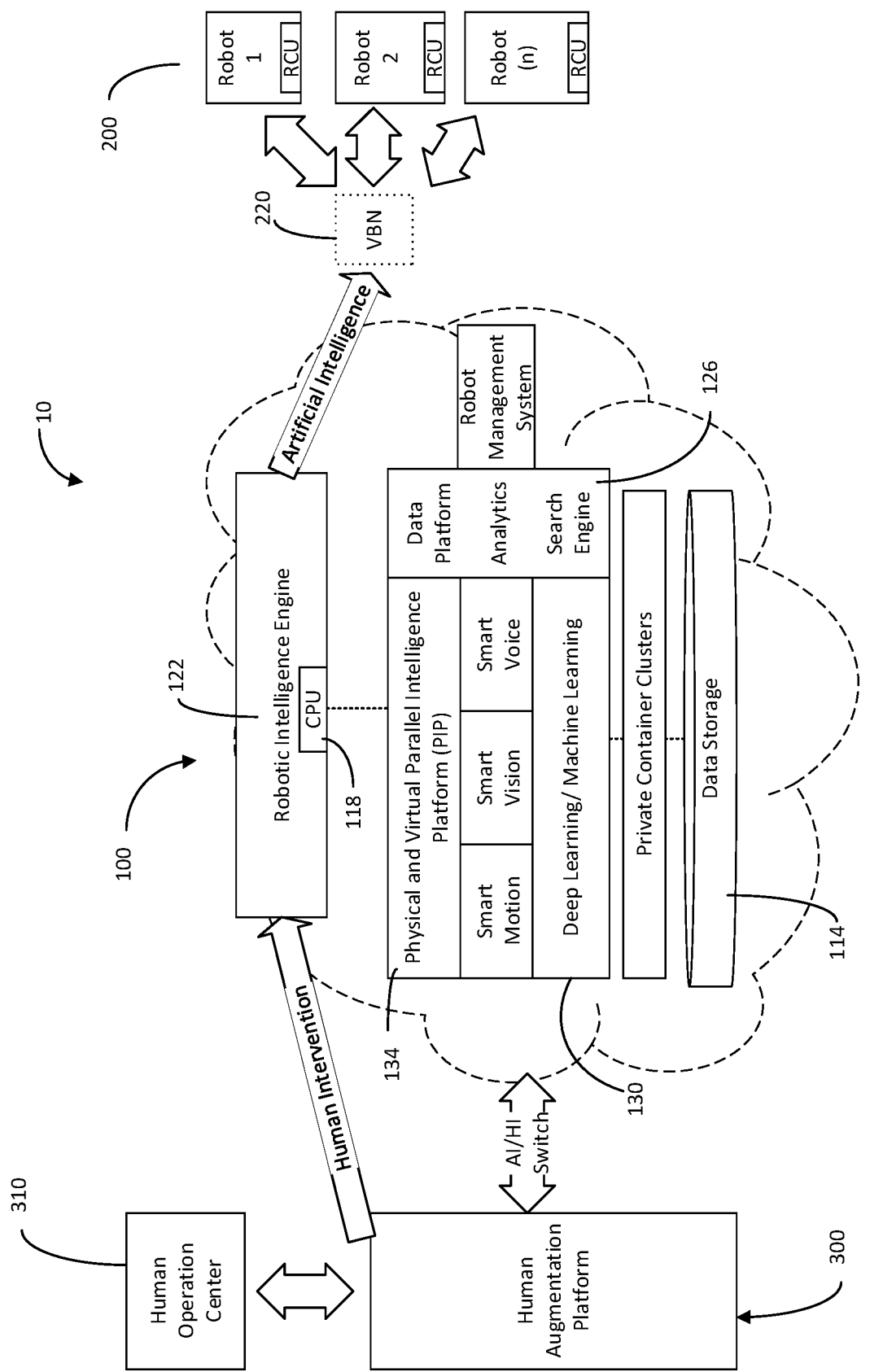
FIG. 3 illustrates yet another exemplary schematic or framework of a human augmented robotics intelligence operation system in accordance with various additional aspects of the present disclosure.
Figure 4:
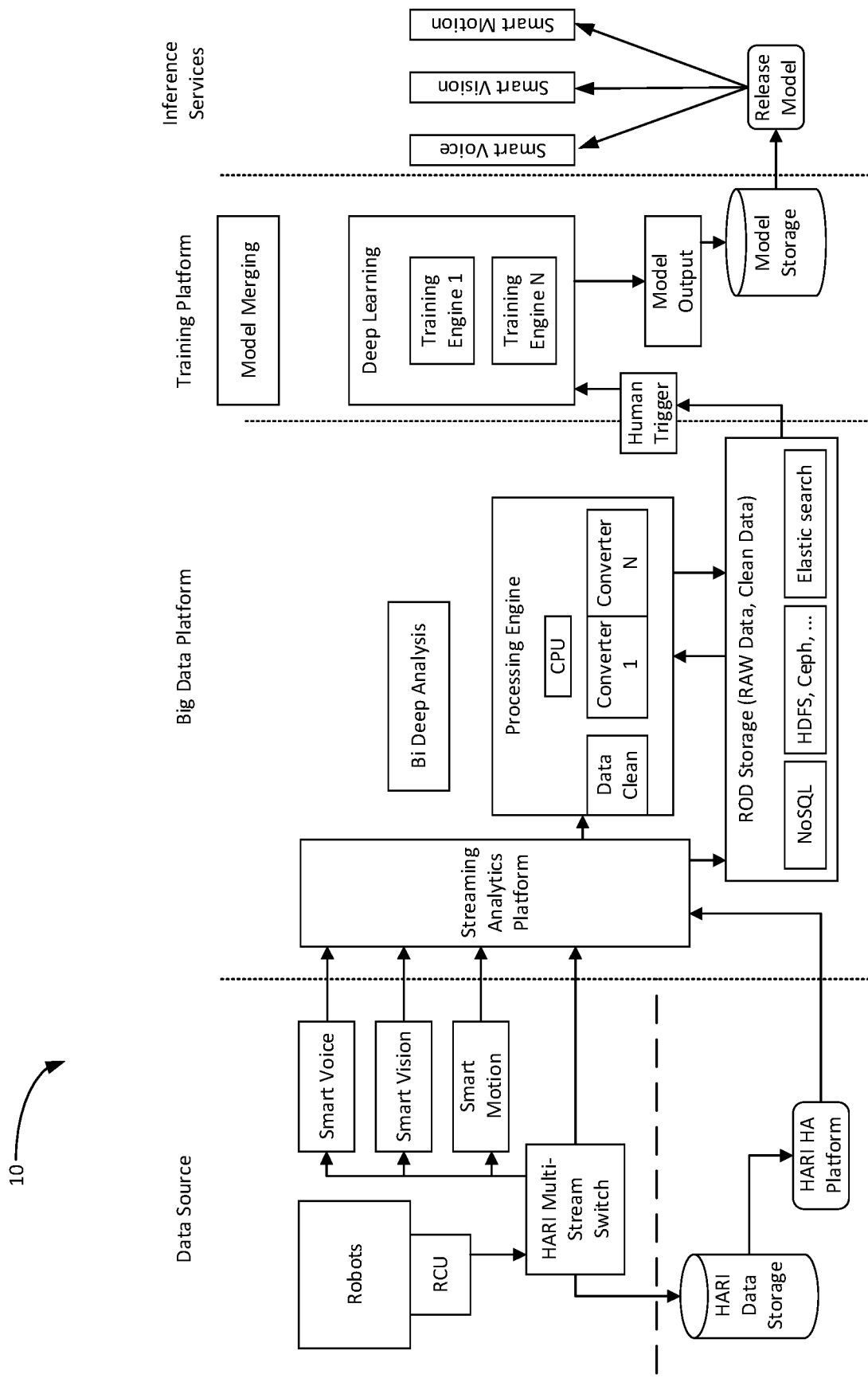
FIG. 4 illustrates another exemplary schematic or framework of various potential data flows through a human augmented robotics intelligence operation system in accordance with various additional aspects of the present disclosure.
Figure 5:
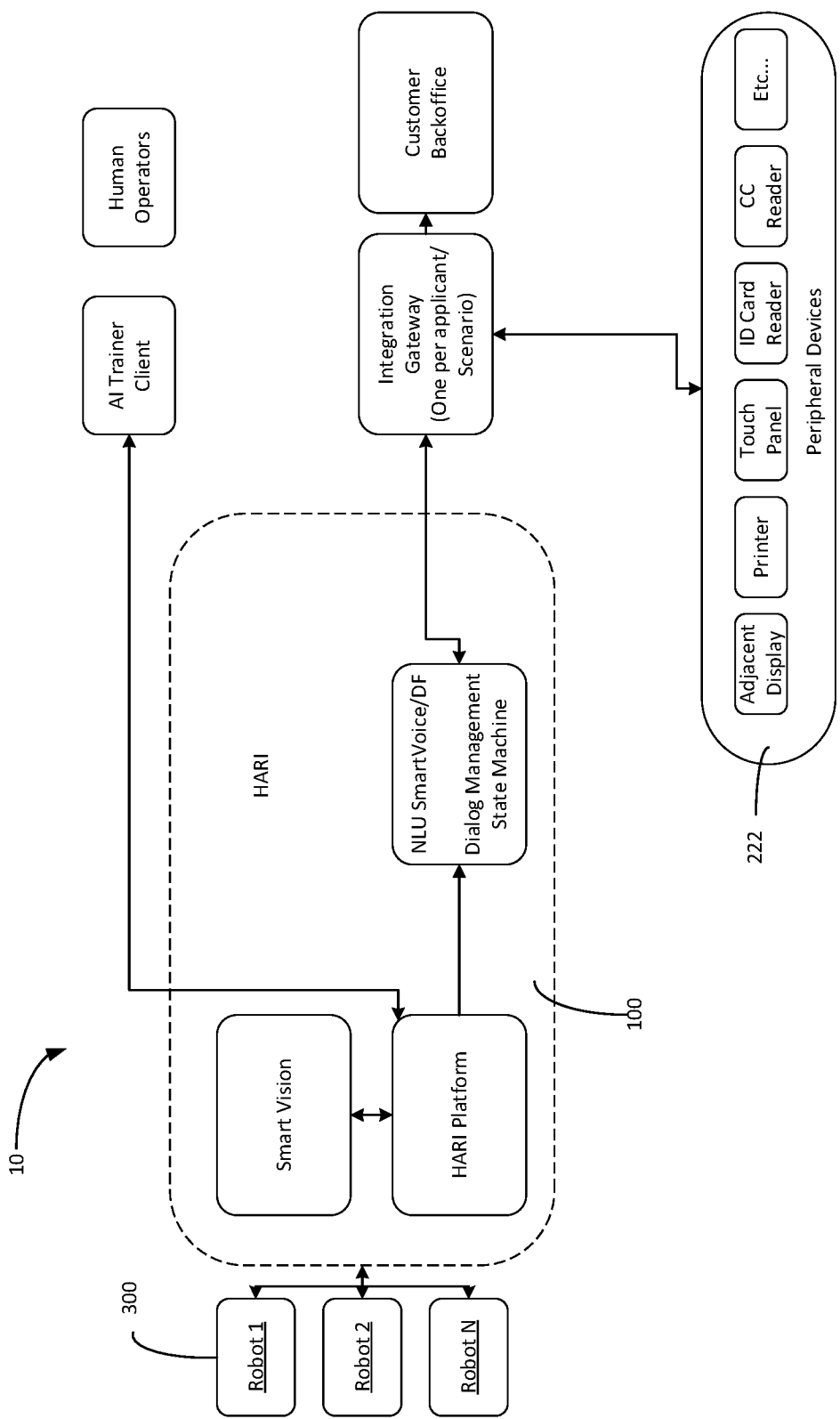
FIG. 5 illustrates yet another exemplary schematic or framework of various potential data flows through a human augmented robotics intelligence operation system in accordance with various additional aspects of the present disclosure.
Figure 6:
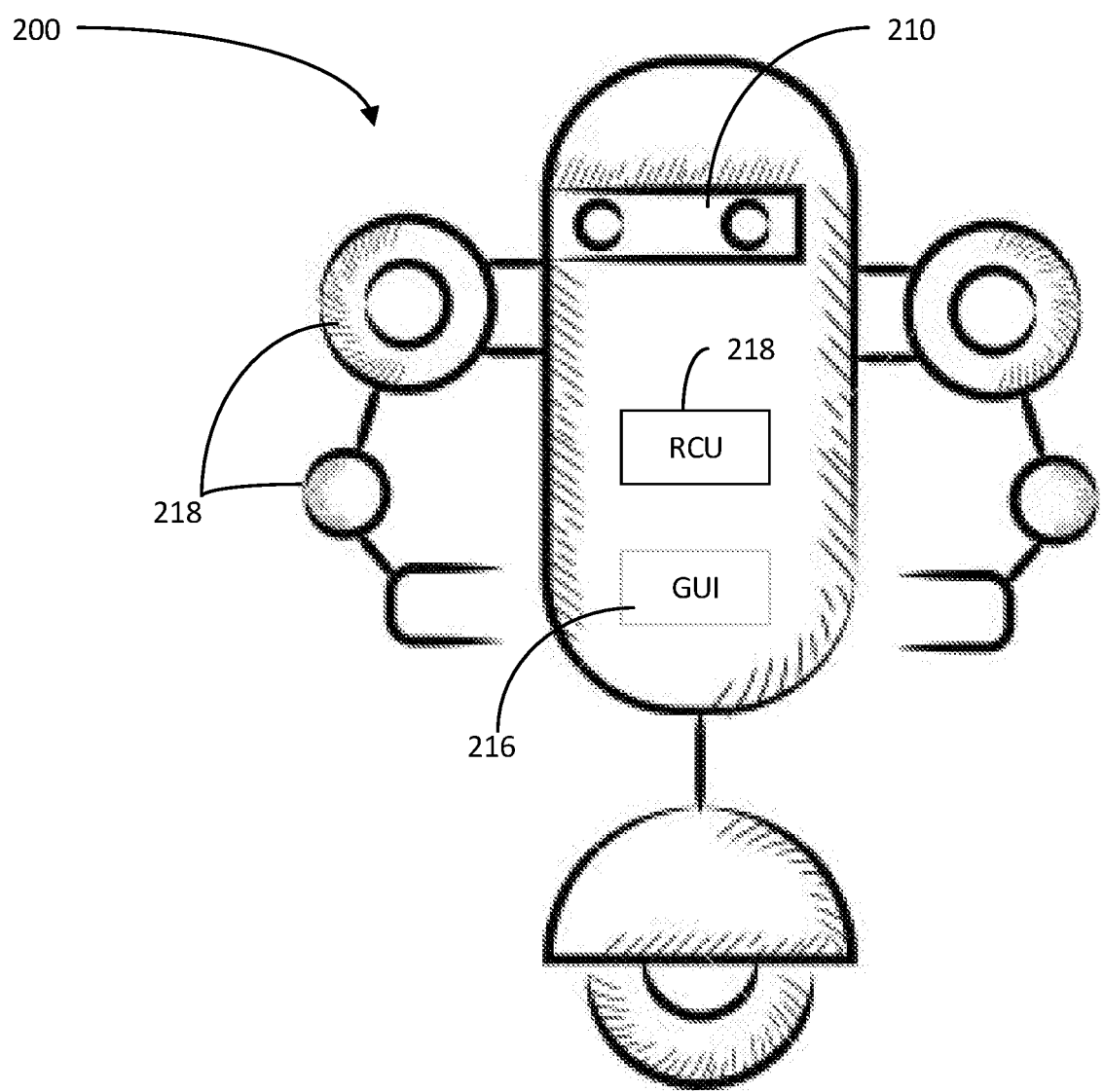
FIG. 6 illustrates an exemplary robot which might be employed utilizing the human augmented robotics intelligence operation system being illustrative of various concepts of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Artificial intelligence, hereinafter referred to as AI, is touching every industry today. It is embedded in numerous aspects of our lives in recent years. Many well recognized applications include: vehicle self-driving, advanced computer vision (facial/object recognition), intelligent customer service, AI in big data business analytics/marketing, just to name but a few examples.

Each new application represents a new breakthrough and exposes new horizons and challenges which will need to be overcome.

In order to allow for AI to learn from its own experiences and differentiate between failed attempts and successful attempts deep learning development and algorithms have been implemented which allow the AI to learn from past mistakes and more quickly make successful determinations on future tasks based on patterns recognized between previous successful and failed attempts at a given task.

Advances in such deep learning techniques have made developing AI technologies and capabilities much easier to the rest of the world and have expedited AI technology adaptation in many industries and applications.

AI technology embraces a breakthrough in recent years, for example, deep neural networks (DNN), such as recurrent neural network (RNN), and convolutional deep neural network (CNN). These advanced mathematical algorithms and data models, which are modeled like the biological neural networks of human brain, and enable powerful computers to learn and train problem solving skills on their own by tracking various aspects regarding actions taken to achieve certain tasks, various parameter constraints and correlating actions taken which resulted in success given various associated parameters.

Together with advances in cloud computing and cloud storage, AI is making continual advancements in building tools that model, recognize, teach, learn, and take part in various human-like activities requiring problem solving in environments which require simultaneous thinking and acting.

AI techniques such as deep learning require the so-called deep neural network training which typically requires initial human training wherein datasets are annotated or directly input until historical databases with regard to success and failure become sufficiently robust as to allow for determination of a reliable set of actions for the computer to take in order to achieve a successful result.

To build successful neural networks, correct algorithms must be carefully designed and selected. Further, initially large numbers of accurately annotated data sets must typically be collected.

When built right, these AI capabilities are considered intelligent due to their ability to recognize find ways to be integrated into specific applications/scenes and tuned, which typically requires the system to be trained with massive amounts of data and refined algorithms.

Contemplated herein is a human augmented robotics intelligence framework which can be utilized so as to deploy one or more free moving robots in any number of potential situations.

It has been recognized that while the computational needs of a particular robot in a particular environment may require large amounts of computational power and large data storage capability in order for the AI to recognize a command given to a particular robot, assess the environment, and determine a best course of action based on historical successful performed tasks provided in similar environments or given similar obstacles.

It has then been recognized by those proposing the following system that it would be overly burdensome to require each potential robot to have such computational storage and historical data on-board, which would require a large amount of space, and a large amount of power to drive such computational power.

Additionally, if employed locally, it would be more difficult for robots to learn from one another. Or in other words, the historical actions of an alternative identical or similar robot may have information stored locally which relates to a successful completion of a nearly identical task in nearly identical environmental constraints or parameters. In such a case it becomes difficult to search numerous scattered remote databases associated with virtually limitless additional robots for the AI to compare determined environmental parameters with what other robots have encountered and performed tasks successfully.

Some examples of the robotic applications can include free moving service robots, such as blind guiding robots, airport attendant robots, security patrol robots etc. These complex applications often need multiple AI capabilities, including natural language processing (NLP), computer vision (CV), Visual SLAM, motion controls such as vision assisted grasping (V-Grasp) and other skills. These functions require end-end integration of both hardware and software with multiple platforms including cloud, network, and terminals.

It will also be understood that these examples of potential applications are not intended to be limiting, but are only discussed so as to provide various contextual situations in which various features of the human augmented robotics intelligence system as contemplated herein can be illustrated.

However, it will be appreciated that a particular company may release a particular model of robot, which particular model may be employed in a limitless number of diverse applications. However, in any given set of environmental parameters there will be various similarities with regard to constraining parameters. Further, for any given number of limitless commands or actions the robot may need to perform, there are also various similarities in particular micro or sub-actions which would be required to complete a particular task.

The human augmented robotics intelligence system as contemplated herein solves many of the aforementioned problems by utilizing cloud computing and data storage. In this system, each robot is instead provided with a robot control unit local to each robot (RCU), wherein the RCU which can include some processing and storage to enable various sensors provided about the robot to be collected, and rather than doing the AI determinations locally, transmit the data over a network to the cloud computing platform to determine the environmental parameters based on the data from the sensors. The AI can then extract a command received by the robot, determine the environmental parameters, and based on the historical databases of all similar robots, or even robots having similar components, which have performed similar tasks in similar previous environmental parameters in a successful manner.

It will then be understood that the RCU can be configured to operate by transmitting received data from the robot to a cloud-based computational system for processing the received data, wherein the cloud, which might have virtually unlimited power and computational potential can be utilized for determining an appropriate course of action utilizing a recurrent learning or artificial intelligence system, and then transmitting the appropriate course of action back to the robot for execution by the particular robot.

In some embodiments, the RCU may have the storage and processing capability to translate the appropriate course of action to a series of executable commands which can be performed by one or more articulating joints of the robot to carry out said executable commands in the order and time necessary to achieve the appropriate course.

However, in some embodiments, the cloud-based computational system may search databases correlating to a particular robot, or elements of a particular robot to determine a series of executable commands which can be performed by one or more articulating joints of the robot and transmit those commands to the RCU to locally carry out said executable commands in the order and time necessary to achieve the appropriate course.

Thus, a cloud robotics operation platform can be established which can be accessed from wired or wireless robot control modules at any remote location in which a robot may be located, without requiring redundant copies of potential actions which a particular robot may be capable as well as the processing capabilities on, or proximal to, each robot.

The purpose of the human augmented robotics intelligence system as contemplated herein is to build such an operation platform to operate massive number of robots in multiple application domains which can utilize network communication rather than local databases and a cloud-based processing platform in order to perform the high-powered computational tasks required for machine learning and determinations.

This system can utilize technologies in deep learning and AI, cloud computing and big data along with secure network connection technology in order to effectuate secured free moving robot operations of various robot models each being deployed in unique environmental settings.

Although Robots have been adopted in manufacturing for years, these robots are mostly process controlled and not intelligent, meaning that they generally operate strictly on a routine, i.e. repeating operations in a confined environment with a series of pre-determined steps, which steps are provided utilizing prior programming. Such robots have no cognitive capabilities to recognize changing parameters in their environment, such as seeing, listening, and adjusting their actions accordingly to adapt to environmental changes. For example, these robots typically cannot detect the presence of an approaching obstacle or target, and respond based on the changes.

Advancement in technology has provided an ever-increasing number of sensors which can be utilized by robots, which make it possible for robots to talk, walk and to see. AI can then utilize these sensors in a manner that allow the robot to not only see, but to provide a detailed map of the robot's surroundings, track movement of potential targets or obstacles in the robot's proximity, determine a necessary pathway, and execute a plan utilizing one or more articulating joints of the robot to successfully execute an assigned task within the detected environment.

By combining AI technology with robotics technology, it is possible to create robots that can accomplish cognitive activities such as providing services to humans in non-confined environments such as an office, home, community, campus, etc.

In particular, and as illustrated in FIGS. 1-6, the human augmented robotics intelligence operation system 10 as discussed herein can include a plurality of robots 200, each having: a plurality of sensors 210, or a sensor array having a plurality of sensors configured to detect one or more environmental parameters and user commands; a robot control unit 214, each robot control unit having an associated communication module and a processor, each associated robot control module 214 can be configured to receive and transmit data collected by the plurality of sensors; and one or more articulating joints 218 being capable of manipulating the robot in a manner to perform the user command.

The human augmented robotics intelligence operation system can then also include a cloud-based robotic intelligence engine 100 having: a communication module; a historical database containing a plurality of historical actions and associated environmental parameters; and a processor.

The human augmented robotics intelligence operation system 10 can then also include a human augmentation platform 300 which can include a communication module configured to receive data from the cloud-based robotic intelligence engine; and a human service operator center having one or more human user operators which can interact with the human augmentation platform utilizing a human operation center 310 or some other type of portal.

In some such embodiments, the communication module can be configured to receive data from a plurality of robot control units from each of the plurality of robots.

Further, in some embodiments, the processor of the cloud-based robotic intelligence engine 100 can be configured to recognize user commands and determine a plurality of executable commands required for the robot to comply with a particular user command within a determined environment having a particular set of detected environmental parameters;

In some such embodiments, the processor of the cloud-based robotic intelligence engine 100 can be configured to make a probabilistic determination regarding the likelihood of successfully completing the particular user command based on the particular one or more detected environmental parameters given a particular user command by comparing a determined proposed path having a similar executable command sequence having been performed in similar environmental parameters as contained in the historical database.

In some such embodiments, when the probabilistic determination is above a pre-determined threshold, the processor of the cloud-based robotic intelligence engine 100 can be configured to communicate one or more necessary executable commands to the robot control unit, wherein the robot control unit then causes each of the articulating joints 218 of the robot 200 to execute each of the necessary executable commands so as to complete the user command.

In some such embodiments, when the probabilistic determination is below the predetermined threshold, the processor can generate an alert and flag the operation for human review. This probabilistic determination being below a certain threshold indicates an unacceptable likelihood of a failed attempt which will correspond to an insufficient amount of historical data from which the system can compare so as to allow the robot to complete a task with reliable results. As such, the human operator can take direct control of the robot, utilizing sensors to apprise the human of the environmental parameters and manually navigate the robot so as complete the task.

This human operator can have the environmental parameters presented to them on a screen, through a portal, utilizing virtual reality, or via any potentially helpful means which would allow the human operator to become apprised of the robot's environmental challenges or parameters.

This virtual reality associated with the cloud-based robotic intelligence engine and human augmentation can be referred to in short herein as HARIX.

In some instances the human operator may be control the robot utilizing various methods, such as a master replica robot with a plurality of positional sensors in each articulating joint wherein the master replica can be manually manipulated so as to place the robot in a desired configuration, wherein the robot in the real environment can be linked to the master replica and follow the corresponding master replica motions as a slave utilizing its own articulating joints. Alternatively, the human operator can be provided with one or more input devices which can be paired with particular articulating joints and the human user can then build an action sequence for each articulating joint so as to allow the robot to successfully complete the command.

In some such embodiments, the robot control unit can be configured to determine a result, or prompt user feedback input, with regard to satisfaction of the user command and track the one or more executable commands utilized to achieve the associated result. In some such embodiments, the result and the associated executable commands and the associated environmental parameters can then be transmitted to the cloud-based robotic intelligence engine for inclusion in the historical database for future access.

In some such embodiments, when the probabilistic determination is below the pre-determined threshold, the processor can also be configured to initiate a connection to the human augmentation platform such that a human user operator can then review the user command and manually generate the one or more necessary executable commands for command completion and transmit the one or more necessary executable commands to the robot control unit, wherein the robot control unit then causes each of the articulating joints of the robot to execute each of the necessary executable commands so as to complete the user command;

In some such embodiments, each robot control unit can be connected to the cloud-based robotic intelligence engine through a visitor-based network (VBN) 220 utilizing a captive portal.

In this instance, each robot can be connected to a private network in the form of a visitor-based network by adding an intermediate server generally termed a "VBN gateway." The function of the VBN Gateway is to provide a necessary layer of management between public users and the Internet router to enable a plug and play connection for visitors, in this case a robot in a particular network connected location, which can be wirelessly connected or network wired to the system.

In the current application, robots can be permitted access the available network services with little or no configuration on their local machines which can be achieved by providing a second layer connection between the robot and the VBN gateway. The robot control unit can then be provided access to the VBN gateways by providing provide DHCP and Proxy ARP so as to allow the robot to connect to the network with no IP address configuration required. A captive portal can then be implemented to allow for a variety of functions including, billing or authentication and acceptance of terms and conditions. Once the user successfully meets the criteria in the captive portal, the VBN gateway then allows the user's traffic to be routed through to the cloud-based robotic intelligence engine.

In some such embodiments, the processor of the cloud-based robotic intelligence engine can be configured to generate a virtual reality environmental setting reflecting the detected environmental parameters received from the robot control unit of a particular robot. Utilizing the virtual reality environment, a computer-generated representation of the robot can then be deployed in the virtual reality setting and completion of the user command can be determined or not. In some instances, various mapped courses of action can be tested in the virtual reality environment and a successful path can either be determined by the processor or selected by the human operator. In some embodiments the human operator can be permitted to select an initial attempt by the virtual representation of the robot as a template for generating their own customized set of executable commands requiring only slight modification to achieve an optimal result.

In some such embodiments, the processor of the cloud-based robotic intelligence engine can be configured to generate and run a simulation of the plurality of executable commands required for the robot to comply with the particular user command within the virtual reality environmental setting reflecting the detected environmental parameters received from the robot control unit of a particular robot.

In some such embodiments, the human user can be prompted to provide an input regarding the plurality of executable commands required for the robot to comply with the particular user command and deploying the plurality of executable commands within the virtual reality environmental setting reflecting the detected environmental parameters received from the robot control unit of a particular robot.

In some such embodiments, upon successfully completing the particular user command in the virtual environment, the processor can then be configured to transmit the plurality of executable commands to the particular robot control unit and wherein the plurality of executable commands are then executed by the robot control associated with the particular robot.

For example, upon review by the human user, and given a robot task of moving a half-full glass of milk from the table to the counter. The system may initially generate a set of executable commands, which upon review shows that the commands result in failure, but only due to a single omitted motion, or constraint, such as the orientation of the grasped glass during transport, or the movement of an appendage through a constraint, such as the user, or the edge of the counter. The user can then modify the actions to properly orient the glass during transport, or re-route certain movements with respect to the parameters. Once properly modified, the system can re-try in the virtual environment for verification, then finally relay the set of executable commands to the RCU for proper deployment in the real environment.

In some such embodiments, each robot control unit can be provided with a user input interface configured to receive direct user input regarding user commands and receive input regarding satisfaction of said commands. For example, a touchscreen could be utilized to receive input from the user, display command options, clarifying questions, and receive appropriate feedback, etc.

In some such embodiments, the human augmented robotics intelligence operation system can further include a developer portal, wherein the developer portal can be configured to receive packets containing one or more executable commands for the one or more articulating joints configured to cause a particular robot to perform a predetermined sub-task, wherein a plurality of packets and subtasks are retained in a data storage, which can be provided in a cloud platform, the data storage 114 including one or more historical databases, and wherein the processor is configured to determine a plurality of appropriate packets and chain the packets together to execute a user command.

In some such embodiments, the processor 118 of the cloud-based robotic intelligence engine 122 can be utilized to access a plurality of external databases and extract one or more executable commands for the one or more articulating joints configured to cause a particular robot to perform a predetermined sub-task from at least one external database.

In some instances, the manufacturers of a particular robot may provide files regarding command sequences for particular motions, which data can be utilized in the historical database for future use. However, initial development may lack potential movement sequences which could be utilized in particular operations. In this manner, the system can be provided with a developer portal in which a user may access the portal and run experimental sequences on a particular robot in a virtual reality environment so as to provide additional training data and potential executable command sequences for use by the cloud-based AI system. In some instances, the operators in the human operation center can be utilized to review the operations and approve the sequences for use in the AI databases.

In some embodiments, the system can break down a complete mapped sequence of executable commands into subsets of a task. For example, the overarching user command may be: "robot, make me a cup of coffee." This task may require movement of the robot from a cupboard to retrieve a mug, movement from the mug to the coffee maker, retrieval of sweeteners, various grasping and releasing scenarios between a coffee container and the mug, etc. In this case, each operation can be classified as a sub task, grasping a mug, grasping a handle, etc. which involve the use of fingers and wrist, arm motions which may move an elbow, wrist, or shoulder, movement of the robot completely which can be achieved through legs or rollers, etc. In some instances, various tasks may have common subtasks to other tasks, wherein each sub-task can be retrieved and executed by a particular robot as necessary.

In some instances, in order to reduce computational load, the system may disregard a determination of a potential optimal operation in lieu of a known successful operation. An example can illustrate this point, say a robot has been given a command to retrieve a pen, which is a cylindrical object. The grasping function in this situation really pertains to a particular orientation of the wrist to place the fingers into proper alignment, closing the fingers, then rotating an elbow or a wrist to elevate the pen. In contrast, the grasping function may be similar to the command to retrieve a drinking glass, however, in some instances the retrieval of the drinking glass may include scenarios in which the drinking glass contains a liquid. Where the orientation of the pen during transport and lifting is arbitrary, the orientation of the drinking glass may be important. In such an instance the system can be configured to treat the pen similar to the drinking glass wherein the central axis is maintained or moved to be perpendicular to the gravitational force such that the system need only retrieve a sub-command relating to a cylindrical object, rather than make a differentiation between types of cylindrical objects so as to save computational requirements and complexity of the system.

In some such embodiments, the human augmented robotics intelligence operation system can further include a streaming analytics platform for receiving data from the one or more environmental sensors, the streaming analytics platform being configured to analyze the raw received data and save a filtered set of clean data on the historical database pertaining to the robot's ambient environment.

For purposes of example, the streaming analytics platform can include Apache Flink™, Spark™, Kafka™, etc. The streaming analytics platforms can analyze the data being received from the plurality of sensors provided on each robot continuously so as to allow the robot and cloud-based AI platform to make decisions based on what is actively occurring in each robot's particular immediate environment.

In some embodiments the streaming platform can be recurring batch-oriented system. Such systems can be hybrid streaming systems which are constantly analyzing all of the data received from the robot in real time, but only export pertinent information for inclusion in the historical databases. This is different from many standalone data streaming services, which often do not save their data to permanent storage, as the whole point of streaming is not to keep data in memory but instead is to use the current data right now. There's no reason to write it to storage as you want to analyze current data. However, to allow AI to do deep learning methods in order to improve reliability and increase future success, this data can also be filtered and various correlations between environmental parameters and actions taken in such situations with regard to following particular commands can be configured to be saved.

Additionally, while various robots may have varying degrees of complexity and varying functionalities which include different placement of articulating joints, many of these robotic systems may also have very similar sub constructions. For example, one robot may merely include a single arm having an articulating hand supported by a forearm and upper arm rotating on a synthetic shoulder. However, such a robot may be implemented on a humanoid robot also capable of environmental motion. In such instances the system can then break down the various motions saved in the historical database with regard to the arm robot and implement the potential executable commands to the arm motions of the humanoid robot. It will be further appreciated that the body of the humanoid robot may merely be introduced as an environmental restriction parameter with regard to the shoulder and arm of the robot. This is significant because while the arm of the single arm may have 360 degrees of free rotational motion, such motion may interfere with the body or head of the humanoid robot and potentially cause damage, or at least failure to complete the commanded task.

The system can then be configured to determine the differences and similarities between robots and choose executable commands with high likelihoods of success between various robots having similar features. By way of example, various robots may have different "hand" portions or grasping mechanisms, however, the grasping mechanism may be provided about a standard forearm and elbow. In such cases the executable commands selected by the system can include grasper specific sub-commands, but then because the wrist, forearm, and elbow are similar, the system can select those commands from a known set of successful operations for performing the same or similar tasks.

This allows the system to then take data in whatever format it is in for a particular robot, join different sets, reduce the data to key-value pairs (map), and then run calculations on adjacent pairs to produce final calculated values with regard to the appropriateness of a particular action.

In some instances, the system can be configured to divide streaming data into discrete chunks of data called micro batches. Then it repeats the step in a continuous loop. The system can then create a checkpoint on the streaming data to break it into finite sets. Incoming data is not lost when taking this checkpoint as it preserved in a queue in both products. The cloud-based system can then be configured to analyze the static data sets.

Alternatively the system can instead utilize Discretized Streams (DStreams) for streaming data and Resilient distributed dataset (RDD) for batch data. In other words, the system can be configured to open a file and never closes it. That is like keeping a TCP socket open, which is how syslog works. Batch programs, on the other hand, open a file, process it, then close it. In some such embodiments, the term creating a checkpoint means that the system notates where it has left off and then resumes from that point. Then system can run a type of iteration that lets their machine language algorithms run faster than batch systems in many situations. That is not insignificant as ML routines can take many hours to run.

In some embodiments the system can be configured to page out to disk when memory is full.

The streaming platforms can then be configured to feed the current data and historical data locations to the machine learning algorithms and make them run over a distributed architecture, i.e. the cloud.

In some such embodiments, the processor of the cloud-based robotic intelligence engine can be configured to utilize a deep learning neural network to recognize one or more similar past environmental scenarios and recognize one or more historical actions which have resulted in successful execution of a user command, and subsequently generate a set of executable commands which will have an increased probabilistic likelihood of success in a determined real-time environment.

For example, utilizing AI, the robot can recognize the approach of a human, i.e. a potential user, who may wish to issue the robot a command utilizing various optical, thermal, or other sensors. Upon recognition of an approaching human, the robot can then utilize various microphones to listen for and receive a verbal command, filtering out ambient noise, and determine commands given by the human, or in other embodiments the RCU can be provided with a user input interface with which the user can interact to issue commands. The information received from the sensors or input interface can be transmitted over a network to the cloud-based server which can take the received raw data, such as audio waveforms from the human, perform speech-to-text operations, utilize the extracted text to ultimately determine a match between the commands embedded in the received data and one or more previously performed actions saved in an action database provided on the cloud-based server. The cloud intelligence platform or cloud-based processing capability can then be utilized to map a series of operations required to complete the received commands.

In some embodiments, the user input interface can include a display which can also be provided on the robot wherein the human issuing commands can be provided with information and utilize the input interface to provide confirmation of commands or in some instances provide input with regard to clarifying questions with regard to the user's issued command. It will also be appreciated that the human can also be permitted to interact directly with the display and user input interface to input text commands rather than requiring verbal commands.

The system can then make a determination utilizing Bayesian tables or some other probabilistic algorithm to make a determination regarding the probability of successfully completing the task. In situations where the probability of success is above a particular threshold, the robot will make an attempt to perform the task. However, in situations where the probability of success is below a predetermined threshold, the situation can trigger a switch which will then request human intervention, which would allow the robot to contact a human intelligence AI training center or a human operation center having human controllers or users which can take direct control of the robot. In this human intelligence AI training center, a human can then assume control of the robot and remotely control the robot over a network to complete the task.

In such situations, the robot can utilize various positional and velocity sensors provided in each articulating joint and also utilize the environmental sensors so as to simultaneously track the robot's environment and the various human initiated movements of the robot required in order to achieve a successful completion of the commanded task. Each of the specific sequential movements of each articulating joint required to navigate through the current environment and complete the issued command or task can then be saved in a historical database for comparison with future similar command strings and environments, such that the system can build a robust database and map similar motions in similar environments such that eventually the system can map a motion sequence having a high probability of success in when receiving similar future commands in similar future environmental situations. These service robots can be ordered around to do works for people.

It will be appreciated that deep neural networks (DNN) are artificial neural networks (ANN) having multiple layers between the input and output layers. The DNN finds the correct mathematical manipulation to turn the input into the output, in this case commands for a robot to complete a task, whether it be a linear relationship or a non-linear relationship. The network moves through the layers, i.e. potential sequential robotic movements, calculating the probability of success for each output. Particularly early on when building historical databases, users can review the results and select whether the sequence resulted in success, whether a particular sequence will result in success, or even which probabilities the network should display and return the proposed label. Each mathematical manipulation as such is considered a layer, and complex DNN have many layers, hence the name "deep" networks.

DNNs can model complex non-linear relationships. DNN architectures generate compositional models where the object is expressed as a layered composition of primitives, which can in this case be individual movements of particular articulating joints of a given robot at different times through the projected sequence, rates of motion, relative motion between joints, etc. The extra layers enable composition of features from lower layers, and ultimately allows for modeling complex data, for example projections of robot limbs in a generated map based on the robot's particular environment, etc.

DNNs are typically feedforward networks in which data flows from the input layer to the output layer without looping back. At first, the DNN creates a map of virtual neurons and assigns random numerical values, or "weights," to connections between them. The weights and inputs are multiplied and return an output between 0 and 1. If the network did not accurately recognize a particular pattern, an algorithm would adjust the weights. That way the algorithm can make certain parameters more influential, until it determines the correct mathematical manipulation to fully process the data. Recurrent neural networks (RNNs), in which data can flow in any direction, and can be used for applications involving language modeling.

Convolutional deep neural networks (CNNs) are often used in computer vision. CNNs also have been applied to acoustic modeling for automatic speech recognition (ASR). As with ANNs, many issues can arise with naively trained DNNs. Two common issues are overfitting and computation time. Finally, data can be augmented via methods such as cropping and rotating such that smaller training sets can be increased in size to reduce the chances of overfitting.

The DNNs as contemplated herein can be bootstrapped utilizing a plurality of training parameters, such as number of robotic joints, any limits to their potential arcs of motion, the limbs connecting the articulating joints, their acceleration and force profiles can all be parameters. Another level can include acceptable levels of force for a given task, acceptable error rates, acceptable maximum and minimum speeds, acceptable number of interferences or intercepts of robots with environmental obstacles, etc. Some layers can also include various required learning rates, and initial weights for various actions in determining failure or success.

Large processing capabilities of many-core architectures which can be achieved by moving the processing to the cloud can significantly increase the speed of training as the processing power can essentially be limitless.

Figure 7:
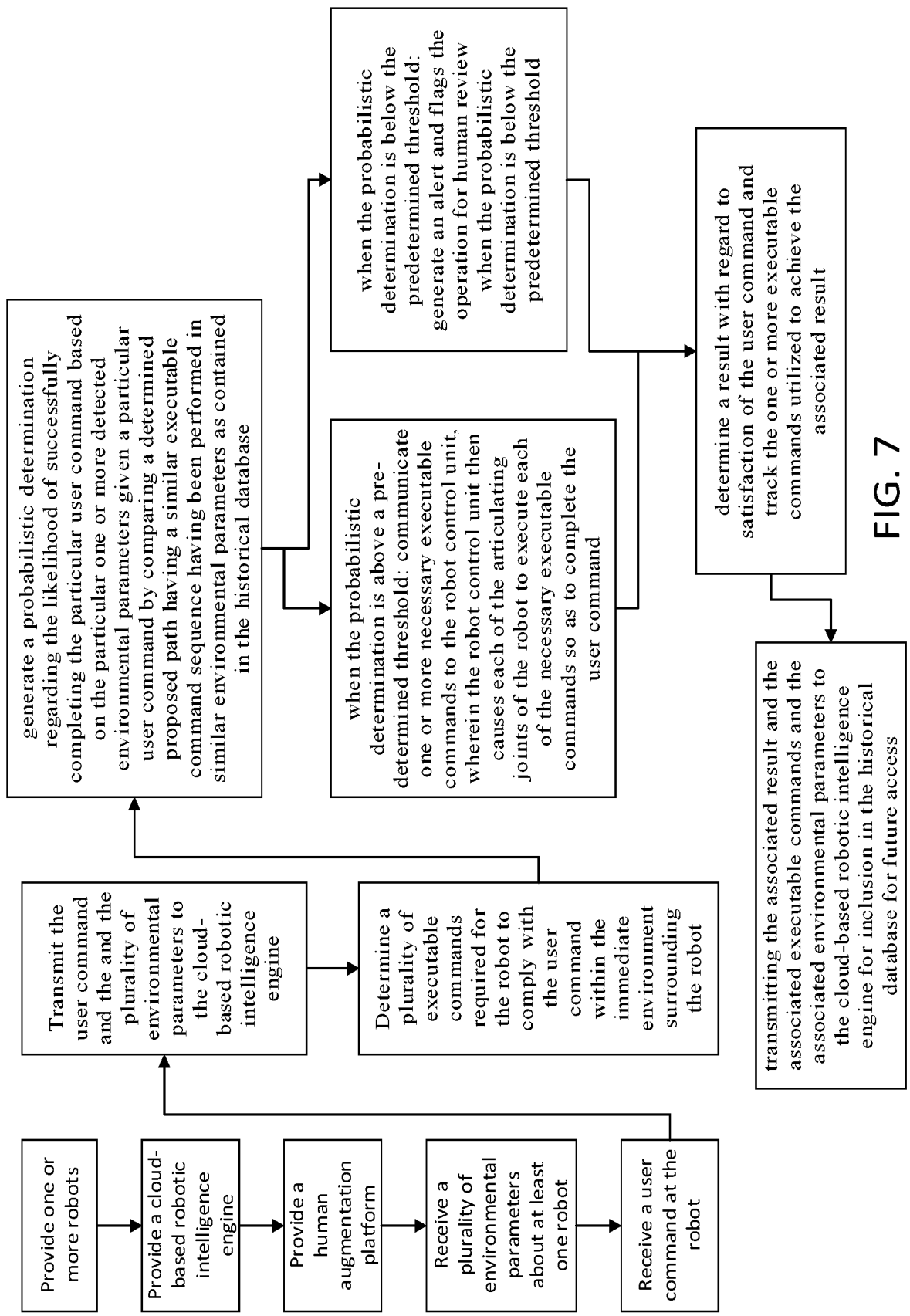
FIG. 7 illustrates an exemplary method flow chart for a method of utilizing the human augmented robotics intelligence operation system being illustrative of various concepts of the present disclosure.
Figure 8:
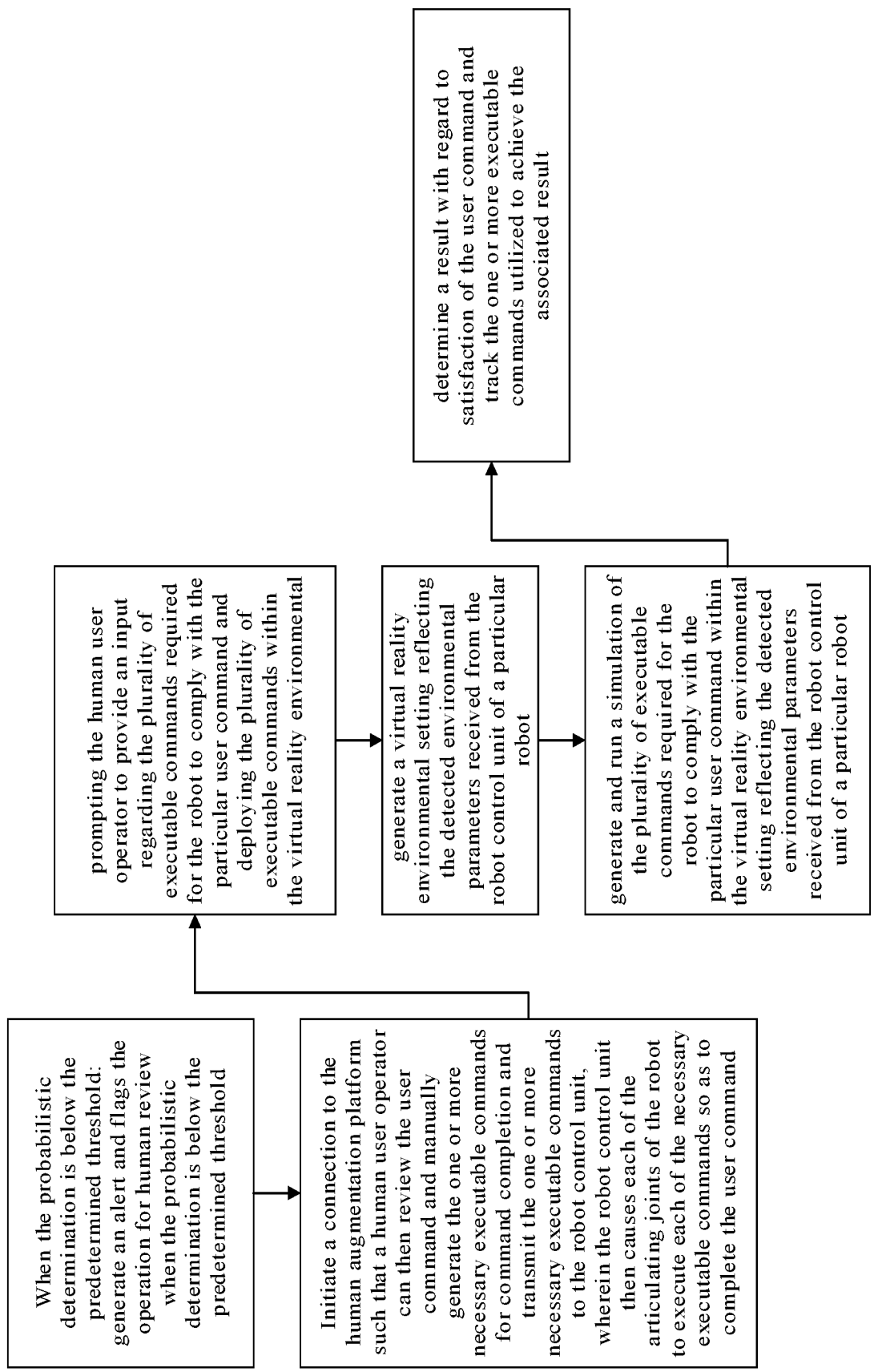
FIG. 8 illustrates an exemplary method flow chart for various additional method steps which can be utilized in the method of utilizing the human augmented robotics intelligence operation system of FIG. 7 being illustrative of various concepts of the present disclosure.
Figure 9:
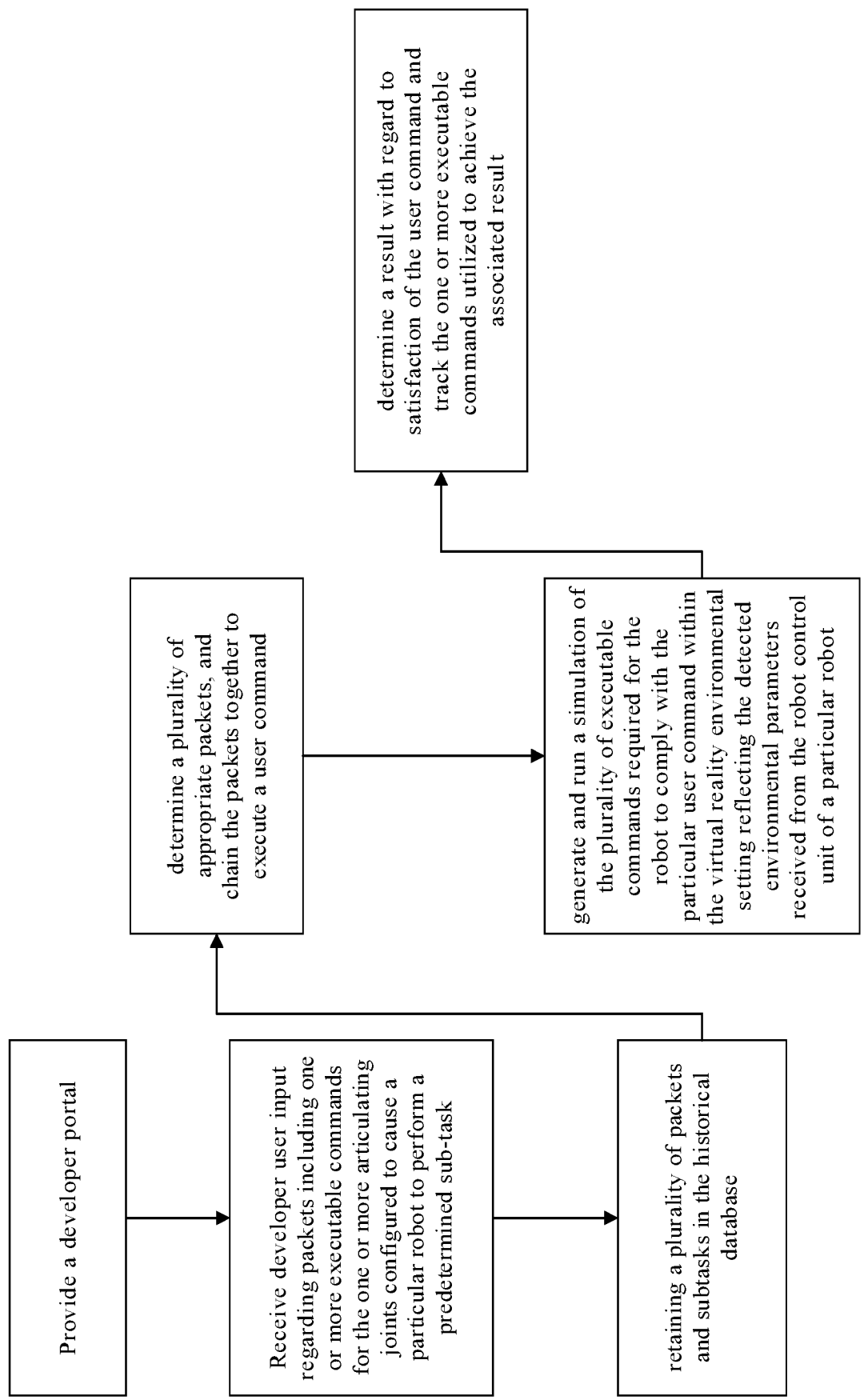
FIG. 9 illustrates yet another exemplary method flow chart for various additional method steps which can be utilized in the method of utilizing the human augmented robotics intelligence operation system of FIG. 7 being illustrative of various concepts of the present disclosure.

Also contemplated herein, and as shown in FIGS. 7-9, is a method of providing complex robotic control to a plurality of robots, the method can include various sub-processes or steps which can include: providing a plurality of robots, each robot having: a plurality of sensors; and one or more articulating joints being capable of manipulating the robot in a manner to perform the user command; the method further including providing a robot control unit to each robot, each robot control unit having an associated communication module and a processor; providing a cloud-based robotic intelligence engine, the cloud-based robotic having: a communication module configured to receive data from a plurality of robot control units from each of the plurality of robots; a historical database containing a plurality of historical actions and associated environmental parameters; and a processor;

The method of providing complex robotic control to a plurality of robots can also including the steps of: providing a human augmentation platform, the human augmentation platform comprising: a communication module configured to receive data from the cloud-based robotic intelligence engine; a human service operator center having one or more human user operators;

The method of providing complex robotic control to a plurality of robots can also including the steps of: receiving a plurality of environmental parameters utilizing the plurality of sensors provided on the robot; receiving a user command at the robot; transmitting the user command and the and the plurality of environmental parameters to the cloud-based robotic intelligence engine; utilizing the processor of the cloud-based robotic intelligence engine to determine a plurality of executable commands required for the robot to comply with the user command within the immediate environment surrounding the robot; and utilizing the processor of the cloud-based robotic intelligence engine to generate a probabilistic determination regarding the likelihood of successfully completing the particular user command based on the particular one or more detected environmental parameters given a particular user command by comparing a determined proposed path having a similar executable command sequence having been performed in similar environmental parameters as contained in the historical database.

The method of providing complex robotic control to a plurality of robots can also include the steps of: utilizing the processor to communicate one or more necessary executable commands to the robot control unit, wherein the robot control unit then causes each of the articulating joints of the robot to execute each of the necessary executable commands so as to complete the user command when the probabilistic determination is above a pre-determined threshold; utilizing the processor to generate an alert and flags the operation for human review when the probabilistic determination is below the predetermined threshold; determining a result with regard to satisfaction of the user command and track the one or more executable commands utilized to achieve the associated result; and transmitting the associated result and the associated executable commands and the associated environmental parameters to the cloud-based robotic intelligence engine for inclusion in the historical database for future access.

The method of providing complex robotic control to a plurality of robots can in some embodiments also include the step of: utilizing the processor to initiate a connection to the human augmentation platform such that a human user operator can then review the user command and manually generate the one or more necessary executable commands for command completion and transmit the one or more necessary executable commands to the robot control unit, wherein the robot control unit then causes each of the articulating joints of the robot to execute each of the necessary executable commands so as to complete the user command when the probabilistic determination is below the pre-determined threshold.

The method of providing complex robotic control to a plurality of robots can in some embodiments also include the step of: utilizing the processor of the cloud-based robotic intelligence engine to generate a virtual reality environmental setting reflecting the detected environmental parameters received from the robot control unit of a particular robot.

The method of providing complex robotic control to a plurality of robots can in some embodiments also include the step of: utilizing the processor of the cloud-based robotic intelligence engine to generate and run a simulation of the plurality of executable commands required for the robot to comply with the particular user command within the virtual reality environmental setting reflecting the detected environmental parameters received from the robot control unit of a particular robot.

The method of providing complex robotic control to a plurality of robots can in some embodiments also include the step of: prompting the human user to provide an input regarding the plurality of executable commands required for the robot to comply with the particular user command and deploying the plurality of executable commands within the virtual reality environmental setting reflecting the detected environmental parameters received from the robot control unit of a particular robot.

The method of providing complex robotic control to a plurality of robots can in some embodiments also include the step of: transmitting the plurality of executable commands to the particular robot control unit and wherein the plurality of executable commands are then executed by the robot control associated with the particular robot upon successfully completing the particular user command in the virtual environment.

The method of providing complex robotic control to a plurality of robots can in some embodiments also include the step of: providing each robot control unit with a user input interface configured to receive direct user input regarding user commands and receive input regarding satisfaction of said commands.

The method of providing complex robotic control to a plurality of robots can in some embodiments also include the steps of: providing a developer portal; utilizing the developer portal to receive packets containing one or more executable commands for the one or more articulating joints configured to cause a particular robot to perform a predetermined sub-task; retaining a plurality of packets and subtasks in the historical database; utilizing the processor to determine a plurality of appropriate packets; and chaining the packets together to execute a user command.

For example, users may employ these robots, or $3^{rd}$ party companies with robots operating on the cloud-based AI robot control platform may wish to continually increase the quality of performance of their robots running thereon. It has further been recognized that it would be nearly impossible to provide training data on every potential motion the robot can perform in every potential environmental setting.

As such, the developer portal can provide a platform in which individuals or companies who wish to improve performance may propose executable command sequences or sub-sequences with particular environmental parameters so as to make the robot more efficient.

In some instances, the system can deploy these proposed command sequences within a virtual reality environment and determine whether the command sequence will result in successful completion of the command and then include them for local control of a particular developer owned robot or for global inclusion for use across all applicable robotic platforms. In some instances, the proposed commands can be reviewed by the human service operation center prior to inclusion in any historical databases.

The method of providing complex robotic control to a plurality of robots can in some embodiments also include the step of: utilizing the processor of the cloud-based robotic intelligence engine to access a plurality of external databases and extract one or more executable commands; wherein the one or more executable commands contain information for the one or more articulating joints configured to cause a particular robot to perform a predetermined sub-task from at least one external database.

The method of providing complex robotic control to a plurality of robots can in some embodiments also include the step of: providing a streaming analytics platform; and utilizing the streaming analytics platform to receive data from the one or more environmental sensors, the streaming analytics platform being configured to analyze the raw received data and save a filtered set of clean data on the historical database pertaining to the robot's ambient environment.

The method of providing complex robotic control to a plurality of robots can in some embodiments also include the steps of: utilizing a deep learning neural network to recognize one or more similar past environmental scenarios and recognize one or more historical actions which have resulted in successful execution of a user command; and generating a set of executable commands which will have an increased probabilistic likelihood of success in a determined real-time environment.

In some alternative embodiments, other types of neural networks with more straightforward and convergent training algorithms can be utilized, such as CMAC (cerebellar model articulation controller).

This platform contemplated herein combines AI (Artificial Intelligence) and HI (Human Intelligence) in a unique way to control service robots that accomplishes service tasks and dynamic deep learning in real-time.

Essentially, as the cloud brain of the cloud robot, there are two parts in the contemplated human augmented robotics intelligence system as contemplated herein, the AI cloud computing part and the HI human assisted operation console. During the normal operation of a cloud robot, by using all available sensing inputs from the robot, the AI part first controls the robot by computing the intended instructions with confidence scores. If the most viable instruction meets the pre-set confidence threshold (such as 85% for conversation, 100% for movement safety), the contemplated human augmented robotics intelligence system as contemplated herein would invoke the instruction and give the robot the intended command. Otherwise, the contemplated human augmented robotics intelligence system as contemplated herein would immediately transfer the robot control to the HI part. A real human operator will step in to assist the cloud robot.

The contemplated human augmented robotics intelligence system AI can then be provided with one or more state-of-the-art cloud computing and deep learning platforms 130, the system can then, in some instances, enable robots with rich AI functionalities (such as auto navigation (SLAM and VSLAM), computer vision (facial recognition, object recognition, and OCR), natural language processing (Chatbot, Q&A), movement and grasping (vision assisted).

In addition, the contemplated human augmented robotics intelligence system as contemplated herein AI is augmented with human augmentation platform that is built with VR/AR enhanced operator console and real-time multimedia data casting platform.

The human operators can then be trained for the skills to assist the service robots in many functions, such as correcting answers in a query, correcting path during robot movement, correcting recognition results of pictures. The system then records human's action as a new data set for AI. Those data are fed back into AI platform to re-train the AI neuro-nets and re-tune knowledge base. Since these data are collected in real-time in actual working environment, the data sets are often more complex and/or noisy than the standard training data sets of stand-alone AI algorithms, such as facial recognition and object recognition APIs of Face++™ and SenseTime™.

The AI capabilities on the contemplated human augmented robotics intelligence system as contemplated herein will continuously grow as the contemplated human augmented robotics intelligence system as contemplated herein constantly collects human augmentation data in real time and helps retrain and retune the AI algorithms and deep-nets.

In some instances, a service robot company may access our chatbot service and their chatbot model will be trained online from Model 0 to Model 1 after a period of online services.

It will be appreciated that in some embodiments, human operators can be utilized so as to provide the oversight for all cloud robot operations and override any AI controls, providing an added level of safety.

In some instances, the system can initiate a training mode for operating against a virtual robot for pre-recorded operational sessions.

In some instances, the contemplated human augmented robotics intelligence system can be established on a heterogeneous cloud computing platform, with large storage capacity and a secured network. In this manner, each time a cloud robot is connected to the contemplated human augmented robotics intelligence system it is authenticated, and the contemplated human augmented robotics intelligence system session is established. Each cloud robot has its own private cloud using a docker container. In this manner, the contemplated human augmented robotics intelligence system can be integrated with multiple big data tools, such as Hadoop™, Spark™, Storm™, and combined with diverse machine learning platform such as Tensorflow™ MXNet™ Torch™ Caffe™ Theano™ PaddlePaddle™ etc.

The contemplated human augmented robotics intelligence system can thus be designed to support millions of concurrent queries of AI services. The goal is to support a large number of various cloud robots in a single the contemplated human augmented robotics intelligence system.

In addition, the contemplated human augmented robotics intelligence system can be integrated with crawler/search engine/data mining technologies for collecting, mining, acquiring useful data specialized for robotic services/operation. By collaborating with universities, research institutes, and $3^{rd}$ parties to obtain useful raw data, the system can utilize trained AI engineers/professionals who can work in conjunction with Big Data Platform to purge, annotate, and inject data into DNN/CNN/RNN for training and optimizing our AI models. The data platforms 126 of the contemplated system can be configured such that it will continuously provide the foundation for our AI knowledge base storage, sorting, mining, annotation, and optimization. Ultimately, the contemplated human augmented robotics intelligence system would nurture an AI platform which can automatically grow its knowledge base in many vertical domains and make cloud robots much more intelligent than ever before.

However, AI services may not always be accurate for certain circumstances, therefore human intervention (or Human Intelligence) can be engaged in situations where the AI may have failed. As such, the contemplated human augmented robotics intelligence system can implement an adaptive AI-confidence-index threshold setting and event driving system combined with a sophisticated data streaming mechanism. This mechanism is then connected to a machine/human augmentation paradigm which is optimized for switching between AI and HI. The AI/HI hybrid platform works particularly well through examining the current AI technologies, scrutinizing customer requirement and practicing in industries like banking, real estate and security surveillance.

In some instances, for example, a reception service robot may need to identify customers, which may involve facial recognition, then the robot may need to provide an answer to a question, and guide customer to proper area for business transaction and services. Reception robots often work in retail shops, such as bank branch offices and mobile phone stores. The face recognition of the current system can achieve a high degree of accuracy utilizing an LFW database (Labeled Faces in the Wild).

In an exemplary banking scenario, the human augmented robotics intelligence system as contemplated herein would build its own knowledge base along with Bank provided knowledge base and financial related knowledge base acquired over internet to serve customers. In addition, the contemplated human augmented robotics intelligence system as contemplated herein can retrieve customer info from bank operation system, when allowed, conduct Big Data analysis, and would thus be enabled to answer many financial related questions and ultimately provide consulting services.

In this case, an NLP for use with the contemplated human augmented robotics intelligence system can be specifically trained in Bank consulting service domain.

As RSR communicates with a customer via the NLP in the cloud portion of the human augmented robotics intelligence system as contemplated herein, the contemplated human augmented robotics intelligence system can then analyze the semantics of customer questions by deep learning neural network, use the right AI model, and hence provide a correct answer in real time.

If customer's question exceeds the scope of AI knowledge base, or AI feedback is below confidence threshold, the contemplated human augmented robotics intelligence system as contemplated herein will switch to human for assistance.

In another exemplary situation, such as in a deployment of a security patrol robots (SPR), the robot can be employed to independently patrol the community. It can automatically identify the residents or visitors utilizing facial recognition, locate and monitor vehicle license plates, determine vehicle types, record locations of encounters with recognized items and other information. In each case, the SPR can interact with people and also inform the security guards if there is suspicion.

In actual work, the SPR basically replaces a patrolling security guard. The SPR must cruise along a pre-defined route and stop and go. It must also inspect the various places for abnormal conditions. In order to accomplish these tasks, the contemplated human augmented robotics intelligence system as contemplated herein can be utilized to provide precision navigation by leveraging SLAM (LIDAR) and VSLAM (Stereo Cameras) and combining that with IMU.

In order to achieve better inspection capability, the contemplated human augmented robotics intelligence system can also acquire environmental data and generate high precision three-dimensional environment mapping data through the fusion of various heterogeneous sensors, and then complete or generate a three-dimensional semantic map. The contemplated human augmented robotics intelligence system can then aid the SPR in road detection, path planning, and site inspections.

In some instances, the cloud storage can save environmental parameters regarding routes and then compare differences so as to allow the SPR to investigate differences with heightened scrutiny.

The SPR utilizes the face recognition function of the contemplated human augmented robotics intelligence system to differentiate residents and visitor. If instructed, the SPR can follow the suspicious person and records the suspicious person's image and activities. For example, community residents may have their faces mapped and entered into a historical database, wherein guests can also be required to sign in and allow a facial scan for temporary input into the database. Then the SPR can then compare determined facial scans with the database so as to allow for determining the presence of an unapproved person and then investigate with a higher scrutiny when an unidentifiable person is encountered.

In some instances, the SPR can also use an OCR function of the contemplated human augmented robotics intelligence system to identify automobile license plate to distinguish residents' or visitors' automobiles.

In order to protect community safety, the SPR can also use human movement analysis technology on the contemplated human augmented robotics intelligence system as contemplated herein to monitor and alarm on abnormal human behaviors, such as climbing walls, jumping on windows and etc.

The contemplated human augmented robotics intelligence system as contemplated herein controls the cloud robot during the entire time of the operations. A complete set of operational scenarios are developed for each task. Each scenario can then include vision interaction, speech interaction, gesture and movement interactions. SLAM, VSLAM, OCR, NLP, CNN, RNN, R-CNN, facial recognition, object recognition, and other AI technologies can then be used in the development of AI for use with the contemplated human augmented robotics intelligence system as contemplated.

It will then be further understood that any verbal commands can be run through ASR and OCR so as to generate text strings associated with the verbal command. These text strings can then be tokenized and compared with indexed tokens relating to commands previously completed by robots controlled by the cloud-based robotic intelligence system and their associated related executable commands used to complete those commands. The tokens can represent words or phrases which can then be compared with other previously completed commands which have been similarly tokenized.

In some embodiments, the command itself can be tokenized, or in other words the command can be translated into text and broken up into a sequence of strings which can include various pieces such as words, keywords, phrases, symbols and other elements commonly referred to as tokens. Tokens can be individual words, phrases or even whole sentences. Additionally, the tokenization can break the sentences into component parts so as to separate verbs, adverbs, nouns etc., so as to better recognize case tenses, and thus have a better chance of recognizing the proper context of the question. Further, in the process of tokenization, some characters like punctuation marks are discarded as well as conjunctive words which do not add value to the specific tokens. The tokens are then used as the input for the searching and matching process of historical databases or previously generated trainings, etc. so as to find matches. The tokens of the command can then be associated with particular answers within the database to later increase searching accuracy based on similar tokens.

In yet additional aspects, the tokens can be compared to similar terms, similar to a thesaurus in order to increase the likelihood of recognizing commands as well as increasing the likelihood of recognizing similar commands in the historical database for purposes of comparison.

In situations where the robot is unable to find appropriate previous commands in the historical database, or wherein the matches are below a certain confidence threshold with regard to potential matches, the system can then be utilized to prompt a user at the robot's location to provide clarification or present clarifications utilizing a user interface 216 provided about the robot. Such a user interface can include a display screen and a touch or other input interface, or a speaker which can speak to the user asking the clarifying questions and a microphone for receiving responses. In such instances the system can propose potential terms or similar commands and thus aid the user in refining the command. If the system in unable to find a suitable match, the system can then flag the interaction for human intervention, in which case a human operator can then remove the instance from the AI platform and manually control the robot and aid the user in formulating or directing to an appropriate command. The original command can then be tokenized and included in the historical database so as to broaden the particular verbiage that a user may use in issuing a command.

In some embodiments, each robot can include a plurality of peripheral input devices 222 which can include display systems, printers for providing receipts or other readouts, touch panels for receiving input, ID card readers, credit card readers for processing payment for performing a service or task, etc. These peripheral devices could be any number of items which might be necessary for a given robot to perform a particular task in a particular deployment area or atmosphere.

Figure 10:
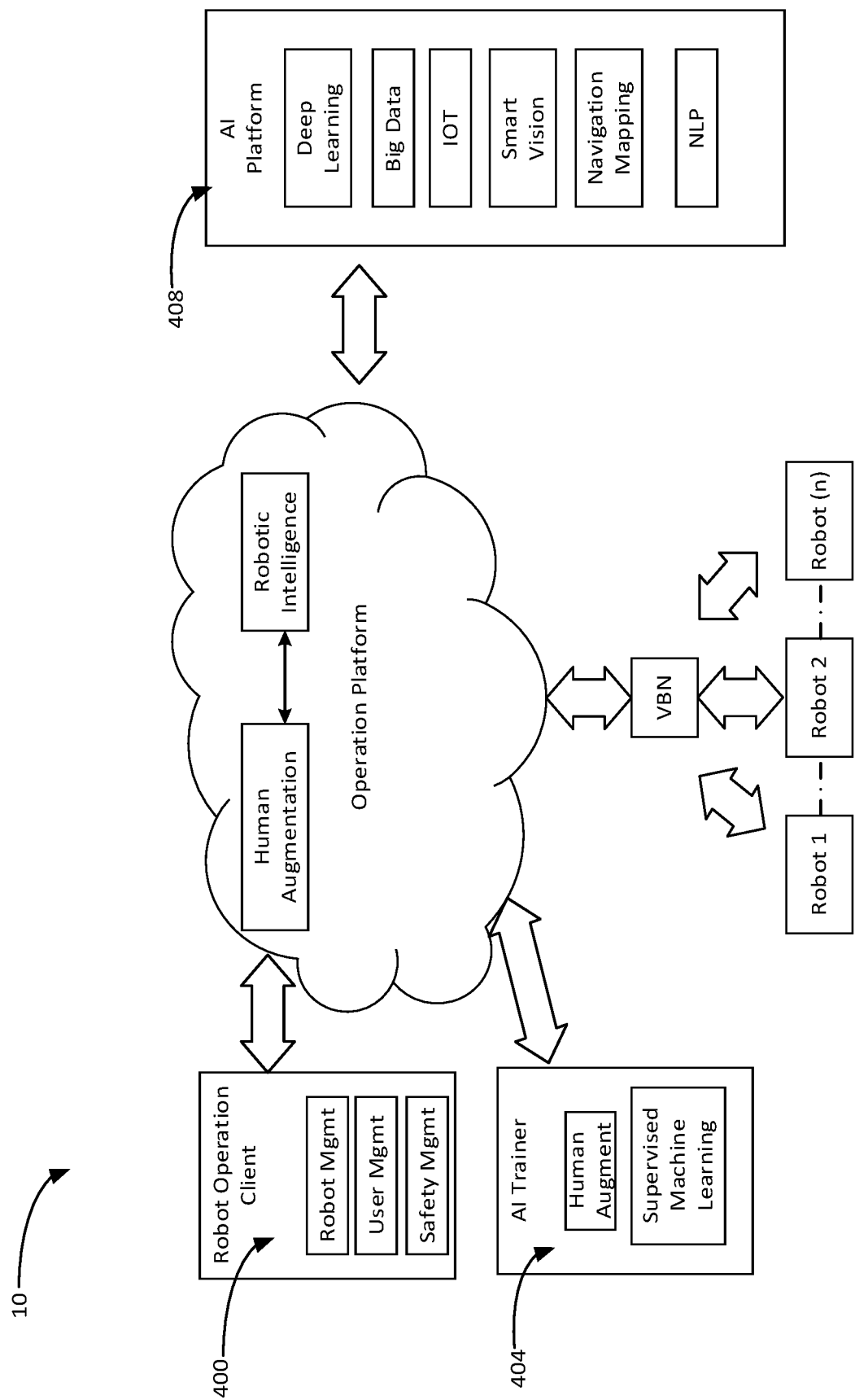
FIG. 10 illustrates another exemplary organizational framework of a human augmented robotics intelligence operation system being illustrative of additional optional features which can be incorporated thereinto.

FIG. 10 another exemplary organizational framework of a human augmented robotics intelligence operation system 10 being illustrative of additional optional features which can be incorporated thereinto such as a robot operation client 400 which can have associated management modules continuously monitoring robot actions, success probabilities and safety concerns. This exemplary framework also illustrates an AI trainer module 404 which can include manual human augmentation input or supervised machine learning wherein the AI is allowed to proceed unassisted but with human oversight with a human operator ready to intervene if the robot begins acting outside of a desired set of actions. Also shown here is an AI platform 408 which can organize various aspects of the AI as particular modules and kernel functions such as the deep learning algorithms, big data access and searching, IOT connectivity, sensor controls such as smart vision, navigation mapping, and NLP.

Figure 11:
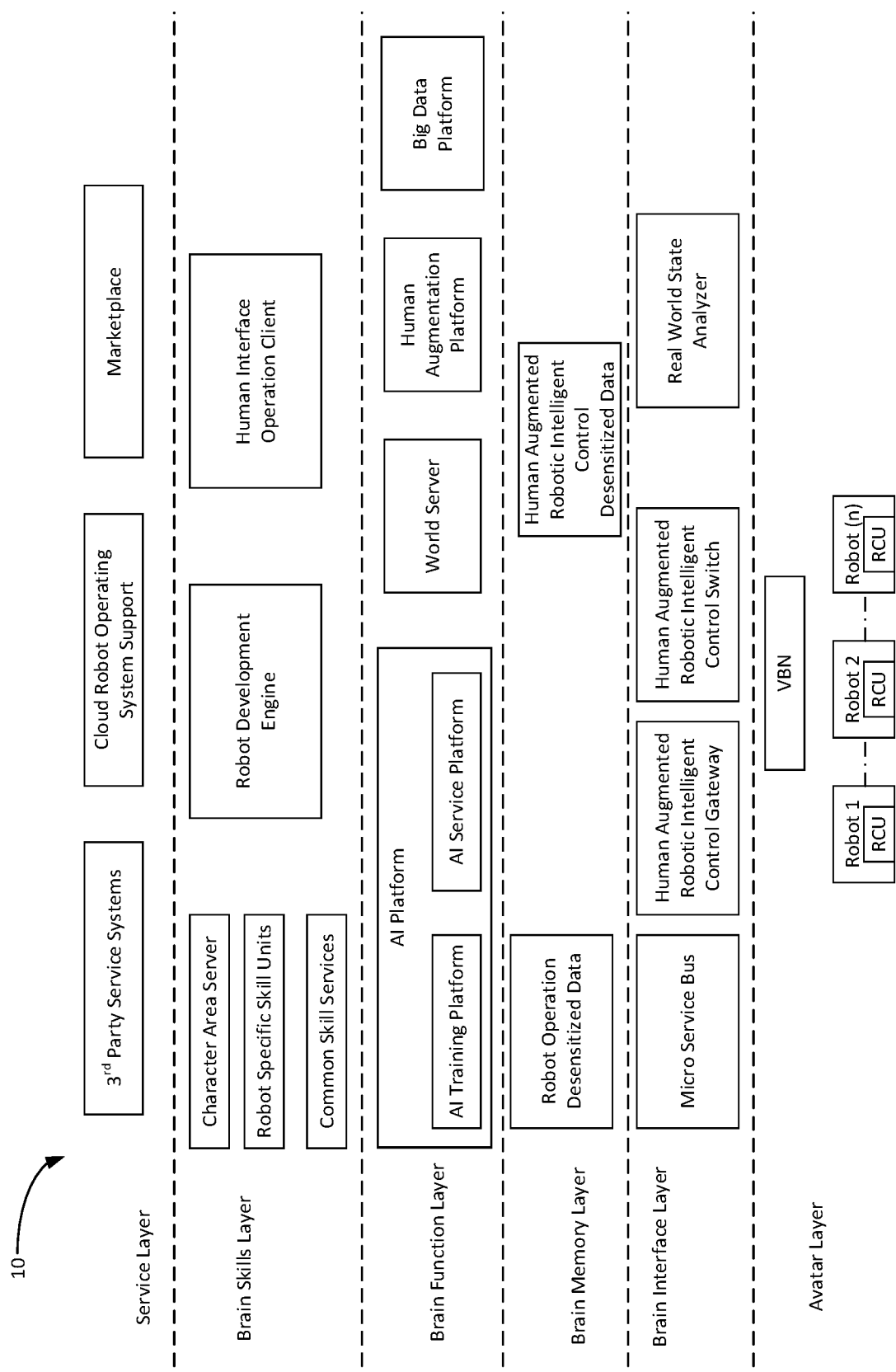
FIG. 11 illustrates another exemplary organizational framework of a human augmented robotics intelligence operation system being illustrative of additional optional features and layers of operation which can be incorporated thereinto.
Figure 12:
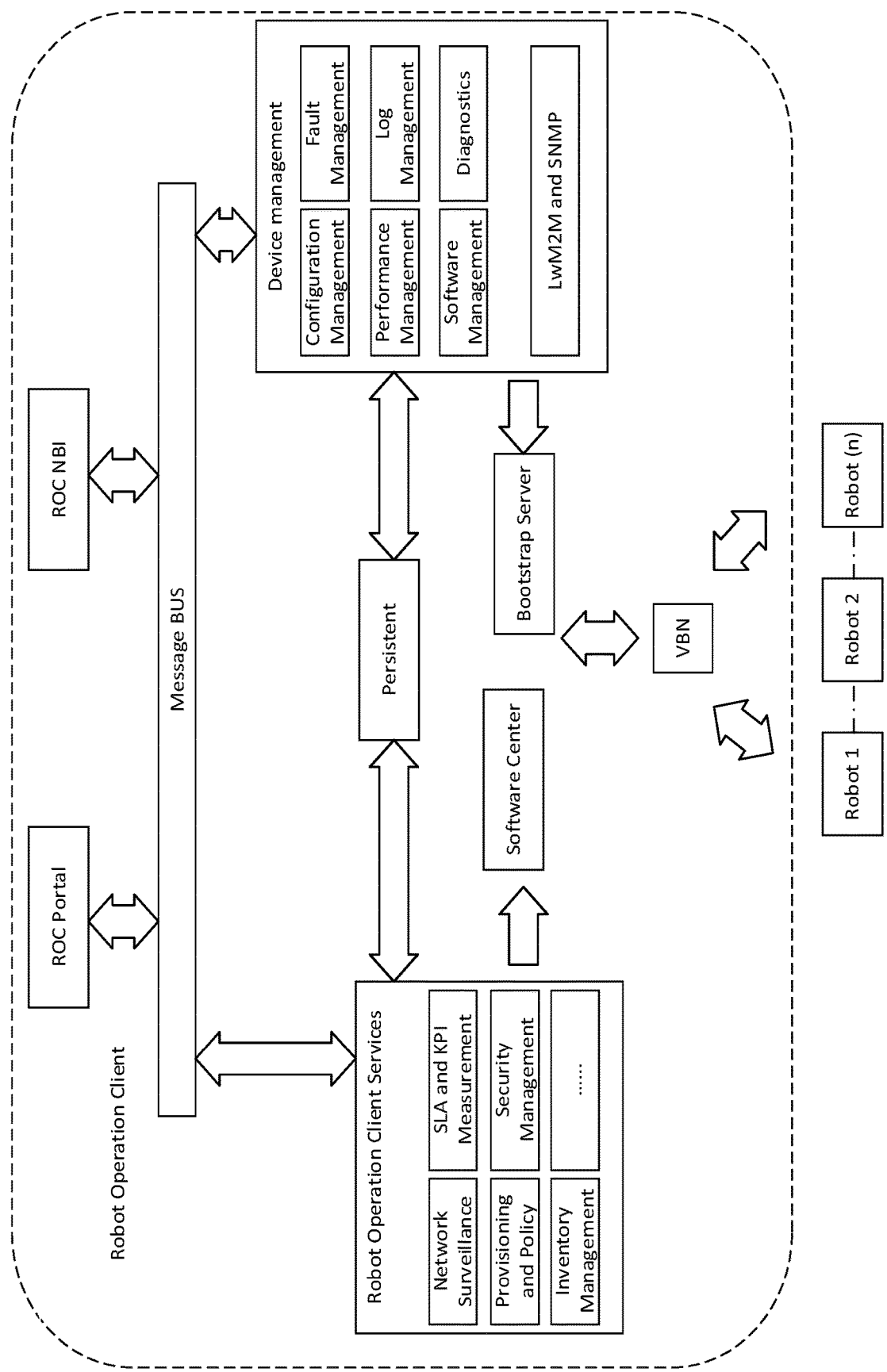
FIG. 12 illustrates an exemplary organizational framework of a robotic operational client which can optionally be implemented into any one of the embodiments of a robotics intelligence operation system disclosed herein.

FIG. 11 illustrates another exemplary organizational framework of a human augmented robotics intelligence operation system being illustrative of additional optional features and layers of operation which can be incorporated and described based on how they relate to different aspects of the artificial intelligence behaviors and characteristics as they parallel to analogous human thinking functions. As illustrated here, the system can be described as having various layers, such as a service layer, which can include $3^{rd}$ party service systems, cloud robot operating system support, a marketplace, etc. The system can also include a Brain Skills Layer which can include a character area server, various robot specific skill units, common skill service units which may have common skills across multiple robots, a robot development engine, and a human interface operation client. The system can then include a Brain Function layer having an AI platform with an AI training platform and an AI service platform, the brain function layer can then include a world server, a human augmentation platform and a big data platform. The system can then include a brain memory layer with a database having Robot Operation specific desensitized data and a database with Human Augmented Robotic Intelligent Control desensitized data specific to human received commands specific to particular operations FIG. 12 illustrates an exemplary organizational framework of a robotic operational client which, as illustrated, can show at least one connection framework between a given robot and the robot operation client or module.

Figure 13:
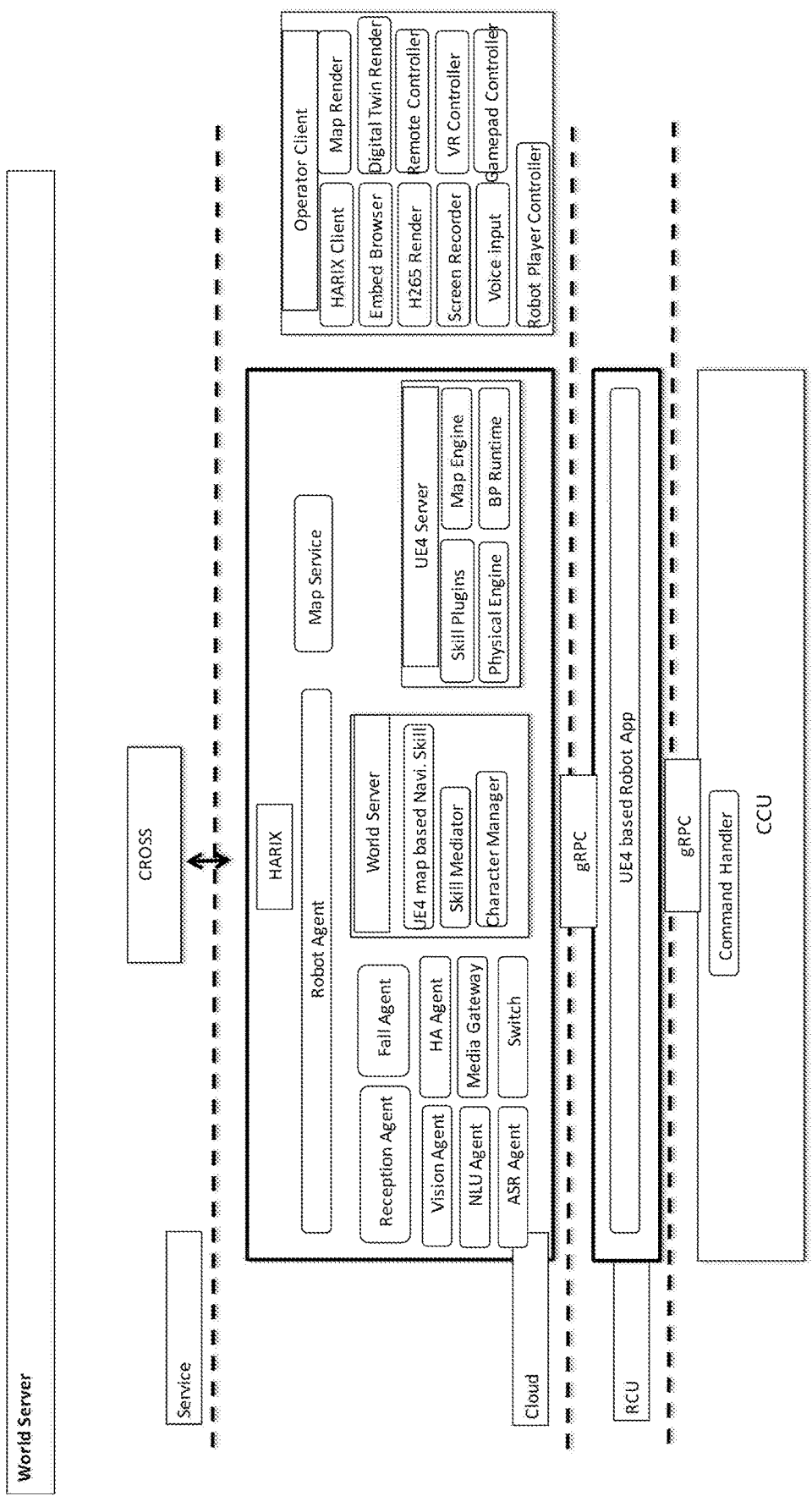
FIG. 13 illustrates an exemplary organizational framework of a connection server which can optionally be implemented into any one of the embodiments of a robotics intelligence operation system disclosed herein.

FIG. 13 illustrates an exemplary organizational framework of a connection server which can optionally be implemented into any one of the embodiments of a robotics intelligence operation system disclosed herein. As shown here the server can utilize an RCU local to a particular robot, wherein the RCU can be running an application tailored to a particular robot, for example a UE4 application.

Figure 14:
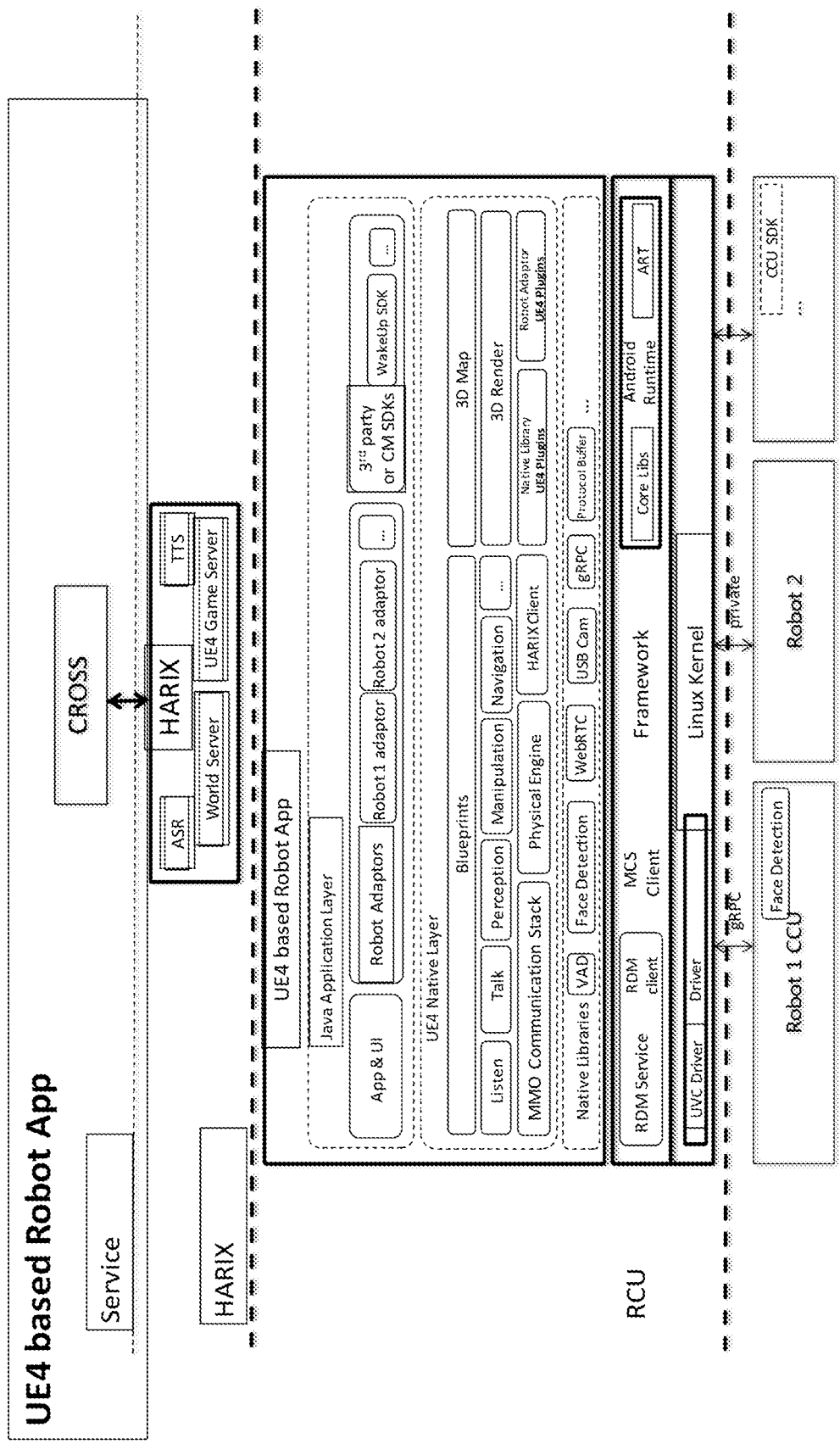
FIG. 14 illustrates an exemplary organizational framework of a real-time development control application which can optionally be implemented into any one of the embodiments of a robotics intelligence operation system disclosed herein.

FIG. 14 illustrates an exemplary organizational framework of a real-time development control application which can optionally be implemented into any one of the embodiments of a robotics intelligence operation systems or RCU's disclosed herein. It will be understood that UE4 only represents an exemplary platform for designing and launching a user interface app which can then be customized or tailored based on particular robot implementations or features within the connected cloud-based network.

Figure 15:
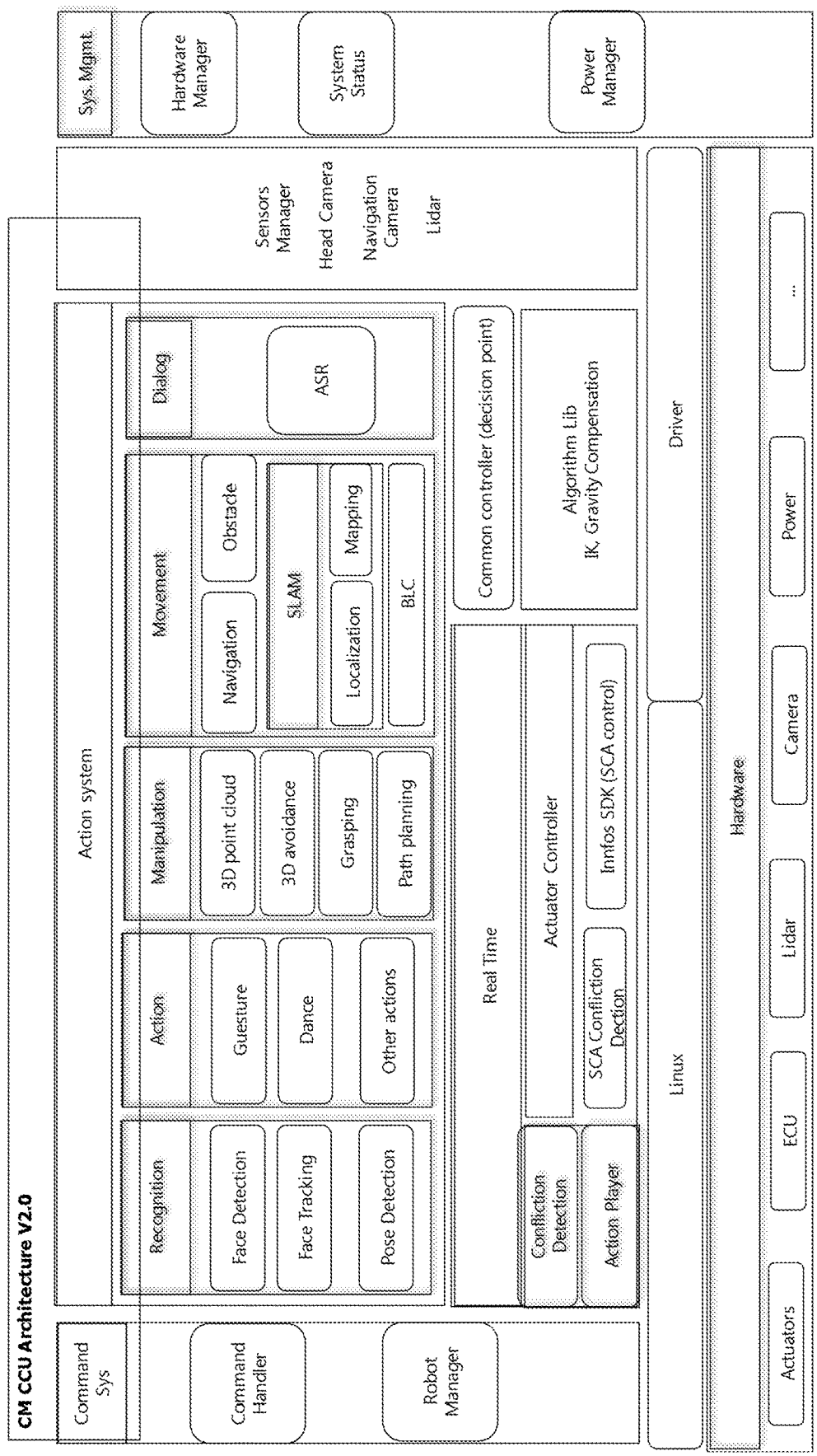
FIG. 15 illustrates an exemplary organizational framework of a command control unit or module which can optionally be implemented into any one of the embodiments of a robotics intelligence operation system disclosed herein so as to manage commands issued to any one of the robots controlled thereby.

FIG. 15 illustrates an exemplary organizational framework of a command control unit or module which can optionally be implemented into any one of the embodiments of a robotics intelligence operation system disclosed herein so as to manage commands issued to any one of the robots controlled thereby.

Figure 16:
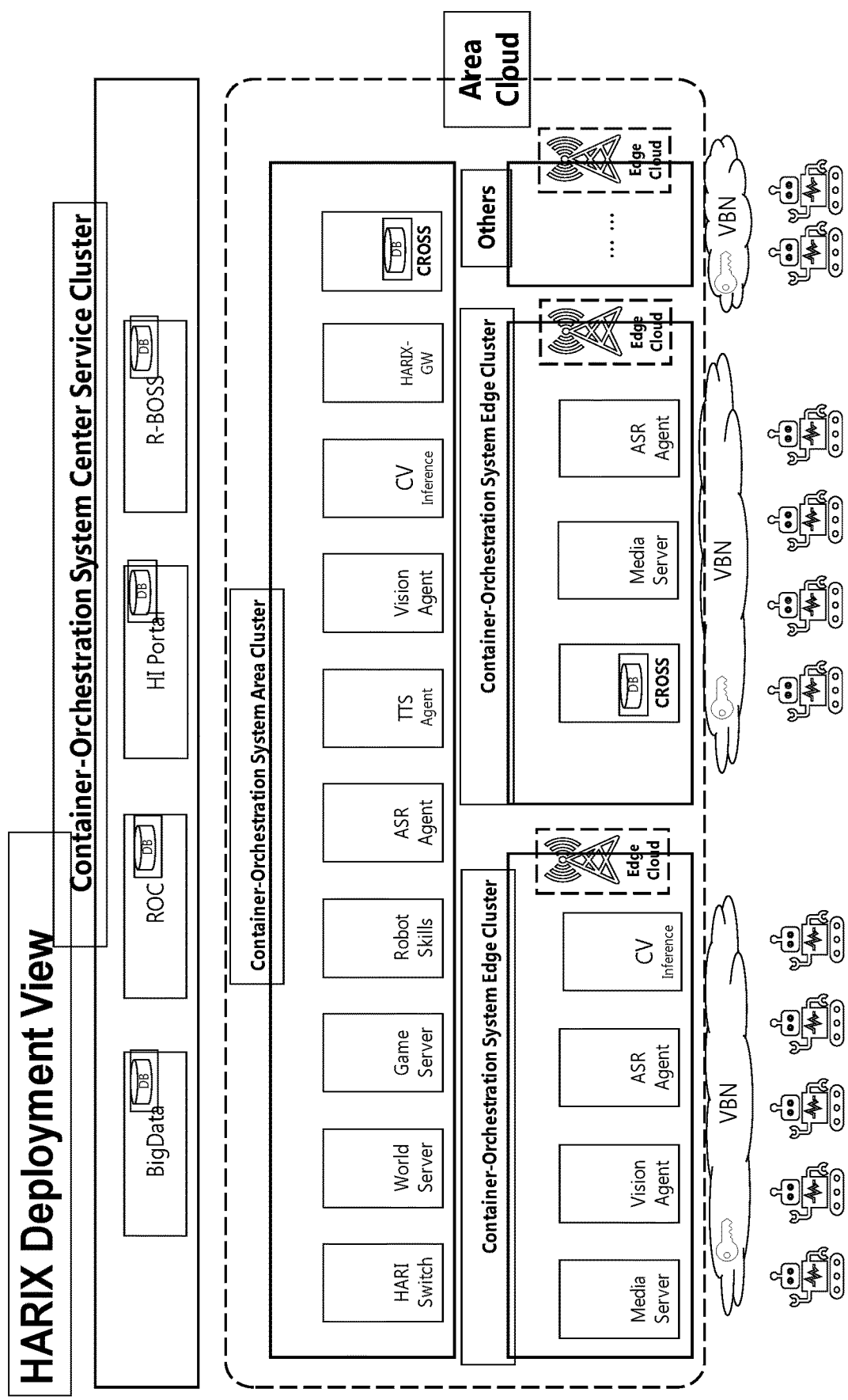
FIG. 16 illustrates an exemplary organizational framework of a container-orchestration system center service cluster or module which can optionally be implemented into any one of the embodiments of a robotics intelligence operation system disclosed herein so as to manage data collected by, and commands issued to, any one of the robots controlled thereby.

FIG. 16 illustrates an exemplary organizational framework of a container-orchestration system center service cluster or module which can optionally be implemented into any one of the embodiments of a robotics intelligence operation system disclosed herein so as to manage data collected by, and commands issued to, any one of the robots controlled thereby.

Containers are a good way to bundle and run applications. In a production environment, the system can be configured to manage the containers that run the applications and ensure that there is no downtime. The container-orchestration system can expose a container using the DNS name or using their own IP address. If traffic to a container is high, container-orchestration system is able to load balance and distribute the network traffic so that the deployment is stable.

The implementation of the containers can encapsulate a number of application components through image layering and extension processes. In some embodiments, different user applications and platform components can be combined in a single container. The granularity of containers, i.e., the number of applications inside can vary based on needs and variations in applications and other scenarios. In some applications, a one-container-per-app approach can be implemented, which still allows composing new stacks easily, for example, changing the web-server in an application, or reuse common components, for example, monitoring tools or a single storage service like mem-cached, either locally or predefined from a repository such as the docker hub.

This container orchestration framework allows for Apps to be built/rebuilt and managed easily. The downside to a single container per app approach is that it causes a larger number of containers with the respective interaction and management overhead compared to multi-app containers. Storage and network management are two specific issues that containers as application packages for interoperable and distributed contexts can facilitate.

There are at least two ways data can be managed in the docker, including data volumes and data volume containers. Data storage features can add data volumes to any container created from an image. A data volume is a specially designated directory within one or more containers that bypasses the union file system to provide features for persistent or shared data. In some embodiments, volumes can be shared and reused between containers, where data volume container can enable the sharing of persistent data between application containers through a dedicated, separate data storage container.

Network management can be based on two methods for assigning ports on a host, network port mappings and container linking. Applications running on RCU's for each robot can connect to a service or application running inside a docker container via a network port. In this manner, container linking allows linking multiple containers together and sending information between them. Linked containers can then transfer data about themselves via environment variables. To establish links and some relationship types, the docker can rely on the names of containers. Container names have to be unique, which means that links are often limited to containers of the same host, which can be managed by the same daemon.

The container-orchestration system can employ a cluster of nodes that it can use to run containerized tasks. The system can provide parameters to the container-orchestration system regarding how much CPU and memory (RAM) each container needs. The container-orchestration system can then be configured fit containers onto your nodes to make the best use of your resources.

In some instances, the container-orchestration system can be configured to restart containers that fail, replaces containers, kills containers that don't respond, etc.

The container-orchestration system can also be configured to allow the system to store and manage sensitive information, such as passwords, OAuth tokens, and SSH keys. The system can then deploy and update secrets and application configuration without rebuilding the system's container images, and without exposing secret or sensitive information in the system's stack configuration.

In particular the containers can be deployed in various clusters, for example, as shown here in FIG. 16, a Center Service Cluster, an Area Cloud, which can include sub-clusters including one or more area clusters, and one or more Edge Clusters. The Center Service Cluster can include a big data container set, and Robot Operation Center container set, a Human Interface Portal container set, an R-Boss container set, etc.

The Area cluster can include a Human Augmentation Robot Intelligence (HARI) Switch container set, a World Server container set, a Game Server container set, a Robot Skills container set, an Automatic Speech Recognition (ASR) container set, a TTS Agent container set, a Vision Agent container set, a CV inference container set, a Human Augmented Robotic Intelligence with Virtual Reality deployment capability container set, and a database Cross container set.

The various Edge-Clusters can include varying components, including one or more of the following in virtually any appropriate combination: a media server container set, a vision agent container set, an ASR agent container set a CV inference container set CROSS database container sets, etc.

Figure 17:
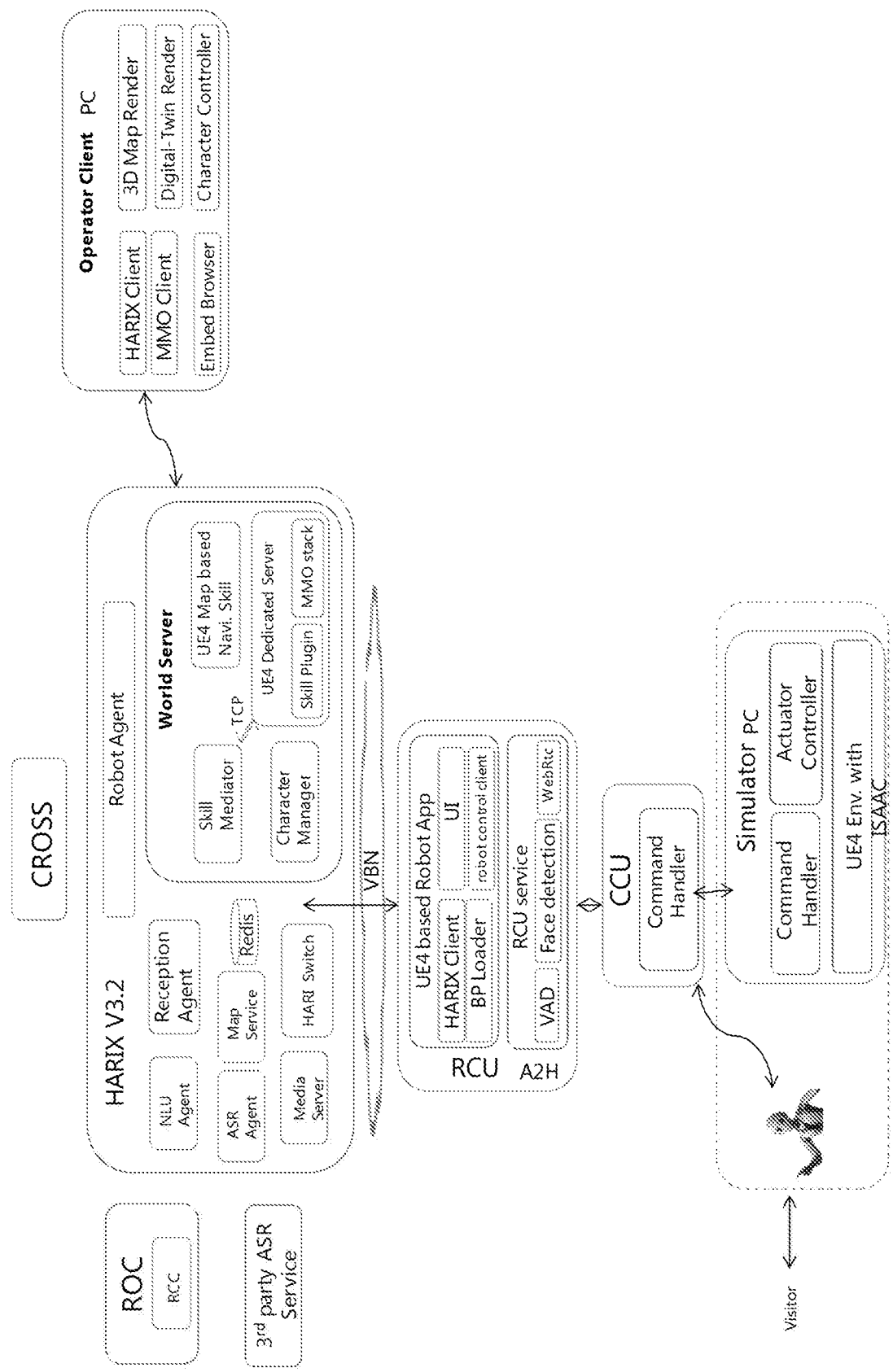
FIG. 17 illustrates another exemplary organizational framework of a human augmented robotics intelligence operation system being illustrative of additional optional features which can be incorporated thereinto.

FIG. 17 illustrates another exemplary organizational framework of a human augmented robotics intelligence operation system being illustrative of additional optional features which can be incorporated thereinto and how the various illustrated modules can interact with one another.

Figure 18:
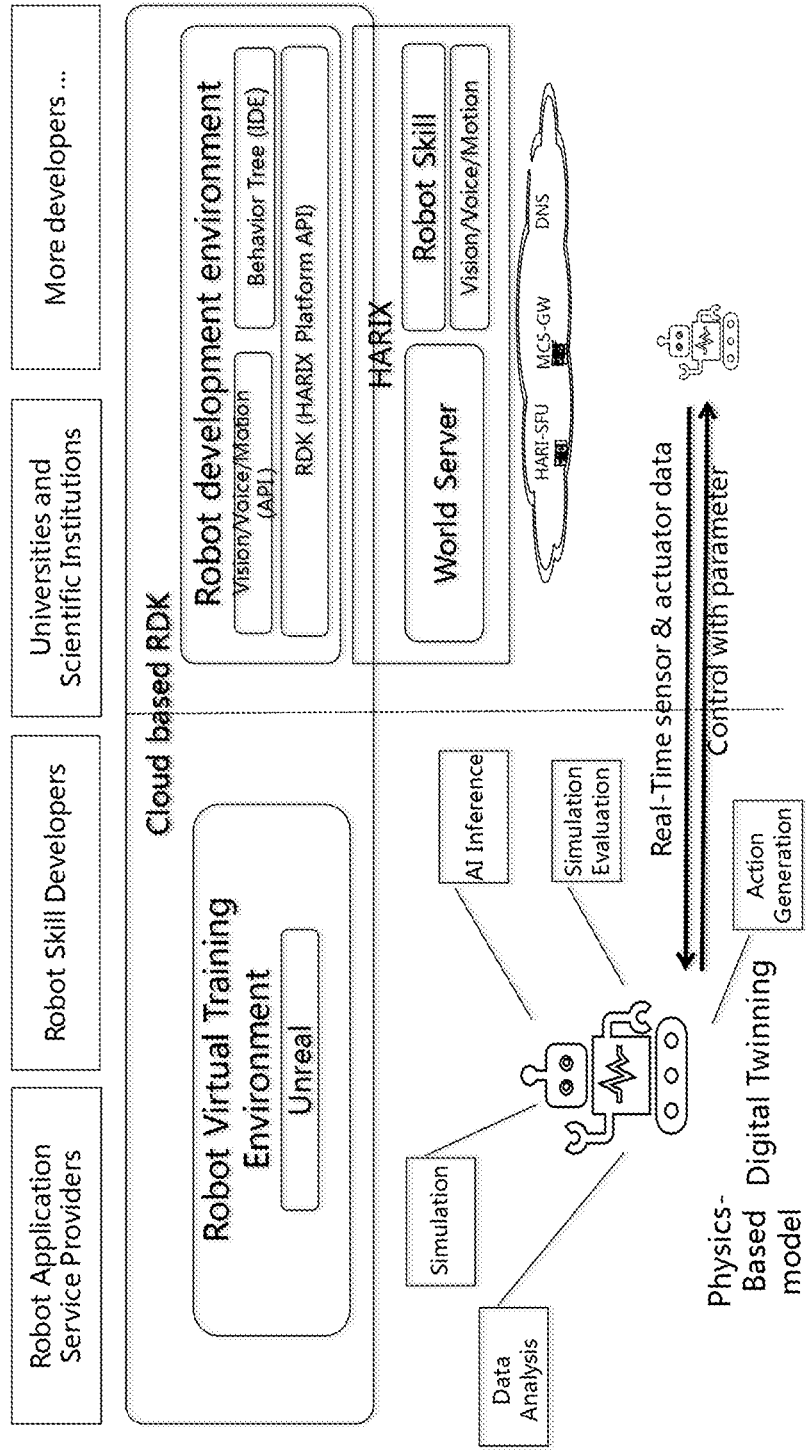
FIG. 18 illustrates another exemplary organizational framework of a human augmented robotics intelligence operation system being illustrative of additional optional features which can be incorporated thereinto.

FIG. 18 illustrates another exemplary organizational framework of a human augmented robotics intelligence operation system being illustrative of additional optional features which can be incorporated thereinto. For example, this particular figure illustrates how various developers can utilize virtual reality environments with virtual machines, or twins, being representative of real-life machines to test and provide additional training models, parameters, controls, actions, etc., to the AI databases prior to real-life launch.

Figure 19:
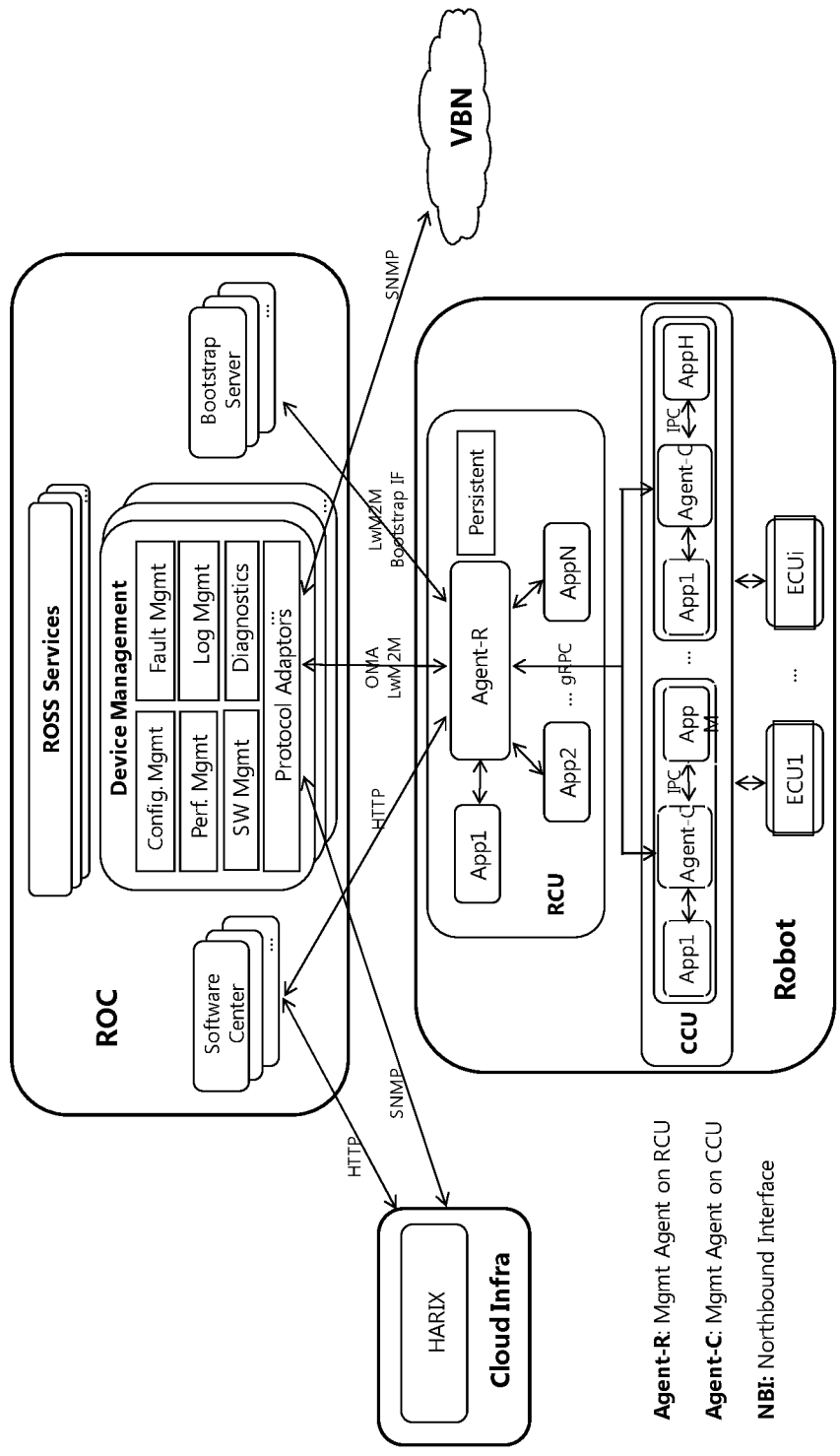
FIG. 19 illustrates an organizational framework illustrating an integration of an exemplary AI platform with any one of the disclosed embodiments of a human augmented robotics intelligence operation system as disclosed herein, this figure being illustrative of additional optional features which can be incorporated thereinto.

FIG. 19 illustrates an organizational framework illustrating an integration of an exemplary AI platform with any one of the disclosed embodiments of a human augmented robotics intelligence operation system as disclosed herein, this figure being illustrative of additional optional features which can be incorporated thereinto. This Robot operation center or module figure illustrates the various sub-modules, how they communicate with one another, and how user input commands can be handled by the robot control unit running an app, transmit data to the cloud based AI platform and how a robot operation center can then make necessary determinations in the cloud and reply with the requisite actions for the RCU to employ on a given robot.

FIGS. 20-29 illustrate various modules as shown in FIG. 11 with more detail regarding various potential sub modules which can be incorporated thereinto.

Figure 20:
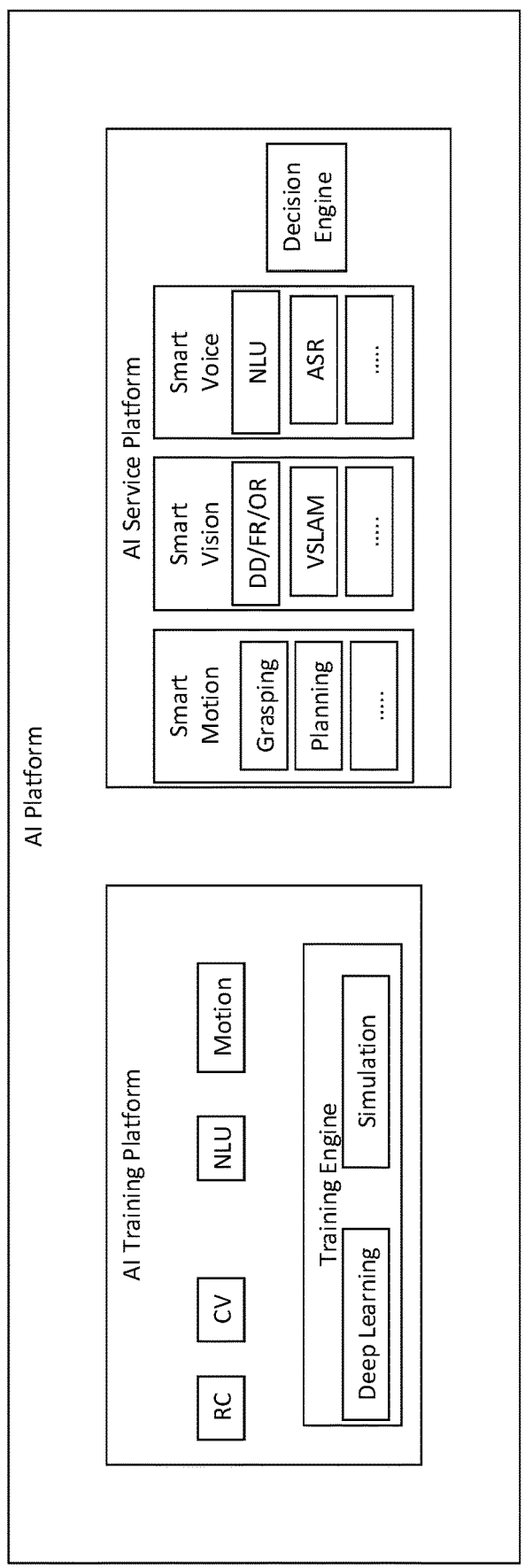
FIG. 20 illustrates an organizational framework illustrating an integration of an exemplary robotic operation client with any one of the disclosed embodiments of a human augmented robotics intelligence operation system as disclosed herein, this figure being illustrative of additional optional features which can be incorporated thereinto.

For example, in FIG. 20, the AI platform can include an AI training platform and an AI service platform. The AI training platform can then include a simulation and deep learning training engine, RC modules, CV modules, NLU modules and motion modules. The AI service platforms can include a decision engine and smart motion vision and voice modules. For example, the smart motion module can include a grasping module, a motion planning module, etc. The smart vision module can have a DD/FR/OR module, a VSLAM module, etc. The smart voice module can include an NLU module, ASR module, etc.

Figure 21:
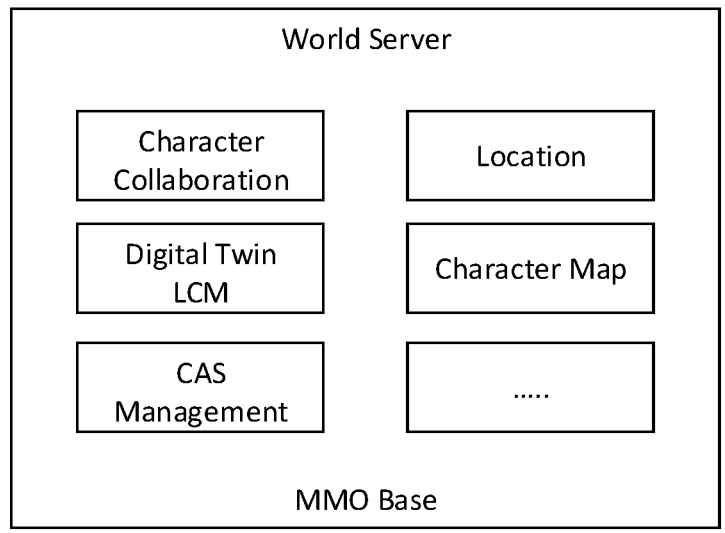
FIG. 21 illustrates an organizational a schematic of various potential options which can be implemented as part of the world server in an exemplary human augmented robotics intelligence operation system as shown in FIG. 11.

Also, FIG. 21 illustrates the world server element which can have an MMO base and various specific modules such as character collaboration, Digital Twin LCM, CAS management, location, character map, etc.

Figure 22:
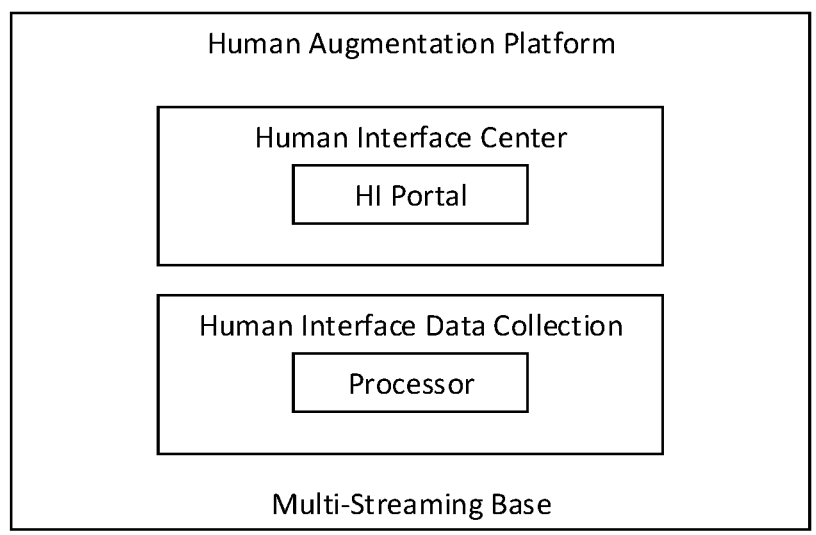
FIG. 22 illustrates an organizational a schematic of various potential options which can be implemented as part of the human augmentation platform in an exemplary human augmented robotics intelligence operation system as shown in FIG. 11.

FIG. 22 illustrates the human augmentation platform which can have a multi-streaming base and include various modules such as a human interface center module with an embedded human interface portal and a human interface data collection module with an embedded processing module.

Figure 23:
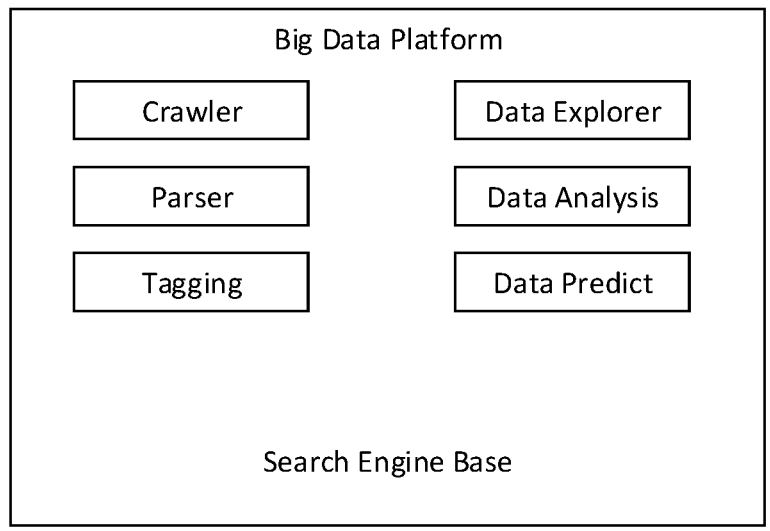
FIG. 23 illustrates an organizational a schematic of various potential options which can be implemented as part of the big data platform in an exemplary human augmented robotics intelligence operation system as shown in FIG. 11.

FIG. 23 illustrates an exemplary big data platform module from FIG. 11, wherein the big data platform module can run utilizing a search engine based and have several sub-modules, the sub modules including: a crawler module, a parsing module, a tagging module, a data explorer module, a data analysis module, and a data prediction module.

Figure 24:
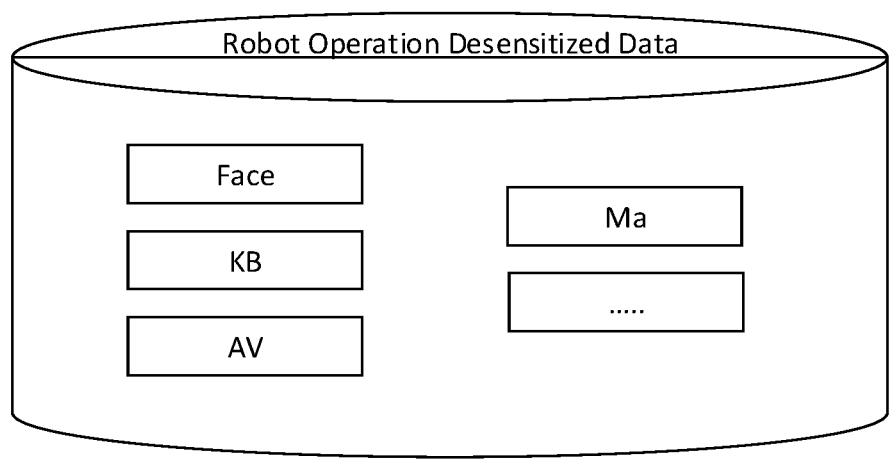
FIG. 24 illustrates an organizational a schematic of various potential options which can be implemented as part of the robot operation desensitized data element in an exemplary human augmented robotics intelligence operation system as shown in FIG. 11.

FIG. 24 illustrates an organizational a schematic of various potential options which can be implemented as part of the robot operation desensitized data element in an exemplary human augmented robotics intelligence operation system as shown in FIG. 11 wherein the robot operation desensitized data includes various types of information, including: Face, KB, AV, MA, etc.

Figure 25:
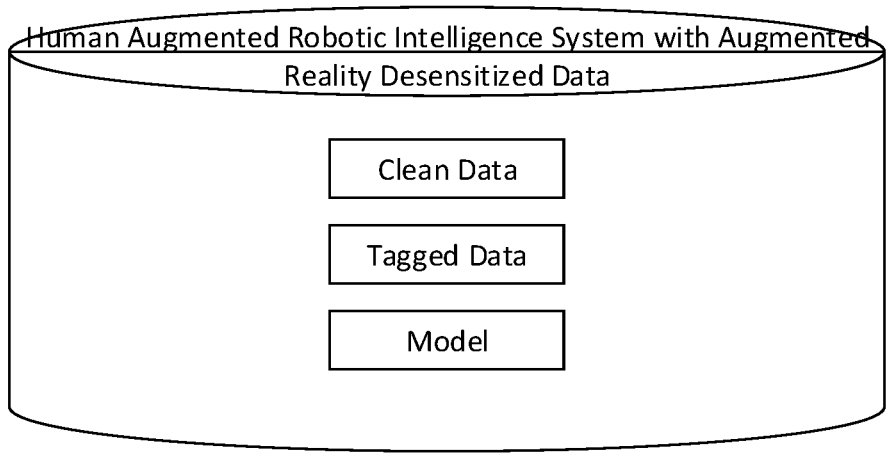
FIG. 25 illustrates an organizational a schematic of various potential options which can be implemented as part of the human augmented robotics intelligence operation system with augmented reality desensitized data as shown in FIG. 11.

FIG. 25 illustrates an organizational a schematic of various potential options which can be implemented as part of the human augmented robotics intelligence operation system with augmented reality desensitized data as shown in FIG. 11 wherein the human augmented robotics intelligence operation system with augmented reality desensitized data includes various types of information, including clean data, tagged data and model data.

Figure 26:
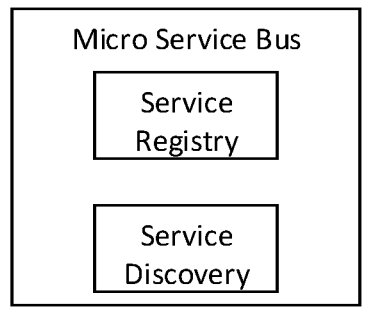
FIG. 26 illustrates an organizational a schematic of various potential options which can be implemented as part of the micro service bus element in an exemplary human augmented robotics intelligence operation system as shown in FIG. 11.

FIG. 26 illustrates an organizational a schematic of various potential options which can be implemented as part of the micro service bus element in an exemplary human augmented robotics intelligence operation system as shown in FIG. 11 wherein the micro-service bus can include a service registry and a service discovery function.

Figure 27:
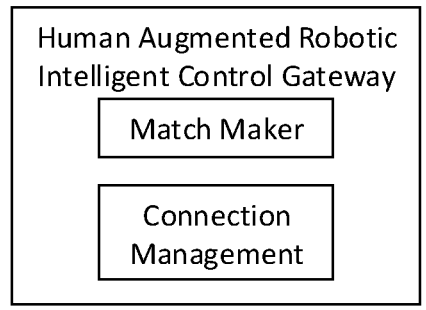
FIG. 27 illustrates an organizational a schematic of various potential options which can be implemented as part of the human augmented robotic intelligent control gateway in an exemplary human augmented robotics intelligence operation system as shown in FIG. 11.

FIG. 27 illustrates an organizational a schematic of various potential options which can be implemented as part of the human augmented robotic intelligent control gateway in an exemplary human augmented robotics intelligence operation system as shown in FIG. 11 wherein the Human Augmented Robotic Intelligent control gateway can include a matchmaker and a connection management function.

Figure 28:
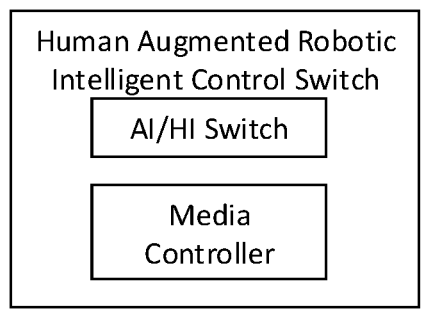
FIG. 28 illustrates an organizational a schematic of various potential options which can be implemented as part of the human augmented robotic intelligent control switch in an exemplary human augmented robotics intelligence operation system as shown in FIG. 11.

FIG. 28 illustrates an organizational a schematic of various potential options which can be implemented as part of the human augmented robotic intelligent control switch in an exemplary human augmented robotics intelligence operation system as shown in FIG. 11 wherein the Human Augmented Robotic Intelligent control switch can include an artificial intelligence/human intelligence switch and a media controller function.

Figure 29:
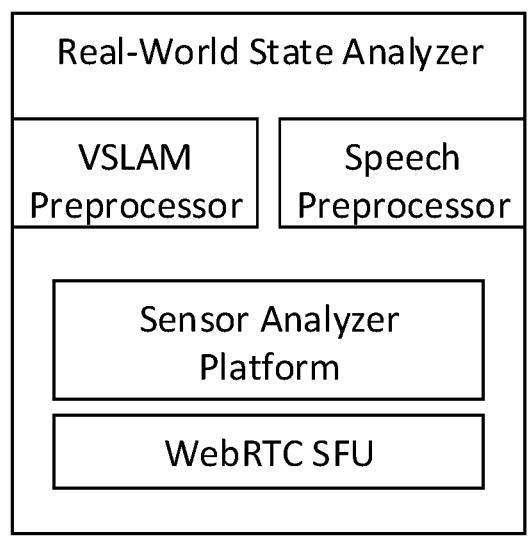
FIG. 29 illustrates an organizational a schematic of various potential options which can be implemented as part of the real-world state analyzer in an exemplary human augmented robotics intelligence operation system as shown in FIG. 11.

FIG. 29 illustrates an organizational a schematic of various potential options which can be implemented as part of the real-world state analyzer in an exemplary human augmented robotics intelligence operation system as shown in FIG. 11 wherein the real-world state analyzer can include VSLAM preprocessor module, speech pre-processor module, a sensor analyzer platform or module and a webRTC SFU module.

In some embodiments, and with regard to the ASR concepts as discussed below, the system can also employ frequency markers, voice inflections, or other behavioral tags when receiving verbal commands to distinguish between queries and commands.

By way of example, the command "robot, can you pick up the pen" can be tokenized such that the robot can parse the sentence into the command "pick up" and a target "pen." This allows the system to easily compare to a similar command "robot, can you pick up that spoon." The AI of the system can then find appropriate commands relating to "picking up" and then determine that grasping a target is involved. The system can then draw from other commands that involved grasping a particular item, in this case a spoon, but from other overall functions, such as stirring, etc. The system can then combine the two aspects to map out a sequence to complete the current task, assuming it has not done so before.

This is where the proposed determined threshold can come into play. The system can then make a probabilistic determination regarding whether the system has successfully grasped spoons and other items and take into account a likelihood of success when it has previously combined elements of two similar but separate tasks. If the system makes a determination above the threshold it can be configured to proceed, or alternatively deploy in a virtual reality setting in a physical and virtual parallel intelligence platform 134. Alternatively, if below the threshold, the system can generate an alert and request human review, wherein the human can review, alter if necessary, and deploy, or view the virtual reality deployment, alter if necessary, and deploy in real life.

It will be appreciated that various facial or object recognition techniques can be employed by the various robots, wherein machine learning can be implemented in the facial or object recognition process and adapt the manner a robot responds given various environmental parameters.

Some such facial or object recognition algorithms identify facial features by extracting landmarks, or features, from an image of the subject's face or images of a particular object. For example, an algorithm may analyze distinctive characteristics or contours, which can include, the relative position of various elements, size, and/or shape of eyes, nose, cheekbones, and jaw in the case of a face, or other distinguishing features of a particular object, such as wheel size, license tag location, wheel well contour, or windshield angle, for identifying a car. These features are then used to search for other images such as from a user database or a car registration database to find faces or objects having matching features.

In some instances algorithms may be used which normalize a gallery of face images and then compress the face data, only saving the data in the image that is useful for face recognition. A only extracted identification image data will then be compared with the face or object data.

In some instances, geometric recognition algorithms can be used, in which case the system can look at distinguishing features or photometric. In some alternative, or additional combinations, a statistical recognition algorithm can be used in which the image can be distilled into values and which can be compared with the values of one or more templates to eliminate variances. Either approach can be adapted to be either holistic or feature-based models, wherein wholistic would attempt to recognize the face in its entirety while the feature-based would subdivide images into components according to features and analyze each as well as its spatial location with respect to other features.

The systems contemplated herein can in some instances utilize recognition algorithms which include principal component analysis using eigenfaces, linear discriminant analysis, elastic bunch graph matching using a Fisherface™ algorithm, the hidden Markov model, the multilinear subspace learning using tensor representation, and the neuronal motivated dynamic link matching.

The system as contemplated herein can also implement various three-dimensional face recognition techniques using three-dimensional, infrared, echolocation, or thermal sensors to capture information about the shape of a face. This information can then be used to identify distinctive features on the surface of a face, such as the contour of the eye sockets, nose, and chin.

One advantage of three-dimensional face recognition is that it is not affected by changes in lighting like other techniques. It can also identify a face from a range of viewing angles, including a profile view. Three-dimensional data points from a face vastly improve the precision of face recognition. three-dimensional research is enhanced by the development of sophisticated sensors that do a better job of capturing three-dimensional face imagery. The sensors work by projecting structured light onto the face. Up to a dozen or more of these image sensors can be placed on the same CMOS chip—each sensor captures a different part of the spectrum.

Even a perfect three-dimensional matching technique could be sensitive to expressions. For that goal a group at the Technion applied tools from metric geometry to treat expressions as isometries.

Another object or facial recognition method is to capture a three-dimensional picture by using three tracking cameras that point at different angles; one camera can be provided which is pointing at the front of the subject, second one to the side, and third one at an angle. All these cameras can then work together so as to track a subject's face in real time and be able to face detect and recognize.

Another potential recognition method employable by the system as contemplated herein can utilize various visual details of an objects surface, such as a target's skin, as captured in standard digital or scanned images. This technique can implement a method of drawing a plurality of unique lines, patterns, and spots connecting various apparent features on a surface or in a person's skin into a mathematical spatial representation which can be more unique than a fingerprint.

Surface Texture Analysis works much the same way facial recognition does. A picture is taken of a patch of skin, called a skinprint. That patch is then broken up into smaller blocks. Using algorithms to turn the patch into a mathematical, measurable space, the system can then distinguish any lines, pores and the actual skin texture. It can then identify the contrast between identical pairs.

In some instances, face recognition can be achieved by using thermal cameras, by this procedure the cameras can be utilized to detect the shape of the head and can in some instances ignore the subject accessories such as glasses, hats, or makeup. Unlike conventional cameras, thermal cameras can capture facial imagery even in low-light and night-time conditions without using a flash and exposing the position of the camera. In some such instances, the system can utilize low-sensitive, low-resolution ferroelectric electrics sensors that are capable of acquiring longwave thermal infrared (LWIR). In this manner a fusion of LWIR and regular visual cameras has greater results in outdoor probes. However, in various indoor applications visual only can achieve sufficient accuracy.

In some instances, the system can also implement which utilizes both images from a thermal camera and a conventional camera. This approach can utilize a cross-spectrum synthesis method performed by artificial intelligence and machine learning by synthesizing a single image by analyzing multiple facial regions and details in conjunction with thermal maps. It can then include a non-linear regression model that maps a specific thermal image into a corresponding visible facial image and an optimization issue that projects the latent projection back into the image space.

In some instances, this approach works better when combining global information (i.e. features across the entire face) with local information (i.e. features regarding the eyes, nose, and mouth). In addition to enhancing the discriminability of the synthesized image, the facial recognition system can be used to transform a thermal face signature into a refined visible image of a face.

It will then be understood that performing multiple of these object or facial recognition methods can result in greatly improved accuracy. combining different techniques.

Combined techniques have an advantage over other systems. Mainly that combined techniques are substantially less sensitive to changes in expression, including blinking, frowning or smiling and has the ability to compensate for mustache or beard growth and the appearance of eyeglasses.

The inventors of the present disclosure have also recognized that the improvement of ASR and STT can improve the accuracy, applicability, and versatility of voice-controlled systems.

In particular, social robots deployed in public spaces present a challenging task for ASR because of a variety of factors which often present themselves in these public places.

Conventional VAD systems typically are only trained only on a single linguistic model with the models being recorded only in low noise environments, as such, these models only provide acceptable speech recognition in low-noise situations and degrade drastically as the noise level increases. Further, conventional systems typically only extract a single type of Mel Frequency Cepstral Coefficient (MFCC) features from the recorded raw audio waveforms resulting in the voice recognition which is unable to adapt to numerous types or background noise. In the real-world, users who may rely on VAD interfaces often encounter wide ranging noise levels and noise types that often render previous VAD systems unsuitable.

Examples of situations in which VAD and speech-to-text systems might be used in high-noise situations can include utilizing a robot in an airport, in a vehicle, or in an industrial environment. However, where many users may just suspend use of VAD devices until exiting such environmental conditions, some users may be dependent on such devices and may require the VAD to perform even in these environments. Examples may include users with degenerative neural diseases, etc. which users may not have an option of exiting an environment or communicating using alternative means. Improvement in VAD systems will allow for more versatile uses and increased ability for users to depend on said systems. Additionally, increased reliability of VAD systems in noisy conditions may also allow for additional communication and voice command sensitive systems in previously non-compatible systems, for example vehicular systems, commercial environments, factory equipment, motor craft, aircraft control systems, cockpits, etc.

However, VAD system improvements will also improve performance and accuracy of such systems even in quiet conditions, such as for smart homes, smart appliances, office atmospheres, etc.

Contemplated herein are various methods for providing improved ASR performance in such conditions by providing a system having a plurality of models, each model being trained utilizing various linguistic models with varying corresponding SNR's and varying background conditions.

In order to implement these methods, contemplated herein is a system which utilizes a known VAD system which receives raw audio waveform from a user, performs VAD classification on a local computational device, i.e. a robot, and sends the result to a cloud-based AI platform. This flow can be described as follows: a user speaks to the robot, which includes a microphone, processing circuitry, and non-transitory computer-readable media containing instructions for the processing circuitry to complete various tasks.

Using the robot, audio recorded as a raw audio waveform; the VAD system transforms the raw audio waveform and classifies as speech or non-speech; the speech audio waveform is then sent to a Cloud-based AI platform 200 for further speech processing, the AI platform determines a particular background noise and matches the raw audio waveform with a particular linguistic model which has been recorded having a similar background noise condition. Then, a classifier compares the raw audio waveform to one or a plurality of particular linguistic models used to train the classifier having a particular matching background noise condition so as to improve accuracy of the particular speech-to-text or voice activation detection.

In other words, the system as contemplated herein can train an ASR system with a particular linguistic model with intentional background noise, wherein during the training process the system can have a base truth input associated wherein the base truth is input in association with a variety of background conditions. For example, a linguistic model can be recorded based on an AiShell-1 Chinese speech corpus and the Kaldi ASR toolkit with a typical airport, factory, freeway, vehicular, machinery, wind, office conversation background noise overlaid onto the linguistic model. In such situations, the system can save each particular background overlay as a separate and distinct model for comparison between recorded raw audio waveforms for purposes of performing ASR on the raw audio waveform.

In some embodiments, various base linguistic models can be utilized in a similar wide variety of conditional background noise overlays to add robustness to the system. In other words, an AiShell-1 Chinese linguistic model can be recorded in a plurality environments having various background noise situations at a plurality of associated SNRs, wherein each recording is associated with a base truth input, and wherein each recording is saved as an independent linguistic model, then an alternative linguistic model such as English VoxForge™ can be similarly recorded in another similar corresponding set of background noise levels, varying environments, with associated background noise overlays etc. such that a plurality of linguistic models are provided having a robust number of associated SNR's, environments, etc.

The system can then utilize a electronic switch, which can compare background noise of an ambient environment of the robot to determine an optimal linguistic model as discussed above having been recorded in or otherwise having appropriate SNR and associated background environment for performing ASR utilizing a particular linguistic model having a background noise and SNR level most closely matching the current location as detected by the local system.

There are several factors the influence ASR performance in challenging conditions. Performance in this case is typically quantified by word error rate (WER) or character error rate (CER) for Asian languages. These factors may include the following.

Vocabulary: the perplexity of the language model has a significant inverse effect on performance.

Microphone distance: speakers further away from the microphone, especially in acoustically active rooms, can result in substantially lower performance.

Noise: one of the biggest factors affecting ASR performance is the noise level, typically quantified as signal-to-noise ratio (SNR).

Reverberation: highly reverberant acoustic environments are particularly challenging. Reverberation time is typically quantified by T60, or the time in seconds for sounds in a room to decay by 60 dB.

In order to illustrate the limitations of the prior art raw speech from various real-world environments was recorded and the associated noise conditions were tracked wherein some of these deployments and measured the noise conditions, notably signal-to-noise-ratio (SNR) measured similarly to the table above, and compared to SNRs from other well-known conditions and environments.

Public deployments of robots normally operate from 15-20 dB SNR for a relatively quiet office, to 5-7 dB for a loud trade show in a very reverberant environment. This is in contrast, for example, to home-based social robots such as Alexa™ or Google Home™, which experience an SNR of about 20 dB. It will then be understood that many ASR systems perform very well in clean or 20 dB SNR speech, but start degrading past 20 dB, and show quite substantial errors at 10 dB SNR and beyond.

The input speech, when received by the robot, can have its features extracted by a feature extraction module. Based on the features extracted and the condition received from the condition classifier, a switch can switch among a single-condition ASR model 0, a single-condition ASR model 1, . . . , a single-condition ASR model N. Using the optimal ASR model(s), text can be output for display and/or for commanding the robot to execute actions according to the recognized commands.

The various robot components, blocks, or portions may have modular configurations, or are composed of discrete components, but nonetheless may be referred to as "modules" in general. In other words, the "modules" referred to herein may or may not be in modular forms.

For purposes of comparison, the AiShell-1 Chinese corpus can be used for initial evaluation wherein the AiShell-1 has speech recordings using a high-quality microphone.

Up to now, the system can be operated utilizing only the 178-hour open-source part of the AiShell corpus has been used. Up to 718 additional hours of data per recording setup could be acquired if needed. It will then be understood that AiShell-1 comes with pre-partitioned training, development, and test sets of 118664, 14326, and 7176 utterances or 148, 18, and 10 hours, from 336, 40, and 20 speakers. These splits can then be used for all training and testing.

In order to create noisy data, recorded noise can be added to the relatively clean AiShell-1 data to create noisy data, for example around 35 dB SNR. This gives the system an immediate large corpus of noisy data which would have been challenging to collect in the field. It will then be understood, that for implementing the methods of the present disclosure in conjunction with other techniques, such as autoencoders, it is sometimes necessary to have both clean and corrupted samples from the same data.

The system can then be trained utilizing SNR increments of 5 dB from 20 dB to 0 dB, wherein the noise level can then be scaled to obtain the needed average SNR across a sample of the corpus.

In the embodiments discussed herein only one noise level was used for a given SNR for the entire corpus, e.g., there can be utterance-by-utterance variability in the SNR, but the average is the desired SNR.

For a given average SNR condition, the standard deviation of SNR across utterances can be 5 dB.

The base noise used for adding to the corpus can then be recorded from a social robot deployed in a real-world environment, for example, the current system utilized a social robot being deployed at the Mobile World Congress trade show in February 2018.

This noise can be often advantageous as it represents more realistic noise than white or pink generated noise.

In this implementation a one-minute section of audio was extracted from the raw recording, where there was only background and environmental speech, i.e., no foreground speech.

For each utterance in the training and test corpora, a random piece of that one-minute segment was used as the noise portion, to ensure randomness in the added noise.

In some embodiments, an open-source Kaldi Chinese model can be utilized as another alternative linguistic model. This model uses a chain variant of the Kaldi TDNN, with 40-dimensional filter bank output as features instead of MFCC. Pitch features are not used, and i-vectors are not used for speaker adaptation. The acoustic model can be trained on over 2000 hours of speech, and the language model can be trained on a 1 TB news corpus.

It will then be understood that in some instances it makes more sense to utilize a character error rate (CER), which can be a standard measure used for Chinese as opposed to word error rate (WER) for many other languages.

FIG. 7A then illustrates various CER, using the various 3rd-party APIs and open-source models on clean and noisy data. It can be seen that for an example range of SNR for robot deployments, as well as a dotted line at 10% CER and a dashed line at 15% CER. For CER exceeding 10-15%, the usability of system can be questionable.

It will be appreciated that that these models perform very well in clean speech and low noise, but CER increases substantially with higher noise, especially at SNR lower than 15 dB. The extent that the model worsens with more noise can be quite system dependent. However, given that performance can be degrading in the operating region for robots, it is worth investigating methods, such as those contemplated herein in order to reduce error rates for SNR less than 15 dB.

As discussed above, the system contemplated herein performs ASR by doing comparisons of the raw audio waveforms to linguistic models having been trained on noisy data rather than on clean data.

The particular experiments discussed herein utilized a combination of AiShell and Kaldi linguistic models, which utilize monophone then triphone-based GMM models, using first MFCCs plus deltas and then multiple-frame LDA plus MLLT, then speaker adaptation using fMLLR, and finally the DNN "chain" model incorporating various online iVectors for speaker characteristics.

For fair comparison with 3rd party ASR APIs, which handle a wide variety of text, it can be important to use a more general language model than the one trained only on AiShell data, which is the default in the Kaldi recipe. The complexity of such general language models will be significantly higher, thus resulting in lower ASR accuracy, compared to language models trained only on the ASR training corpus.

In order to overcome this the system can also be configured to utilize the Sogou Chinese news corpus, which contained roughly 600 GB of text. A trigram language model can then be built using Witten-Bell smoothing and appropriate pruning to be computationally feasible without sacrificing much performance.

In some embodiments the various acoustic comparison models can then be trained with the original AiShell-1 training set of 148 hours, plus noisy versions of the training set at various noise levels resulting in a 148*n number of total training set hours.

In some instances, high-resolution MFCC outperforms standard resolution. MFCC (both resolutions) outperform i-vector. Pitch features may also be useful across the board. Having more than 2000 training samples per class can bring some improvements.

For SNRs of 15 dB or less, the custom-trained models performed statistically significantly better than the best of the existing engines. At 20 dB SNR the difference in results are not significant. For clean speech, the existing engines do significantly better, which is expected given the large amount of time and data behind these models.

In some of the embodiments contemplated herein, the system can use a gStreamer interface to Kaldi and the associated docker image for this interface to quickly deploy the Kaldi-trained model in appropriate situations.

The system utilizes this infrastructure to deploy the custom models on various social robots in the field. One of many advantages of using the Kaldi toolkit can be the small amount of effort needed for deployment, so activities can be focused on model development.

The system can also implement additional linguistic models, such as: English with the Librispeech corpus; Japanese with the CSJ corpus, both of which have established Kaldi recipes; the 1000-hour AiShell-2 corpus.

The system can also implement various variations of microphone arrays, especially for use in local computational systems or social robots which are deployed in public spaces with multiple possible speakers, sometimes simultaneous. Such improvements permitted by use of such multiple microphones allow for better detection of the live speaker and also allow for the system to focus attention on that speaker, which is not enabled in systems utilizing only single microphones.

The typical method for measuring performance of ASR is Word Error Rate (WER), or the minimum number of single-word insertions, deletions, and substitutions that can be required to transform the speech recognizer's word string to the "ground truth" word string generated by human annotators. For Asian languages that have words with fewer more complex characters, sometimes Character Error Rate (CER) can be used instead.

In terms of quantifying the level of noise, typically signal-to-noise-ratio (SNR) is used. SNR is the difference between the average energy of the speech part of a waveform (in dB) and the average energy of the background noise (also in dB). "Clean" speech typically has SNRs from 30 dB or higher; SNRs for noisy deployments of social robots range from 20 dB to 5 dB.

It has then been recognized that ASR systems are normally trained on a large amount of training speech, several hundred hours or more, where the orthographic transcription the word string of each training utterance has been annotated by human listeners and wherein the recordings of the training speech are typically made in studios wherein the SNR is optimal. The systems' performances are then evaluated using a set of test speech, also with orthographic transcriptions, which usually comes from the same body of data but a completely different subset of that data. None of the utterances, or even speakers, from the training set should be in the testing set, and vice-versa.

One technique, "multi-style training," involves training a single ASR model on examples of speech from the various noise conditions. Another technique, "single-style training," involves training a single ASR model on each of the various noise conditions, then choosing which model to use at run-time. It would not be surprising for single-style training to perform better than multi-style training, since the training set for each single-style model has less variability.

To use single-style models, though, one must first need to be able to detect what condition or noise level an utterance has in order for the correct model to be chosen. One would then need the classification of noise level to happen as soon as possible from the beginning of the speech utterance, so as to not incur additional delay in the user getting a response.

In some embodiments the system can be configured to utilize a single-condition training to do ASR.

In order to use single condition models, the condition or noise level must be determined.

The technique of ASR in accordance with various aspects of the present disclosure proceeds during run-time by performing the following steps:
classifying the incoming speech into one of several condition categories;
selecting the single-condition model which can be trained on speech from the chosen condition category; and
performing ASR using the chosen single-condition model and provide the answer.

In order to build a system to do this ASR, the system can then be configured to:
define a number of noise conditions, based on a sample of actual deployment conditions;
take a large body of speech data and for each noise condition, add an appropriate amount of noise at the same noise level to achieve the desired average SNR or other metric;
build the noise classifier to classify the incoming speech into the conditions; and
train a single-condition model for each condition.

In terms of the noise classifier, there are at least 2 possible ways to generate the various conditions, which can include:
use the condition specified when the noise can be added; and
use unsupervised learning to cluster the samples into a new set of defined "conditions."
There are in turn several ways to accomplish this:
use a well-known unsupervised learning algorithm such as k-means clustering, using a Euclidean distance metric, to cluster/classify the feature frames into condition;
use such an unsupervised algorithm to generate ground truth by clustering, then use a supervised learning algorithm such as a convolutional neural network (CNN) to classify the frames into condition; and
use the supervised algorithm such as CNN to get an initial estimate of condition classes, then iterate as follows:
  start with a model m0 resulting in prediction p0 of the class using the initial SNR categories as ground truth g0;
  make g1=p0; wherein the "new" ground truth is the predicted from the last step;
  train the model with g1 as ground truth, resulting in model m1 giving predicted P1,
  save away the trained model m1 and predictions p1;
  repeat 2 and 3, setting gn=p(n−1) and training the model to get mn and pn.
  stop iterating when the pn=p(n−1) for all utterances, or until some kind of iteration counter is exceeded.

In some embodiments, an implementation is contemplated in which a component "Feature extraction" can be performed on a speech waveform which produces a periodic vector or "features," or numbers that represent the important aspects of the speech waveform, wherein the period of the vector is typically every 10 milliseconds.

The stream of feature vectors from the feature extraction can be then provided to a "Condition Classifier" which takes the extraction and produces a running estimate of the noise condition of the input speech waveform. That estimate is 1 of N possible symbols, each corresponding to a noise condition, where N is the number of conditions.

A stream of input feature vectors can then be then provided to one or more single-condition ASR models which take the feature vectors and produce an output text string corresponding to what was spoken in the speech waveform.

The stream of feature vectors from feature extraction are then provided to a component switch that directs the feature vectors to the relevant Single-condition ASR model corresponding to the noise condition that was classified.

The procedure for creating the multi-model ASR system can include one or more steps, including: defining Nc conditions based on the actual expected deployment conditions.

For example: clean, i.e. no noise added, 20 dB SNR, 15 dB SNR, 10 dB SNR, 5 dB SNR, 0 dB SNR for Nc=6 conditions. In such instances, the system can be configured to start with a corpus C of speech data wherein C contains Nu speech utterances, wherein corpus C can then be partitioned into 3 distinct sets: a training set ctrain with Nutrain utterances, a development set Cdev with Nu dev utterances, and a test set Ctest with Nutest utterances. In such embodiments, each utterance in corpus C can be classified into one and only one of ctrain Cdev or Ctest;

The procedure for creating the multi-model ASR system can then include a step of artificially modifying corpus C to create Cc, or the original corpus C corrupted by condition c for each condition c, wherein Cc will have the same number Nu of utterances as C. It will then be noted that each utterance in Cc will be the same length as the corresponding utterance in C, but with noise or other corruption added. This modification can be simply adding noise at an appropriate level or creating other linear or nonlinear distortions to model real-world deployment conditions.

The procedure for creating the multi-model ASR system can then include a step of training a single-condition ASR model NIc using only Ce_train for each condition c, i.e. the training portion of Ce.

The procedure for creating the multi-model ASR system can then include a step of training the condition classifier which will at run-time take the feature vector stream and return a running estimate of the which of the Ne conditions are being used.

For the step of training the condition classifier there are several potential options, including: first, using a well-known unsupervised learning algorithm such as k-means clustering, using a Euclidean distance metric, to cluster/classify the feature frames into condition; second, third; using such an unsupervised algorithm to generate ground truth by clustering, then use a supervised learning algorithm such as a convolutional neural network (CNN) to classify the frames into condition; or fourth using the supervised algorithm such as CNN to get an initial estimate of condition classes, then iterate as follows:

start with a model mO resulting in prediction pO of the class using the initial SNR categories as ground truth gO;
make gi=pO; the "new" ground truth is the predicted from the last step;
train the model with gi as ground truth, resulting in model mi giving predicted pl;
save away the trained model m 1 and predictions pl;
repeat these iterations by setting gn=p(n−I) and training the model to get mn and pn; and
stop iterating when the pn=p(n−I) for all utterances, or until some kind of iteration counter is exceeded.

In some additional embodiments, the system can be utilized for improving performance in noise and other conditions can be to train models with conditions that might be expected in the field.

One of the basic training paradigms is multi-condition or multi-style training, where the model can be trained on a mix of conditions that are seen in deployment, potentially with the probability of various conditions weighted to reflect the actual deployment environment(s).

As would be expected, multi-condition training introduces significant additional variability on top of an already challenging problem, by mixing various deployment conditions in one model. An alternative would be single-condition training, where the model can be trained only on a particular condition, thus removing that element of variability and presumably resulting in higher performance.

In order to utilize single-condition training, a choice among the models can be determined for used for the speech to text extraction. The VSR systems according to various embodiments disclosed herein also are able to support the computational requirements of multiple models, e.g., memory, CPU, etc.

As discussed above, once a plurality of models are generated, the system can be utilized to automatically determining the appropriate model for comparison with a raw recorded waveform.

In order to achieve this the system can be configured to compare two or more architectures for condition detection. In order to achieve this the system can apply a feed forward deep neural network (DNN) SNR classification model and a 1-D convolutional neural network (CNN) model. The feed forward model can include 4 hidden layers, wherein dropout regularization can be applied when training.

To alleviate edge effects, the system can apply a windowing function to concatenate each center frame with equal number of adjacent frames preceding or after it. The CNN model can then also adopt windowed frames as inputs, which can consist of two interleaving convolutional and max-pooling layers. Dropout regularization can also similarly be used for training in this manner.

With regard to features, the system can be utilized to leverage existing features that are already computed for ASR. The first are frame-based variants of both low-resolution and high-resolution MFCC, the second are utterance-based i-vectors.

The system can then be utilized to train a feed forward deep neural network (DNN) SNR classification model with the standard frame-based MFCC with deltas and double-deltas. In some embodiments Pitch features (dimension 3) can also be added since this is standard for Chinese ASR. The total feature vector per frame is thus 13 MFCC+3 pitch, times 3 for deltas and double-deltas, for a total of 48.

MFCC-based condition accuracy metrics can be first calculated on a frame-by-frame basis, then also on a per-utterance basis. There are two methods used to generate utterance class estimates from frame-by-frame estimates:

The first method being softmax: which treats the frame-based softmax scores as probabilities, and calculate the joint probability of a class given the estimates until the current frame.

The second method is by majority voting: which chooses the class that as the most frame-by-frame votes. Such voting techniques have been useful with model combination techniques.

For generating the utterance-level class estimates, the system can use both the entire utterance, but also various values (e.g., 250 ms, 500 ms) of using only the first portion of the utterance. This can be important for real-time operation, where in order to eliminate additional latency, the system can be utilized to estimate the noise condition and thus select the ASR model as early as possible into the utterance.

Another feature which can be utilized by the system can be i-vectors, which have been shown to be successful for speaker verification and for speaker adaptation with ASR. I-vectors are single vectors that code relevant information about both the speaker and the session.

In some embodiments, the various training utterances per class or the noise and/or other conditions, as with i-vectors, were calculated on high resolution (40 instead of the usual 13). MFCCs which were both speed- and volume-perturbed in order to reduce the sensitivity to speaking rate and volume. In some such embodiments the dimension of the i-vectors was 100.

For post-processing, the effectiveness of an i-vector at any time step in an utterance can be studied, and it may not be necessary to apply the sliding window idea as used for MFCC post-processing. i-vectors were calculated in online mode, so there was a running estimate of an utterance's i-vector starting at the beginning of the utterance.

In some embodiments, condition accuracy measures can be implemented which can be based on a number of variables such as architecture (feed-forward DNN or CNN), base feature (MFCC or i-vector), pitch features or not, MFCC vector size (standard 13 or "hires" 40), amount of training data, and MFCC combination method (softmax or majority voting).

The effectiveness of the combination methods for MFCC are studied, as i-vectors are utterance-based and not frame-based. As softmax outperforms majority voting for many features, softmax can be employed in the examples below.

In some embodiments, some improvement can be realized by having more than 2000 training samples per class.

It will then be appreciated that 98% of errors realized were a mis-classification of a condition as the "next door" condition, e.g., choosing 5 dB or 15 dB for a ground truth of 10 dB. The overall impact of such errors may be substantially lower than for example choosing 20 dB or clean instead of 5 dB.

In some embodiments the ASR system can use the AiShell Kaldi recipe, which uses mono-phone then triphone-based GMM models, using first MFCCs plus deltas and then multiple-frame LDA plus MLLT, then speaker adaptation using fMLLR, and finally the DNN "chain" model incorporating online iVectors for speaker characteristics.

In some embodiments, the system can utilize only the language model (LM) trained from the corpus, which could then allow for substantially lower complexity than large general LMs used in the 3rd-party ASR engines.

On one hand, this biases any performance comparison strongly in favor of the custom trained system; on the other hand, from a bottom-line performance standpoint, the ability to craft custom LMs for application domains can be a great advantage of custom-trained ASR engines over "black-box" approaches, and can be ignored.

Multi-condition, speaker only: multi-condition training can be used, i.e., a single model can be trained with all noise conditions. The "speaker" for speaker adaptation can be only the corpus speaker.

Multi-condition, speaker and condition: same as above, but the "speaker" can instead be a combination of speaker and condition.

Single-condition, ground truth: there are several models, one for each condition, and it is assumed that the actual noise is known.

Single-condition, predicted, entire utterance: there are several models, one trained on each noise condition, and the condition can be estimated from the speech using the techniques mentioned above, using the entire utterance.

Single-condition, predicted, first part of utterance: Same as above, but only using the first 250 ms of the utterance. This can be more realistic for real-time deployment.

In some situations, such as for SNRs less than 15 dB, the custom-trained models performed somewhat better than prior art models. Multi-condition training performed as well as single-condition training for SNRs greater than 5 dB, so for a majority of use cases, the extra effort, both from training and run-time perspectives, of using single-condition training does not currently appear to be advantageous. However, using speaker+ condition as opposed to only speaker did provide some small benefits at low SNR.

The single-condition results using the condition identification can be either similar or better than the results from single-condition models assuming the noise level was known a priori. Even more striking is that that the ASR performance can be often the same or better using the first 250 ms of the utterance versus using the entire utterance. This is notwithstanding the fact, as might be expected, the condition classification accuracy was lower using the first 250 ms as opposed to using the entire utterance (76% v. 90%).

The better performance with predicted noise conditions could be explained by the utterance-by-utterance variability of SNR. Recall from above that for each average SNR condition, the standard deviation of the utterance-specific SNR was 5 dB due to the inherent variability in the corpus signal level. It could thus be that the condition detector can be choosing the specific SNR for a particular utterance, which can be more accurate than using the average SNR for the condition. This makes sense especially when considering that with a 5 dB standard deviation and 5 dB steps, 60% of the utterances will have an SNR closer to the average of another category than the average of their own.

Similarly, this may explain the better ASR performance with lower condition classification accuracy. Since most of the utterances for a particular average SNR class may actually have an utterance-specific SNR closer to another class, it is reasonable that higher classification accuracy could hurt ASR performance.

The high variability of utterance-specific SNR suggests that there may be some benefit training the condition classifier on utterance SNR and not average SNR.

In some embodiments, the open source portion of the AiShell-1 corpus can be provided with 148 hours of training data; however, up to 718 hours of additional AiShell data can be provided.

In some embodiments, the system can be provided with improved single condition performance by clustering the speech data into independent categories.

Other languages: in some embodiments the system can be expanded to incorporate English with the Libri-speech corpus and Japanese with the CSJ corpus, both of which have established Kaldi recipes.

De-noising autoencoders: as referenced earlier, de-noising auto-coders (DAE) have been successful in feature-space reduction in the effects of noise. In some embodiments of the present disclosure the system can use de-noising auto-encoders in combination with the other techniques described such as multi-condition training.

Microphone arrays: especially for social robots in public spaces with multiple possible speakers, sometime simultaneous, it would be useful to use multiple micro-phones to detect the live speaker and also focus attention on that speaker, decreasing the effective SNR as compared with single microphones.

Audio-visual speech recognition: in some embodiments, especially for SNR less than 20 dB, the system can be provided having a camera, wherein the system can also be trained on visual speech capture wherein audio-visual speech recognition or "lipreading" can improve ASR performance, sometimes dramatically.

In the system contemplated herein, significant ASR and STT accuracy was able to be achieved by identifying the noise condition so that the best associated linguistic model can be chosen for raw waveform comparison, by doing so the system was able to identify the noise condition with greater than 90% accuracy, and when adding such predictions to the ASR system, overall performance was the same or better than if the system had known the average SNR a priori. Multi-condition training performed as well as single-condition training for all but very low SNR, less than 10 dB.

In some embodiments the raw audio waveform can be recorded on a local robot, and wherein method further comprises a step of transmitting the raw audio waveform to a remote server, wherein the remote server contains the computational neural network.

In yet additional embodiments the system can use virtually any path or motion planning techniques as will be appreciated by those having skill in the art so long as the path or motion contemplated is also based on the environmental restrictions or parameters as determined by the one or more sensors on the robot.

A basic motion planning problem is to produce a continuous motion that connects a start configuration S and a goal configuration G, while avoiding collision with known obstacles. The robot and obstacle geometry can be described in a 2D or 3D workspace, while the motion can be represented as a path in (possibly higher-dimensional) configuration space.

One such motion planning can include a configuration space approach. A configuration describes the pose of the robot, and the configuration space C can be the set of all possible configurations.

For example:
If the robot is a single point (zero-sized) translating in a 2-dimensional plane (the workspace), C is a plane, and a configuration can be represented using two parameters (x, y).

If the robot is a 2D shape that can translate and rotate, the workspace is still 2-dimensional. However, C is the special Euclidean group SE(2)=R2 {\displaystyle \times} SO(2) (where SO(2) is the special orthogonal group of 2D rotations), and a configuration can be represented using 3 parameters (x, y, θ).

If the robot is a solid 3D shape that can translate and rotate, the workspace is 3-dimensional, but C is the special Euclidean group SE(3)=R3 {\displaystyle \times} SO(3), and a configuration requires 6 parameters: (x, y, z) for translation, and Euler angles (α, β, γ).

If the robot is a fixed-base manipulator with N revolute joints (and no closed-loops), C is N-dimensional.

One such motion planning method which can be implemented by the system can include free space approach. The set of configurations that avoids collision with obstacles is called the free space Cfree. The complement of Cfree in C is called the obstacle or forbidden region. Often, it is prohibitively difficult to explicitly compute the shape of Cfree. However, testing whether a given configuration is in Cfree is efficient. First, forward kinematics determine the position of the robot's geometry, and collision detection tests if the robot's geometry collides with the environment's geometry.

One such motion planning method which can be implemented by the system can include a target space approach. In this approach target space is a linear subspace of free space which denotes where we want the robot to move to. In global motion planning, target space is observable by the robot's sensors. However, in local motion planning, the robot cannot observe the target space in some states. To solve this problem, the robot can be configured to move through several virtual target spaces, each of which is located within the observable area (around the robot). A virtual target space is called a sub-goal.

Another such motion planning method which can be implemented by the system can include an obstacle space approach. Obstacle space is a space that the robot cannot move to. Obstacle space is not opposite of free space.

Another such motion planning method which can be implemented by the system can include a danger space approach. In this approach, danger space is a space that robot can but it is not desired move to. Danger space is not an obstacle nor free space. For example, within a comfortable operating zone around fragile items or a human, mud pits in a wooded area, and greasy floor in a factory can be considered as a danger space. If the robot cannot find a trajectory that completely belong to free space, it must pass through the danger space. In some cases, in the motion planning with time/energy constraint robot may prefer to take a short trajectory in danger space instead of long path in free space.

Another such motion planning method which can be implemented by the system can include an algorithm approach: Low-dimensional problems can be solved with grid-based algorithms that overlay a grid on top of configuration space, or geometric algorithms that compute the shape and connectivity of Cfree. Exact motion planning for high-dimensional systems under complex constraints can have decreased computational load with the introduction of machine learning and historical databases with regard to similar past constraints.

In such cases, potential-field algorithms can be used in an efficient manner. In certain scenarios, sampling-based algorithms can be utilized so as to avoid the problem of local minima, and solve many problems quite quickly. In particular these types of mapping methods can include a determinable probability of success or failure which is optimal for use with AI as the probability of failure decreases to zero as more time is spent training the sample base. Sampling-based algorithms are currently considered state-of-the-art for motion planning in high-dimensional spaces, and have been applied to problems which have dozens or even hundreds of dimensions (robotic manipulators, biological molecules, animated digital characters, and legged robots).

Another such motion planning method which can be implemented by the system can include a Grid-based search approach. Grid-based approaches overlay a grid on a configuration space, and assume each configuration is identified with a grid point. At each grid point, the robot can then be allowed to move to adjacent grid points as long as the line between them is completely contained within Cfree. It will then be appreciated that this line can be tested with collision detection sensors, or alternatively tested in a virtual environment. This discretizes the set of actions, and search algorithms (like A*) are used to find a path from the start to the goal.

These approaches require setting a grid resolution. Search is faster with coarser grids, but the algorithm will fail to find paths through narrow portions of Cfree.

Traditional grid-based approaches produce paths whose heading changes are constrained to multiples of a given base angle, often resulting in suboptimal paths. Any-angle path planning approaches find shorter paths by propagating information along grid edges, in order to search fast, without constraining their paths to grid edges, so as to find short paths.

Grid-based approaches often need to search repeatedly, for example, when the knowledge of the robot about the configuration space changes or the configuration space itself changes during path following. Incremental heuristic search algorithms re-plan fast by using experience with the previous similar path-planning problems to speed up their search for the current one.

Another such motion planning method which can be implemented by the system can include an interval-based search approach. This approach is similar to grid-based search approaches except that is can then generate a paving covering entirely the configuration space instead of a grid. The paving is decomposed into two subpavings X−,X+ made with boxes such that X− ⊂ Cfree ⊂ X+. Characterizing Cfree amounts to solve a set inversion problem. Interval analysis could thus be used when Cfree cannot be described by linear inequalities in order to have a guaranteed enclosure.

The robot is thus allowed to move freely in X−, and cannot go outside X+. To both subpavings, a neighbor graph is built and paths can be found using algorithms such as Dijkstra or A*. When a path is feasible in X−, it is also feasible in Cfree. When no path exists in X+ from one initial configuration to the goal, we have the guarantee that no feasible path exists in Cfree. As for the grid-based approach, the interval approach is inappropriate for high-dimensional problems, due to the fact that the number of boxes to be generated grows exponentially with respect to the dimension of configuration space.

Another such motion planning method which can be implemented by the system can include a reward-based algorithm approach. Reward-based algorithms assume that the robot in each state, position and internal state, including direction, can choose between different actions. However, the result of each action is not definite. In other words, outcomes are partly random and partly under the control of the robot. The robot gets positive reward when it reaches the target and gets negative reward if it collides with an obstacle. These algorithms try to find a path which maximizes cumulative future rewards. The Markov decision process (MDP) is a popular mathematical framework that is used in many reward-based algorithms. The advantage of MDPs over other reward-based algorithms is that they generate the optimal path. The disadvantage of MDPs is that they limit the robot to choose from a finite set of actions. Therefore, the path is not smooth, similar to grid-based approaches. Fuzzy Markov decision processes (FDMPs) is an extension of MDPs which generate smooth path with using an fuzzy inference system.

Another such motion planning method which can be implemented by the system can include an artificial potential field. In some such embodiments an approach is to treat the robot's configuration as a point in a potential field that combines attraction to the goal, and repulsion from obstacles. The resulting trajectory is output as the path. This approach has advantages in that the trajectory is produced with little computation. However, they can become trapped in local minima of the potential field and fail to find a path, or can find a non-optimal path. The artificial potential fields can be treated as continuum equations similar to electrostatic potential fields (treating the robot like a point charge), or motion through the field can be discretized using a set of linguistic rules.

Another such motion planning method which can be implemented by the system can include a sampling-based algorithm approach. Sampling-based algorithms represent the configuration space with a roadmap of sampled configurations. A basic algorithm samples N configurations in C, and retains those in Cfree to use as milestones. A roadmap is then constructed that connects two milestones P and Q if the line segment PQ is completely in Cfree. Again, collision detection is used to test inclusion in Cfree. To find a path that connects S and G, they are added to the roadmap. If a path in the roadmap links S and G, the planner succeeds, and returns that path. If not, the reason is not definitive: either there is no path in Cfree, or the planner did not sample enough milestones.

These algorithms work well for high-dimensional configuration spaces, because unlike combinatorial algorithms, their running time is not (explicitly) exponentially dependent on the dimension of C. They are also (generally) substantially easier to implement. They are probabilistically complete, meaning the probability that they will produce a solution approaches 1 as more time is spent. However, they cannot determine if no solution exists.

Given basic visibility conditions on Cfree, it has been proven that as the number of configurations N grows higher, the probability that the above algorithm finds a solution approaches 1 exponentially. Visibility is not explicitly dependent on the dimension of C; it is possible to have a high-dimensional space with "good" visibility or a low-dimensional space with "poor" visibility. The experimental success of sample-based methods suggests that most commonly seen spaces have good visibility.

It is typically much faster to only test segments between nearby pairs of milestones, rather than all pairs. Nonuniform sampling distributions attempt to place more milestones in areas that improve the connectivity of the roadmap. Quasi-random samples typically produce a better covering of configuration space than pseudorandom ones, though some recent work argues that the effect of the source of randomness is minimal compared to the effect of the sampling distribution.

It is possible to substantially reduce the number of milestones needed to solve a given problem by allowing curved eye sights, for example by crawling on the obstacles that block the way between two milestones.

If only one or a few planning queries are needed, it is not always necessary to construct a roadmap of the entire space. Tree-growing variants are typically faster for this case.

A motion planner is said to be complete if the planner in finite time either produces a solution or correctly reports that there is none. Most complete algorithms are geometry-based. The performance of a complete planner is assessed by its computational complexity.

Resolution completeness is the property that the planner is guaranteed to find a path if the resolution of an underlying grid is fine enough. Most resolution complete planners are grid-based or interval-based. The computational complexity of resolution complete planners is dependent on the number of points in the underlying grid, which is O(1/hd), where h is the resolution (the length of one side of a grid cell) and d is the configuration space dimension.

Probabilistic completeness is the property that as more "work" is performed, the probability that the planner fails to find a path, if one exists, asymptotically approaches zero. Several sample-based methods are probabilistically complete. The performance of a probabilistically complete planner is measured by the rate of convergence.

Incomplete planners do not always produce a feasible path when one exists. Sometimes incomplete planners do work well in practice.

The foregoing has provided a detailed description on a system and method of employing multi-model automatic speech recognition in challenging acoustic environments according to some embodiments of the present disclosure. Specific examples are used herein to describe the principles and implementations of some embodiments.

In the above embodiments, the existing functional elements or modules can be used for the implementation. For example, the existing sound reception elements can be used as microphones; at least, headphones used in the existing communication devices have elements that perform the function; regarding the sounding position determining module, its calculation of the position of the sounding point can be realized by persons skilled in the art by using the existing technical means through corresponding design and development; meanwhile, the position adjusting module is an element that any apparatuses with the function of adjusting the state of the apparatus have.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry such as processing circuits, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The robots in this disclosure can include special purpose logic circuitry, e.g., an FPGA (field-programmable gate array), or an ASIC (application-specific integrated circuit). The robot can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The robots and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube) display, an LCD (liquid-crystal display) display, an OLED (organic light emitting diode) display, a plasma display, a flexible display, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

For the convenience of description, the components of the apparatus may be divided into various modules or units according to functions, and are separately described. Certainly, when various embodiments of the present disclosure are carried out, the functions of these modules or units can be achieved in one or more hardware or software.

Persons skilled in the art should understand that the embodiments of the present disclosure can be provided for a method, system, or computer program product. Thus, the present disclosure can be in form of all-hardware embodiments, all-software embodiments, or a mix of hardware-software embodiments. Moreover, various embodiments of the present disclosure can be in form of a computer program product implemented on one or more computer-applicable memory media (including, but not limited to, disk memory, CD-ROM, optical disk, etc.) containing computer-applicable procedure codes therein.

Various embodiments of the present disclosure are described with reference to the flow diagrams and/or block diagrams of the method, apparatus (system), and computer program product of the embodiments of the present disclosure. It should be understood that computer program instructions realize each flow and/or block in the flow diagrams and/or block diagrams as well as a combination of the flows and/or blocks in the flow diagrams and/or block diagrams. These computer program instructions can be provided to a processor of a general-purpose computer, a special-purpose computer, an embedded memory, or other programmable data processing apparatuses to generate a machine, such that the instructions executed by the processor of the computer or other programmable data processing apparatuses generate a device for performing functions specified in one or more flows of the flow diagrams and/or one or more blocks of the block diagrams.

These computer program instructions can also be stored in a computer-readable memory that can guide the computer or other programmable data processing apparatuses to operate in a specified manner, such that the instructions stored in the computer-readable memory generate an article of manufacture including an instruction device. The instruction device performs functions specified in one or more flows of the flow diagrams and/or one or more blocks of the block diagrams.

These computer program instructions may also be loaded on the computer or other programmable data processing apparatuses to execute a series of operations and steps on the computer or other programmable data processing apparatuses, such that the instructions executed on the computer or other programmable data processing apparatuses provide steps for performing functions specified ill one or more flows of the flow diagrams and/or one or more blocks of the block diagrams.

Although preferred embodiments of the present disclosure have been described, persons skilled in the art can alter and modify these embodiments once they know the fundamental inventive concept. Therefore, the attached claims should be construed to include the preferred embodiments and all the alternations and modifications that fall into the extent of the present disclosure.

The description is only used to help understanding some of the possible methods and concepts. Meanwhile, those of ordinary skill in the art can change the specific implementation manners and the application scope according to the concepts of the present disclosure. The contents of this specification therefore should not be construed as limiting the disclosure.

In the foregoing method embodiments, for the sake of simplified descriptions, the various steps are expressed as a series of action combinations. However, those of ordinary skill in the art will understand that the present disclosure is not limited by the particular sequence of steps as described herein.

According to some other embodiments of the present disclosure, some steps of any processes can be performed in the particular order recited, however, where appropriate some steps may be performed in alternative sequences so as to achieve similar results. Additionally, some steps may be omitted, or alternative recited steps may be added or inserted between other recited method steps in any potential suitable manner as will be recognized as appropriate by those having skill in the art.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

In addition, those of ordinary skill in the art will also understand that the embodiments described in the specification are just some of the embodiments, and the involved actions and portions are not all exclusively required, but will be recognized by those having skill in the art whether the functions of the various embodiments are required for a specific application thereof.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion such that a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, the commodity, or the device including the element.

In the descriptions, with respect to device(s), terminal(s), etc., in some occurrences singular forms are used, and in some other occurrences plural forms are used in the descriptions of various embodiments. It should be noted, however, that the single or plural forms are not limiting but rather are for illustrative purposes. Unless it is expressly stated that a single device, or terminal, etc. is employed, or it is expressly stated that a plurality of devices, or terminals, etc. are employed, the device(s), terminal(s), etc. can be singular, or plural.

Based on various embodiments of the present disclosure, the disclosed apparatuses, devices, and methods can be implemented in other manners. For example, the abovementioned devices are only of illustrative purposes, and other types of devices can employ the methods disclosed herein.

Dividing the device into different "portions," "regions" "or "components" merely reflect various logical functions according to some embodiments, and actual implementations can have other divisions of "portions," "regions," or "components" realizing similar functions as described above, or without divisions. For example, multiple portions, regions, or components can be combined or can be integrated into another system. In addition, some features can be omitted, and some steps in the methods can be skipped.

Those of ordinary skill in the art will appreciate that the portions, or components, etc. in the devices provided by various embodiments described above can be configured in the one or more devices described above. They can also be located in one or multiple devices that is (are) different from the example embodiments described above or illustrated in the accompanying drawings. For example, the circuits, portions, or components, etc. in various embodiments described above can be integrated into one module or divided into several sub-modules.

The numbering of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures.

The invention claimed is:

1. A human augmented robotics intelligence operation system, the system comprising:
   a plurality of robots, each robot comprising:
   a plurality of sensors configured to detect one or more environmental parameters and user commands;
   a robot control unit, each robot control unit having an associated communication module and a processor, each associated robot control unit configured to receive and transmit data collected by the plurality of sensors; and
   one or more articulating joints being capable of manipulating the robot in a manner to perform the user commands;
   a cloud-based robotic intelligence engine comprising:
   a communication module configured to receive data from a plurality of robot control units from each of the plurality of robots; the communication module of the cloud-based robotic intelligence engine is wired or wirelessly;
   a historical database containing a plurality of historical actions and associated environmental parameters;
   a processor, the processor of the cloud-based robotic intelligence engine configured to recognize the user commands and determine a plurality of executable commands required for the robot to comply with a particular user command within a determined environment having a particular set of detected environmental parameters;
   wherein the processor of the cloud-based robotic intelligence engine is configured to make a probabilistic determination regarding the likelihood of successfully completing the particular user command based on the particular set of one or more detected environmental parameters given a particular user command by comparing a determined proposed path having a similar executable command sequence having been performed in similar environmental parameters as contained in the historical database;
   wherein, when the probabilistic determination is above a pre-determined threshold, the processor of the cloud-based robotic intelligence engine is configured to communicate one or more necessary executable commands to the robot control unit, wherein the robot control unit then causes each of the articulating joints of the robot to execute each of the necessary executable commands so as to complete the particular user command;
   a human augmentation platform comprising:
   a communication module configured to receive data from the cloud-based robotic intelligence engine; the communication module of the human augmentation platform is wired or wirelessly;
   a human service operator center having one or more human user operators;
   wherein, when the probabilistic determination is below the predetermined threshold, the processor of the cloud-based robotic intelligence engine generates an alert and flags an operation for human review;
   wherein the robot control unit is configured to determine a result with regard to satisfaction of the particular user command and track the one or more necessary executable commands utilized to achieve an associated result; and
   wherein the result and the one or more necessary associated executable commands and the associated environmental parameters are transmitted to the cloud-based robotic intelligence engine for inclusion in the historical database for future access;
   wherein the processor of the cloud-based robotic intelligence engine is configured to utilize a deep learning neural network to recognize one or more similar past environmental scenarios and recognize one or more historical actions which have resulted in successful execution of the particular user command, and subsequently generate a set of executable commands which will have an increased probabilistic likelihood of success in a determined real-time environment;
   wherein the deep learning neural network is bootstrapped utilizing a plurality of training parameters, the training parameters comprise: number of robotic joints, limits to robotic potential arcs of motion, the limbs connecting the articulating joints, acceptable levels of force for a given task, acceptable error rates, acceptable maximum and minimum speeds, acceptable number of interferences or intercepts of robots with environmental obstacles, various required learning rates, and initial weights for various actions in determining failure or success.

2. The human augmented robotics intelligence operation system of claim 1, wherein, when the probabilistic determination is below the pre-determined threshold, the processor of the robot control unit is configured to initiate a connection to the human augmentation platform such that a human user operator can then review the particular user command and manually generate the one or more necessary executable commands for command completion and transmit the one or more necessary executable commands to the robot control unit, wherein the robot control unit then causes each of the articulating joints of the robot to execute each of the necessary executable commands so as to complete the particular user command.

3. The human augmented robotics intelligence operation system of claim 1, wherein each robot control unit is connected to the cloud-based robotic intelligence engine through a visitor-based network utilizing a captive portal.

4. The human augmented robotics intelligence operation system of claim 2, wherein the processor of the cloud-based robotic intelligence engine is configured to generate a virtual reality environmental setting reflecting the detected environmental parameters received from the robot control unit of a particular robot.

5. The human augmented robotics intelligence operation system of claim 4, wherein the processor of the cloud-based robotic intelligence engine is configured to generate and run a simulation of the plurality of executable commands required for the robot to comply with the particular user command within the virtual reality environmental setting reflecting the detected environmental parameters received from the robot control unit of a particular robot.

6. The human augmented robotics intelligence operation system of claim 4, wherein the human user is prompted to provide an input regarding the plurality of executable commands required for the robot to comply with the particular user command and deploying the plurality of executable commands within the virtual reality environmental setting reflecting the detected environmental parameters received from the robot control unit of a particular robot.

7. The human augmented robotics intelligence operation system of claim 6, wherein upon successfully completing the particular user command in the virtual environment, wherein the processor is then configured to transmit the plurality of executable commands to the particular robot control unit and wherein the plurality of executable commands are then executed by the robot control associated with the particular robot.

8. The human augmented robotics intelligence operation system of claim 1, wherein each robot control unit is provided with a user input interface configured to receive direct user input regarding the user commands and receive input regarding satisfaction of the user commands.

9. The human augmented robotics intelligence operation system of claim 1, further comprising a developer portal, wherein the developer portal is configured to receive packets containing one or more executable commands for the one or more articulating joints configured to cause a particular robot to perform a predetermined sub-task, wherein a plurality of packets and subtasks are retained in the historical database, and wherein the processor of the robot control unit is configured to determine a plurality of appropriate packets and chain the plurality of appropriate packets together to execute the user commands.

10. The human augmented robotics intelligence operation system of claim 1, wherein the processor of the cloud-based robotic intelligence engine is configured to access a plurality of external databases and extract one or more executable commands for the one or more articulating joints configured to cause a particular robot to perform a predetermined sub-task from at least one external database of the plurality of external databases; the plurality of external databases comprise the one or more executable commands for the one or more articulating joints and the predetermined sub-task.

11. The human augmented robotics intelligence operation system of claim 1, further comprising a streaming analytics platform for receiving data from the one or more environmental sensors, the streaming analytics platform being configured to analyze the raw received data and save a filtered set of clean data on the historical database pertaining to the robot's ambient environment.

12. A method of providing complex robotic control to a plurality of robots, the method comprising:
  providing a plurality of robots, each robot comprising:
  a plurality of sensors; and
  one or more articulating joints being capable of manipulating the robot in a manner to perform user commands;
  providing a robot control unit to each robot, each robot control unit having an associated communication module and a processor;
  providing a cloud-based robotic intelligence engine, the cloud-based robotic intelligence engine comprising:
  a communication module configured to receive data from a plurality of robot control units from each of the plurality of robots; the communication module of the cloud-based robotic intelligence engine is wired or wirelessly;
  a historical database containing a plurality of historical actions and associated environmental parameters; and
  a processor;
  providing a human augmentation platform, the human augmentation platform comprising:
  a communication module configured to receive data from the cloud-based robotic intelligence engine; the communication module of the human augmentation platform is wired or wirelessly;
  a human service operator center having one or more human user operators;
  receiving a plurality of environmental parameters utilizing the plurality of sensors provided on at least one robot;
  receiving a particular user command at the robot;
  transmitting the particular user command and the and the plurality of environmental parameters to the cloud-based robotic intelligence engine; and
  utilizing the processor of the cloud-based robotic intelligence engine to determine a plurality of executable commands required for the robot to comply with the particular user command within the immediate environment surrounding the robot;
  utilizing the processor of the cloud-based robotic intelligence engine to generate a probabilistic determination regarding the likelihood of successfully completing the particular user command based on the particular one or more detected environmental parameters given a particular user command by comparing a determined proposed path having a similar executable command sequence having been performed in similar environmental parameters as contained in the historical database;
  utilizing the processor of the cloud-based robotic intelligence engine to communicate one or more necessary executable commands to the robot control unit, wherein the robot control unit then causes each of the articulating joints of the robot to execute each of the necessary executable commands so as to complete the particular user command when the probabilistic determination is above a pre-determined threshold;
  utilizing the processor of the cloud-based robotic intelligence engine to generate an alert and flag an operation for human review when the probabilistic determination is below the predetermined threshold;

determining a result with regard to satisfaction of the particular user command and track the one or more executable commands utilized to achieve the associated result;

transmitting the associated result and the associated executable commands and the associated environmental parameters to the cloud-based robotic intelligence engine for inclusion in the historical database for future access; and utilizing the processor of the cloud-based robotic intelligence engine to utilize a deep learning neural network to recognize one or more similar past environmental scenarios and recognize one or more historical actions which have resulted in successful execution of the particular user command; and generate a set of executable commands which will have an increased probabilistic likelihood of success in a determined real-time environment;

wherein the deep learning neural network is bootstrapped utilizing a plurality of training parameters, the training parameters comprise: number of robotic joints, limits to robotic potential arcs of motion, the limbs connecting the articulating joints, acceptable levels of force for a given task, acceptable error rates, acceptable maximum and minimum speeds, acceptable number of interferences or intercepts of robots with environmental obstacles, various required learning rates, and initial weights for various actions in determining failure or success.

13. The method of providing complex robotic control to a plurality of robots of claim 12, the method further comprising:

utilizing the processor of the robot control unit to initiate a connection to the human augmentation platform such that a human user operator can then review the particular user command and manually generate the one or more necessary executable commands for command completion and transmit the one or more necessary executable commands to the robot control unit, wherein the robot control unit then causes each of the articulating joints of the robot to execute each of the necessary executable commands so as to complete the particular user command when the probabilistic determination is below the pre-determined threshold.

14. The method of providing complex robotic control to a plurality of robots of claim 12, wherein each robot control unit is connected to the cloud-based robotic intelligence engine through a visitor-based network utilizing a captive portal.

15. The method of providing complex robotic control to a plurality of robots of claim 13, further comprising:

generating a virtual reality environmental setting reflecting the detected environmental parameters received from the robot control unit of a particular robot.

16. The method of providing complex robotic control to a plurality of robots of claim 15, further comprising:

generating and running a simulation of the plurality of executable commands required for the robot to comply with the particular user command within the virtual reality environmental setting reflecting the detected environmental parameters received from the robot control unit of a particular robot.

17. The method of providing complex robotic control to a plurality of robots of claim 15, further comprising:

prompting the human user operator to provide an input regarding the plurality of executable commands required for the robot to comply with the particular user command and deploying the plurality of executable commands within the virtual reality environmental setting reflecting the detected environmental parameters received from the robot control unit of a particular robot.

18. The method of providing complex robotic control to a plurality of robots of claim 17, further comprising:

transmitting a plurality of executable commands to the particular robot control unit and wherein the plurality of executable commands are then executed by the robot control associated with the particular robot upon successfully completing the particular user command in the virtual environment.

19. A human augmented robotics intelligence operation system, the system comprising:

a plurality of robots, each robot comprising:
a plurality of sensors configured to detect one or more environmental parameters and user commands;
a robot control unit, each robot control unit having an associated communication module and a processor, each associated robot control unit module configured to receive and transmit data collected by the plurality of sensors; and
one or more articulating joints being capable of manipulating the robot in a manner to perform the user command;

a cloud-based robotic intelligence engine comprising:
a communication module configured to receive data from a plurality of robot control units from each of the plurality of robots;
a historical database containing a plurality of historical actions and associated environmental parameters; the communication module of the cloud-based robotic intelligence engine is wired or wirelessly;
a processor, the processor of the cloud-based robotic intelligence engine configured to recognize the user commands and determine a plurality of executable commands required for the robot to comply with a particular user command within a determined environment having a particular set of detected environmental parameters;

a human augmentation platform comprising:
a communication module configured to receive data from the cloud-based robotic intelligence engine; the communication module of the human augmentation platform is wired or wirelessly;
a human service operator center having one or more human user operators interacting therewith; and
a developer portal, configured to receive input regarding various robot functions from a pool of one or more developers;

wherein the processor of the cloud-based robotic intelligence engine is configured to make a probabilistic determination regarding the likelihood of successfully completing the particular user command based on the particular set of detected environmental parameters given a particular user command by comparing a determined proposed path having a similar executable command sequence having been performed in similar environmental parameters as contained in the historical database;

wherein, when the probabilistic determination is above a pre-determined threshold, the processor of the cloud-based robotic intelligence engine is configured to communicate one or more necessary executable commands to the robot control unit, wherein the robot control unit then causes each of the articulating joints of the robot to execute each of the necessary executable commands so as to complete the particular user command;

wherein, when the probabilistic determination is below the predetermined threshold, the processor of the cloud-based robotic intelligence engine generates an alert and flags an operation for human review;

wherein the robot control unit is configured to determine a result with regard to satisfaction of the particular user command and track the one or more executable commands utilized to achieve the associated result; and wherein the developer portal is configured to receive packets containing one or more executable commands for the one or more articulating joints configured to cause a particular robot to perform a predetermined sub-task, wherein a plurality of packets and subtasks are retained in the historical database, and wherein the processor of the robot control unit is configured to determine a plurality of appropriate packets and chain the plurality of appropriate packets together;

wherein the result and the associated executable commands and the associated environmental parameters are transmitted to the cloud-based robotic intelligence engine for inclusion in the historical database for future access;

wherein the processor of the cloud-based robotic intelligence engine is configured to generate a virtual reality environmental setting reflecting the detected environmental parameters received from the robot control unit of a particular robot;

wherein the processor of the cloud-based robotic intelligence engine is configured to generate and run a simulation of the plurality of executable commands required for the robot to comply with the particular user command within the virtual reality environmental setting reflecting the detected environmental parameters received from the robot control unit of a particular robot;

wherein the processor of the cloud-based robotic intelligence engine is configured to utilize a deep learning neural network to recognize one or more similar past environmental scenarios and recognize one or more historical actions which have resulted in successful execution of the particular user command, and subsequently generate a set of executable commands which will have an increased probabilistic likelihood of success in a determined real-time environment; and wherein the deep learning neural network is bootstrapped utilizing a plurality of training parameters, the training parameters comprise: number of robotic joints, limits to robotic potential arcs of motion, the limbs connecting the articulating joints, acceptable levels of force for a given task, acceptable error rates, acceptable maximum and minimum speeds, acceptable number of interferences or intercepts of robots with environmental obstacles, various required learning rates, and initial weights for various actions in determining failure or success.

* * * * *